(12) United States Patent
Lee

(10) Patent No.: US 11,949,988 B2
(45) Date of Patent: Apr. 2, 2024

(54) CAMERA ACTUATOR INCLUDING A DUMMY MEMBER AND CAMERA MODULE INCLUDING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/996,627

(22) PCT Filed: Apr. 19, 2021

(86) PCT No.: PCT/KR2021/004861
§ 371 (c)(1),
(2) Date: Oct. 20, 2022

(87) PCT Pub. No.: WO2021/215759
PCT Pub. Date: Oct. 28, 2021

(65) Prior Publication Data
US 2023/0217114 A1    Jul. 6, 2023

(30) Foreign Application Priority Data

Apr. 20, 2020  (KR) .................. 10-2020-0047485
Jul. 23, 2020  (KR) .................. 10-2020-0091615

(51) Int. Cl.
*H04N 23/69* (2023.01)
*H04N 23/54* (2023.01)
*H04N 23/68* (2023.01)

(52) U.S. Cl.
CPC ............ *H04N 23/69* (2023.01); *H04N 23/54* (2023.01); *H04N 23/687* (2023.01)

(58) Field of Classification Search
CPC ...... H04N 23/69; H04N 23/54; H04N 23/687; H04N 23/67; H04N 23/68;
(Continued)

(56) References Cited

U.S. PATENT DOCUMENTS

2019/0212632 A1*  7/2019  Miller .................. G03B 5/00
2020/0159131 A1*  5/2020  Erath ............... F16C 32/0434
(Continued)

FOREIGN PATENT DOCUMENTS

KR  10-2018-0041040 A   4/2018
KR  10-2018-0137277 A  12/2018
(Continued)

OTHER PUBLICATIONS

International Search Report dated Jul. 27, 2021 in International Application No. PCT/KR2021/004861.

*Primary Examiner* — Padma Haliyur
(74) *Attorney, Agent, or Firm* — Saliwanchik, Lloyd & Eisenschenk

(57) ABSTRACT

Disclosed in an embodiment of the present invention is a camera actuator including a housing, a mover disposed in the housing and including an optical member, a tilting guide unit disposed between the housing and the mover, a driving unit which is disposed in the housing and drives the mover, and an elastic member disposed between the tilting guide unit and the housing, wherein the driving unit includes a first magnet disposed on a first side surface of the mover and a dummy member disposed on a second side surface of the mover facing the first side surface.

10 Claims, 62 Drawing Sheets

(58) Field of Classification Search
CPC .... G03B 2205/0015; G03B 2205/0046; G03B 2205/0069; G03B 3/10; G03B 5/02
See application file for complete search history.

(56) References Cited

U.S. PATENT DOCUMENTS

2020/0174270 A1\* 6/2020 Enta ......................... G03B 5/00
2020/0200994 A1\* 6/2020 Park ....................... G03B 19/22

FOREIGN PATENT DOCUMENTS

| KR | 10-1993077 B1 | 6/2019 | |
| KR | 10-2019-0117973 A | 10/2019 | |
| KR | 10-2020-0039378 A | 4/2020 | |
| WO | WO-2018212616 A1 \* | 11/2018 | ............... G02B 7/04 |

\* cited by examiner

1100

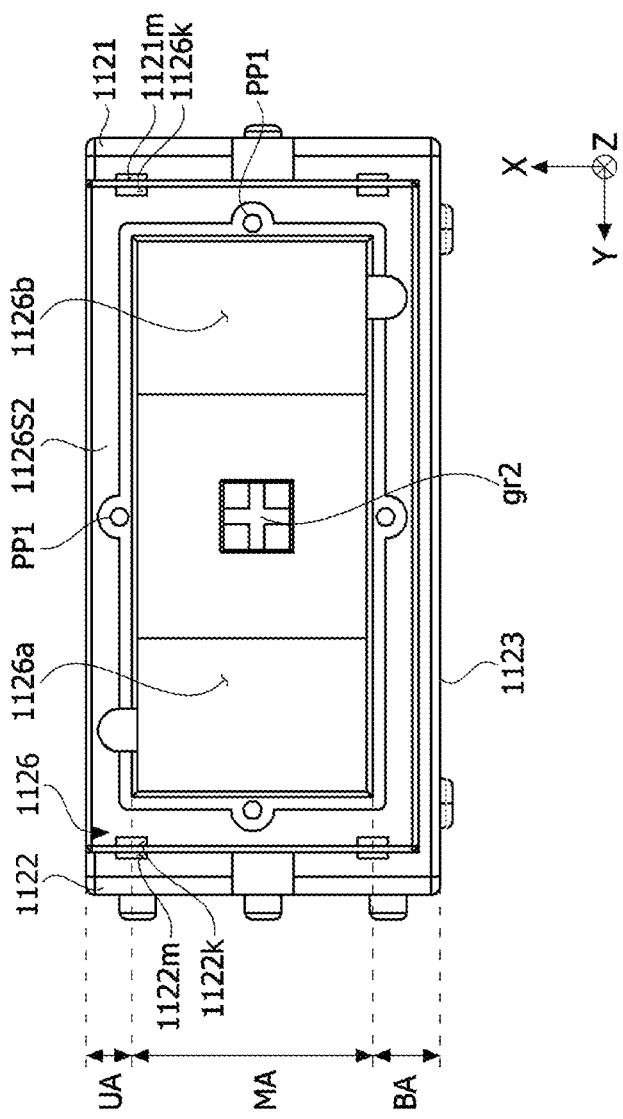

1250: 1251, 1252, 1253, 1254, 1255

CAMERA ACTUATOR INCLUDING A DUMMY MEMBER AND CAMERA MODULE INCLUDING SAME

CROSS-REFERENCE TO RELATED APPLICATIONS

This application is the U.S. national stage application of International Patent Application No. PCT/KR2021/004861, filed Apr. 19, 2021, which claims the benefit under 35 U.S.C. § 119 of Korean Application Nos. 10-2020-0047485, filed Apr. 20, 2020; and 10-2020-0091615, filed Jul. 23, 2020; the disclosures of each of which are incorporated herein by reference in their entirety.

TECHNICAL FIELD

The present invention relates to a camera actuator and a camera module including the same.

BACKGROUND ART

Cameras are apparatuses which capture images or moving images of subjects and are mounted on electronic devices such as portable devices, drones, vehicles, and the like. In order to improve the quality of an image, a camera module may have an image stabilization (IS) function that corrects or inhibits image shake caused by the movement of a user, an auto focusing (AF) function that automatically adjusts a distance between an image sensor and a lens so as to arrange a focal length of the lens, and a zooming function that increases or decreases a magnification using a zoom lens to capture an image of a subject at a long distance.

Meanwhile, when the number of pixels of the image sensor increases, the resolution increases and a size of a pixel decreases. As the size of the pixel decreases, an amount of received light for the same time decreases. Accordingly, as the number of pixels of a camera increases, an image shake phenomenon caused by hand shake occurring due to a decrease in shutter speed in a dark environment may more severely occur. An optical image stabilization (OIS) technique for changing an optical path to correct movement is a typical image stabilization technique.

According to the general OIS technique, the movement of a camera can be detected by a gyro sensor or the like, and then a lens or a camera module including a lens and an image sensor can be tilted or moved based on the detected movement. When the lens or the camera module including the lens and the image sensor is tilted or moved for OIS, a space for tilting or moving needs to be additionally secured around the lens or the camera module.

Meanwhile, an actuator for the OIS may be disposed around the lens. In this case, the actuator for the OIS may include actuators for tilting along two axes, that is, an actuator for X-axis tilting and an actuator for Y-axis tilting, perpendicular to an optical axis Z.

However, due to recent needs for ultra-slim and ultra-small camera modules, there have been many spatial restrictions on the arrangement of the actuator for OIS, and it may be difficult to secure a sufficient space for a lens or a camera module including a lens and an image sensor to tilt or move for the OIS. In addition, as the number of pixels of a camera increases, it is preferable that a size of the lens be increased in order to increase an amount of received light, but there may be a limit on increasing the size of the lens due to a space occupied by the actuator for the OIS.

In addition, when a camera module has all of a zooming function, an AF function, and an OIS function, there is also a problem that a magnet for OIS and a magnet for AF or zoom are disposed adjacent to each other so as to cause a magnetic field interference.

Technical Problem

The present invention is directed to providing a camera actuator capable of being applied to ultra-slim, ultra-small, and high-resolution cameras.

The present invention is also directed to providing a camera actuator which stably holds a tilting guide unit.

Technical Solution

One aspect of the present invention provides a camera actuator including a housing, a mover disposed in the housing and including an optical member, a tilting guide unit disposed between the housing and the mover, a driving unit which is disposed in the housing and drives the mover, and an elastic member disposed between the tilting guide unit and the housing, wherein the driving unit includes a first magnet disposed on a first side surface of the mover and a dummy member disposed on a second side surface of the mover facing the first side surface.

The driving unit may further include a second magnet disposed on a lower portion of the mover, a first coil facing the first magnet, and a second coil facing the second magnet.

The camera actuator may further include a substrate part that is electrically connected to the driving unit and includes a first substrate side portion, a second substrate side portion opposite to the first substrate side portion, and a third substrate side portion disposed between the first substrate side portion and the second substrate side portion, and a driver disposed on any one of the first substrate side portion and the third substrate side portion, wherein the first substrate side portion may be electrically connected to the first coil, and the third substrate side portion may be electrically connected to the second coil.

The second substrate side portion may be a dummy substrate.

The driver may supply a current to the first coil and the second coil.

The elastic member may bring the tilting guide unit into close contact with the mover.

The camera actuator may further include a first member connected to the housing and a second member coupled to the mover, wherein the second member may be disposed between the first member and the mover, the elastic member may include a first bonding part connected to the housing, a second bonding part connected to the first member, and connecting parts connecting the first bonding part and the second bonding part.

The second bonding part may be disposed between the mover and the first bonding part.

The tilting guide unit may include a base, a first protruding portion protruding from a first surface of the base, and a second protruding portion protruding from a second surface of the base, and the mover may tilt with respect to a first axis about the first protruding portion and tilt with respect to a second axis about the second protruding portion.

The connecting parts may include a first connecting part to a fourth connecting part which are respectively disposed in first to fourth quadrant regions that are divided by a first bisector and a second bisector, the first to fourth quadrant regions may be positioned counter-clockwise, the first connecting part and the third connecting part may be symmetrical with respect to the first bisector and the second bisector, the second connecting part and the fourth connecting part may be symmetrical with respect to the first bisector and the second bisector, the first bisector may be a line which bisects the elastic member in a first direction, and the second bisector may be a line which bisects the elastic member in a second direction.

Another aspect of the present invention provides an electronic device including a first camera module in which an opening, into which light is incident, and an image sensor overlap at least partially in an optical axis direction and a second camera module including an optical member which changes an optical path of incident light, wherein the second camera module includes a first side surface adjacent to the first camera module, a second side surface opposite to the first side surface, a driving unit which is disposed between the optical member and the second side surface and moves the optical member, and a dummy member between the optical member and the first side surface.

Still another aspect of the present invention provides a camera actuator including a housing, mover disposed in the housing, a tilting guide unit disposed between the housing and the mover, a driving unit which is disposed in the housing and drives the mover, and an elastic member disposed between the tilting guide unit and the housing, wherein the elastic member brings the tilting guide unit into close contact with the mover.

The mover may include a seating groove accommodating the tilting guide unit and may further include a first member and a second member which are accommodated in the seating groove.

The first member may cover a part of the seating groove, and the second member may be disposed between the tilting guide unit and the first member.

The elastic member may include a first bonding part connected to the housing, a second bonding part connected to the first member, and connecting parts connecting the first bonding part and the second bonding part.

The second bonding part may be disposed between the mover and the first bonding part.

The connecting parts may extend from the first member toward the second member.

The first bonding part may include a first flat region and a plurality of first bonding holes positioned in the first flat region.

An inner side surface of the first flat region may be positioned further inward than a contact area in which the first member and the first flat region are in contact with each other.

The tilting guide unit may include a base, a first protruding portion protruding from a first surface of the base, and a second protruding portion protruding from a second surface of the base.

The mover may tilt with respect to a first axis about the first protruding portion and tilt with respect to the second axis about the second protruding portion.

The second bonding part may overlap the first protruding portion along the second axis.

The second bonding part may include a second flat region and a plurality of second bonding holes spaced apart from each other along the second axis and positioned in the second flat region.

In the base, a top point of the first protruding portion may be disposed on an intermediate axis between the plurality of second bonding holes.

The mover may include a first protrusion groove accommodating the first protruding portion, and the second member may include a second protrusion groove accommodating the second protruding portion.

Each of the first member, the second member, the tilting guide unit may at least partially overlap the mover along the second axis, the tilting guide unit may overlap the first member and the second member along a third axis, and the third axis may be perpendicular to the first axis and the second axis.

Yet another aspect of the present invention provides a camera actuator including a fixed member, a mover including a reflection member, a tilting guide unit which guides the mover to tilt, a driving unit which drives the mover, and an elastic member which pulls the mover toward the fixed member, wherein the elastic member brings the tilting guide unit into close contact with the fixed member and the mover The tilting guide unit may be disposed between the fixed member and the mover.

The mover may include a seating groove accommodating the tilting guide unit and may further include a first member and a second member accommodated in the seating groove, and the fixed member may be any one of the housing and the second member.

Yet another aspect of the present invention provides a camera actuator including a fixed member, a mover including a reflection member, a tilting guide unit which guides the mover to tilt, and an elastic member including a first bonding part coupled to the fixed member and a second bonding part coupled to the mover, wherein the second bonding part of the elastic member is not disposed on a virtual plane on which the first bonding part of the elastic member and one surface of the fixed member are in contact with each other.

The second bonding part may be closer to the reflection member than the first bonding part.

Advantageous Effects

According to embodiments of the present invention, a camera actuator capable of being applied to ultra-slim, ultra-small, and high-resolution cameras can be provided. Particularly, an actuator for optical image stabilization (OIS) can be effectively disposed without increasing a total size of a camera module.

According to embodiments of the present invention, magnetic field interference between tilting with respect to an X-axis direction and tilting with respect to a Y-axis direction does not occur, the tilting with respect to the X-axis direction and the tilting with respect to the Y-axis direction can be implemented through a stable structure, magnetic field interference between an actuator for OIS and an actuator for auto focusing (AF) or zooming does not occur, and thus a precise OIS function can be implemented.

According to embodiments of the present invention, since a size limit of a lens is solved, a sufficient light amount can be secured, and thus OIS with low power consumption can be implemented.

According to the embodiments of the present invention, driving stability of the camera actuator can be improved.

DESCRIPTION OF DRAWINGS

FIG. 6C is a front view illustrating the first housing of the first camera actuator according to the embodiment.

MODES OF THE INVENTION

Figure 1:
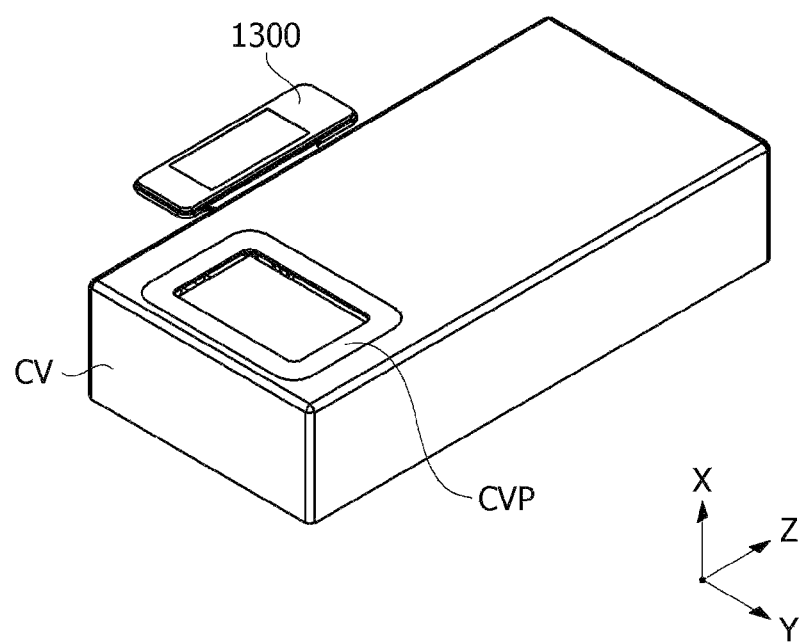
FIG. 1 is a perspective view illustrating a camera module according to an embodiment.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "second," "first," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, embodiments will be described in detail with reference to the accompanying drawings, components that are the same or correspond to each other will be denoted by the same or corresponding reference numerals regardless of symbols of the accompanying drawings, and redundant descriptions will be omitted.

Figure 2:
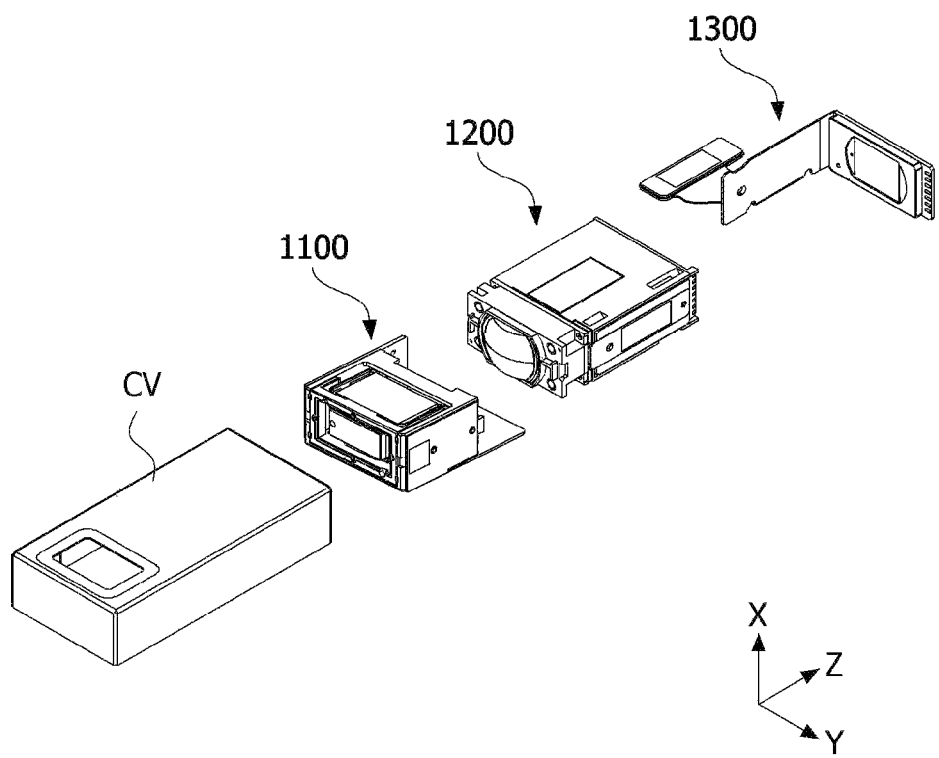
FIG. 2 is an exploded perspective view illustrating the camera module according to the embodiment.
Figure 3:
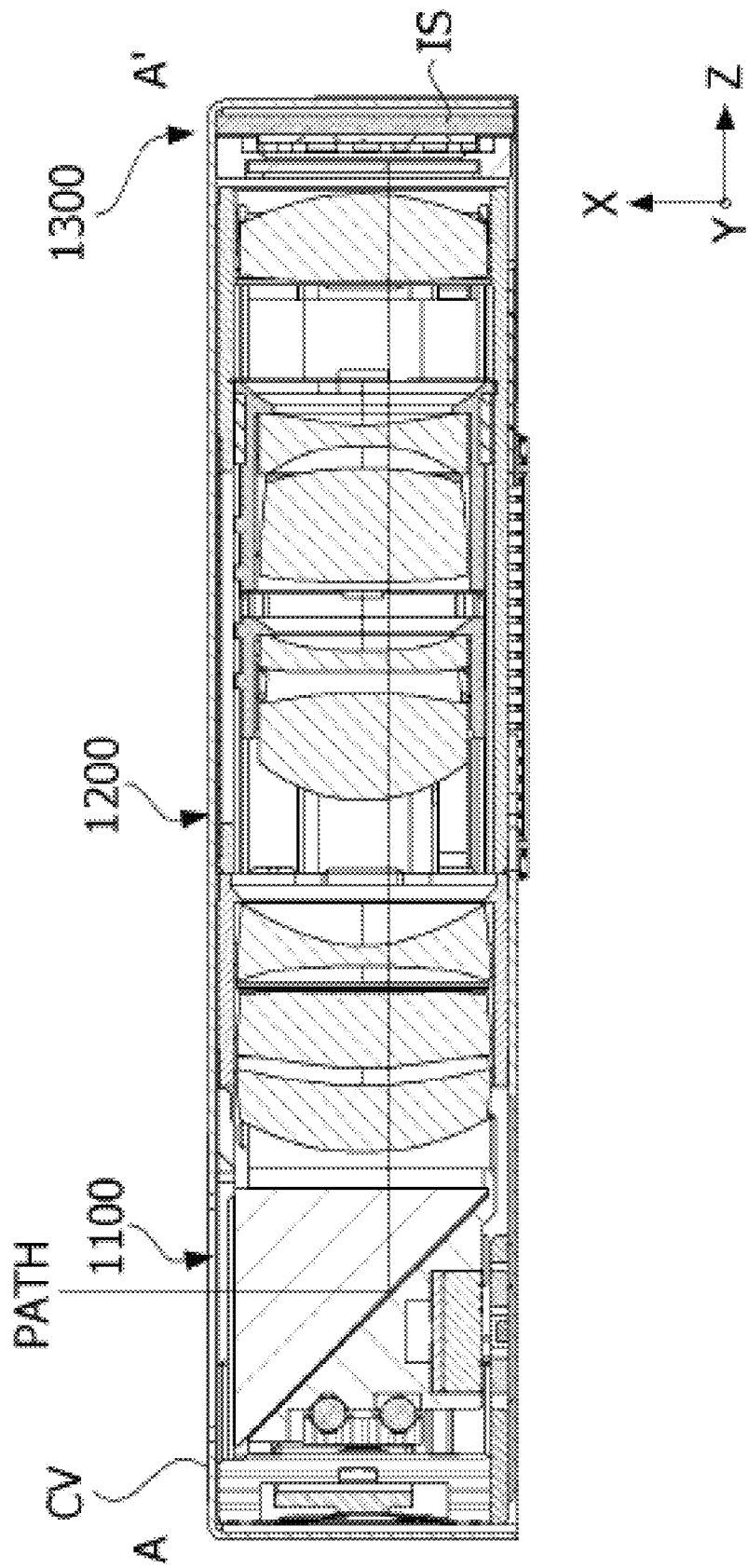
FIG. 3 is a cross-sectional view along in FIG. 1.

FIG. 1 is a perspective view illustrating a camera module according to an embodiment, FIG. 2 is an exploded perspective view illustrating the camera module according to the embodiment, and FIG. 3 is a cross-sectional view along in FIG. 1.

Referring to FIGS. 1 and 2, a camera module 1000 according to the embodiment may include a cover CV, a first camera actuator 1100, a second camera actuator 1200, and a circuit substrate 1300. In this case, the first camera actuator 1100 may be interchangeably used as a first actuator, and the second camera actuator 1200 may be interchangeably used as a second actuator.

The cover CV may cover the first camera actuator 1100 and the second camera actuator 1200. A coupling force between the first camera actuator 1100 and the second camera actuator 1200 can be increased by the cover CV.

In addition, the cover CV may be formed of a material which blocks electromagnetic waves. Accordingly, the first camera actuator 1100 and the second camera actuator 1200 in the cover CV can be easily protected.

An open region into which light is incident may be positioned in an upper surface of the cover CV, and a prevention part CVP may be positioned around the open region. The prevention part CVP may inhibit diffused reflection of the incident light.

In addition, the first camera actuator 1100 may be an optical image stabilizer (OIS) actuator. For example, the first camera actuator 1100 may move an optical member in a direction perpendicular to an optical axis.

The first camera actuator 1100 may include a fixed focal length lens disposed in a predetermined lens-barrel (not shown). The fixed focal length lens may be referred to as a "single focal length lens" or "single lens."

The first camera actuator 1100 may change a light path. In the embodiment, the first camera actuator 1100 may change an optical path in a perpendicular direction through an internal optical member (for example, a prism or mirror). By using such a structure, even when a thickness of a mobile terminal decreases, since a lens component of which a size is greater than a thickness of the mobile terminal is disposed in the mobile terminal, magnification, auto focusing (AF), and OIS functions can be performed through a change in the optical path.

However, the present invention is not limited thereto, and the first camera actuator 1100 may change an optical path in a perpendicular direction a plurality of times or change an optical path by a predetermined angle.

In addition, a first camera actuator according to an embodiment and a first camera actuator according to another embodiment which will be described below may each be applied to the first camera actuator.

The second camera actuator 1200 may be disposed behind the first camera actuator 1100. The second camera actuator 1200 may be coupled to the first camera actuator 1100. In addition, mutual coupling between the second camera actuator 1200 and the first camera actuator 1100 may be performed by one of various manners.

In addition, the second camera actuator 1200 may be a zoom actuator or auto focus (AF) actuator. For example, the second camera actuator 1200 may support a single lens or a plurality of lenses and move the lenses according to a control signal of a predetermined control unit to perform an AF function or zoom function.

In addition, the single lens or the plurality of lenses may independently or individually move in an optical axis direction to perform the zoom or AF function.

The circuit substrate 1300 may be disposed behind the second camera actuator 1200. The circuit substrate 1300 may be electrically connected to the second camera actuator 1200 and the first camera actuator 1100. In addition, the circuit substrate 1300 may be provided as a plurality of circuit substrates 1300.

The camera module according to the embodiment may also be provided as a single camera module or a plurality of camera modules. For example, the plurality of camera modules may include a first camera module and a second camera module.

In addition, the first camera module may include a single actuator or a plurality of actuators. For example, the first camera module may include the first camera actuator 1100 and the second camera actuator 1200.

In addition, the second camera module may include an actuator (not shown) which is disposed in a predetermined housing (not shown) and may drive a lens part. The actuator may be a voice coil motor, a micro actuator, a silicone actuator, or the like, and may be variously applied in an electrostatic manner, a thermal manner, a bimorph manner, an electrostatic force manner, or the like, but the present invention is not limited thereto. In addition, in the present specification, the camera actuator may be mentioned as an actuator or the like. In addition, the camera module provided as the plurality of camera modules may be mounted in various electronic device such as a mobile terminal.

Referring to FIG. 3, the camera module according to the embodiment may include the first camera actuator 1100 for an OIS function and the second camera actuator 1200 for a zooming function and an AF function.

Light may enter the camera module or the first camera actuator through the open region positioned in an upper surface of the first camera actuator 1100. That is, the light enters the first camera actuator 1100 in the optical axis direction (for example, an X-axis direction), and an optical path may be changed in a perpendicular direction (for example, a Z-axis direction) through the optical member. In addition, the light may pass through the second camera actuator 1200 and may be incident on an image sensor IS positioned at one end of the second camera actuator 1200.

In the present specification, a lower surface refers to one side in a first direction. In addition, the first direction may be the X-axis direction in the drawings and may be interchangeably used with a second axis direction or the like. The second direction is the Y-axis direction in the drawings and may be interchangeably used with the first axis direction. The second direction is a direction perpendicular to the first direction. In addition, a third direction may be the Z-axis direction in the drawings and may be interchangeably used with a third axis direction. In addition, the third direction is a direction perpendicular to both the first direction and the second direction. In this case, the third direction (Z-axis direction) corresponds to a direction of the optical axis, and the first direction (X-axis direction) and the second direction (Y-axis direction) are directions perpendicular to the optical axis, and may be tilted by the second camera actuator. In addition, hereinafter, in the description about the first camera actuator 1100, the optical axis direction is the third direction (Z-axis direction), and the present invention will be described based on that the optical axis direction is the third direction (Z-axis direction).

In addition, in the present specification, unless otherwise described, the term "inward" may refer to a direction from the cover CV to the first camera actuator, and the term "outward" may be a direction opposite to "inward." That is, the first camera actuator and the second camera actuator may be positioned inward from the cover CV, and the cover CV may be positioned outward from the first camera actuator or the second camera actuator.

In addition, using such a structure, the camera module according to the embodiment may solve a spatial limitation of the first camera actuator and the second camera actuator by changing a path of light. That is, in the camera module according to the embodiment, the optical path of the camera module can extend while the thickness of the camera module is minimized in correspondence to the change in the path of light. In addition, it should be understood that the second camera actuator may also control a focal point and the like on the extended optical path to provide a wide range of magnification.

In addition, the camera module according to the embodiment may control the optical path through the first camera actuator to implement OIS, and accordingly, an occurrence of a decentering or tilting phenomenon can be minimized, and best optical characteristics can be implemented.

In addition, the second camera actuator 1200 may include an optical system and a lens driving unit. For example, at least one among a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, the first lens assembly and the second lens assembly may be moving lenses which are moved using the coil, the magnet, and the guide pin, and the third lens assembly may be a fixed lens, but the present invention is not limited thereto. For example, the third lens assembly may perform a function of a focator which collects light to form an image at a specific position, and the first lens assembly may perform a function of a variator which reforms the image, which is formed through the third lens assembly, at another position. Meanwhile, the first lens assembly may be in a state in which a change in magnification is large because a distance to a subject or an image is greatly changed, and the first lens assembly, which is a variator, may play an important role in changing a focal length or magnification of the optical system. Meanwhile, image points, at which an image is formed through the first lens assembly which is the variator, may be slightly vary according to a position. Accordingly, the second lens assembly may perform a position compensation function for the image formed through the variator. For example, the second lens assembly may perform a function of a compensator for forming the image formed through the first lens assembly, which is the variator, at an accurate position of the actual image sensor. For example, the first lens assembly and the second lens assembly may be driven by an electromagnetic force generated due to interactions between the coil and the magnet. The above-described content may be applied to a lens assembly which will be described below. In addition, the first lens assembly to the third lens assembly may move in the optical axis direction, that is, the third direction. In addition, the first lens assembly to the third lens assembly may move individually or in conjunction with each other in the third direction.

Meanwhile, when the actuator for OIS and the actuator for AF or zoom are applied according to the embodiment of the present invention, magnetic field interference with a magnet for AF or zoom can be inhibited when OIS is performed. Since a first driving magnet of the first camera actuator 1100 is separately disposed from the second camera actuator 1200, the magnetic field interference between the first camera actuator 1100 and the second camera actuator 1200 can be inhibited. In the present specification, the OIS may be interchangeably used with the terms such as hand shake correction, OIS, optical image correction, and shaking correction.

Figure 4:
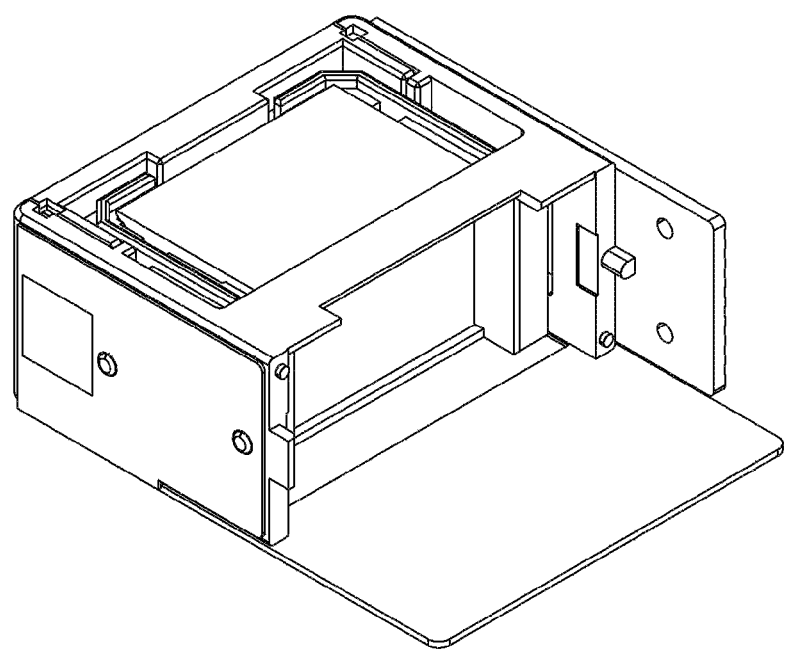
FIG. 4 is a perspective view illustrating a first camera actuator according to the embodiment.
Figure 5:
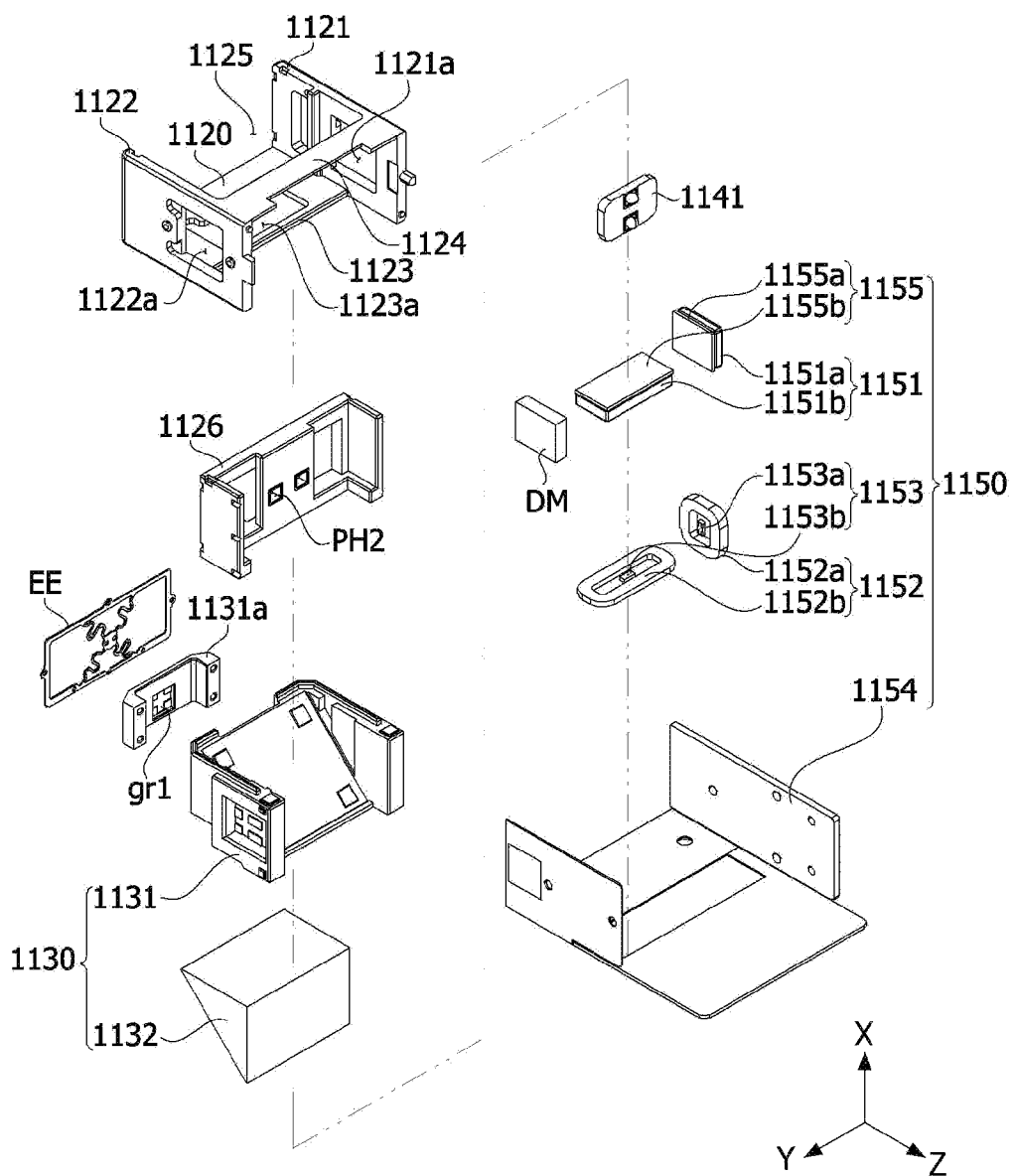
FIG. 5 is an exploded perspective view illustrating the first camera actuator according to the embodiment.

FIG. 4 is a perspective view illustrating the first camera actuator according to the embodiment, and FIG. 5 is an exploded perspective view illustrating the first camera actuator according to the embodiment.

Referring to FIGS. 4 and 5, the first camera actuator 1100 according to the embodiment includes a first housing 1120, a mover 1130, a rotation part 1140, a first driving unit 1150, an elastic member EE, a first member 1126, and a second member 1131a.

The mover 1130 may include a holder 1131 and an optical member 1132 seated in the holder 1131. In addition, the rotation part 1140 may include a tilting guide unit 1141. In addition, the first driving unit 1150 includes driving magnets 1151, driving coils 1152, Hall sensor units 1153, a first substrate part 1154, and yoke parts 1155.

First, the first camera actuator 1100 may include a shield can (not shown). The shield can (not shown) may be positioned at an outermost side of the first camera actuator 1100 to surround the rotation part 1140 and the first driving unit 1150 which will be described below.

The shield can (not shown) may block or reduce electromagnetic waves which are generated at the outside. That is, the shield can (not shown) may reduce an occurrence of a malfunction of the rotation part 1140 or the first driving unit 1150.

The first housing 1120 may be positioned inside the shield can (not shown). When there is no shield can, the first housing 1120 may be positioned at an outermost side of the first camera actuator.

In addition, the first housing 1120 may be positioned inside the first substrate part 1154 which will be described below. The first housing 1120 may be fastened to the shield can (not shown) by being fitted to or engaged with each other.

The first housing 1120 may include a first housing side portion 1121, a second housing side portion 1122, a third housing side portion 1123, and a fourth housing side portion 1124. Details thereof will be described below.

The first member 1126 may be disposed in the first housing 1120. The first member 1126 may be disposed between the second member 1131a and the first housing. The first member 1126 may be disposed in the first housing or included in the first housing 1120. Descriptions thereof will be described below.

The mover 1130 includes the holder 1131 and the optical member 1132 seated in the holder 1131.

The holder 1131 may be seated in an accommodation portion 1125 of the first housing 1120. The holder 1131 may include a first holder outer side surface to fourth holder outer side surfaces respectively corresponding to the first housing side portion 1121, the second housing side portion 1122, the third housing side portion 1123, and the first member 1126. For example, the first holder outer side surface to the fourth holder outer side surface may correspond to or face inner side surfaces of the first housing side portion 1121, the second housing side portion 1122, the third housing side portion 1123, and the first member 1126.

In addition, the holder 1131 may include the second member 1131a disposed in a fourth seating groove. Details thereof will be described below.

The optical member 1132 may be seated in the holder 1131. To this end, the holder 1131 may have a seating surface, and the seating surface may be formed by an accommodation groove. The seating surface may be coated with a bonding member. Accordingly, the optical member 1132 may be coupled to the holder 1131.

In the embodiment, the optical member 1132 may be formed as a mirror or prism. Hereinafter, the optical member 1132 is illustrated based on the prism, but the optical member 1132 may be provided as a plurality of lenses as in the above-described embodiment.

Alternatively, the optical member 1132 may be provided as a plurality of lenses and a prism or mirror. In addition, the optical member 1132 may include a reflecting part disposed therein. However, the present invention is not limited thereto.

In addition, the optical member 1132 may reflect light reflected from the outside (for example, an object) into the camera module. In other words, the optical member 1132 may solve a spatial limitation of the first camera actuator and the second camera actuator by changing a path of reflected light. Accordingly, it should be understood that the camera module may also provide a wide range of magnification by extending an optical path while minimizing a thickness thereof.

In addition, the second member 1131a may be coupled to the holder 1131. The second member 1131a may be disposed outside the holder 1131 and inside the housing. In addition, the second member 1131a may be seated in an additional groove positioned at a region excluding the fourth seating groove in the fourth holder outer side surface in the holder 1131. Therefore, the second member 1131a may be coupled to the holder 1131, and at least a part of the first member 1126 may be positioned between the second member 1131a and the holder 1131. For example, the at least a part of the first member 1126 may pass through a space formed between the second member 1131a and the holder 1131.

In addition, the second member 1131a may be formed as a structure separated from the holder 1131. By using such a structure, as will be described below, the first camera actuator can be easily assembled. Alternatively, the second member 1131a may be integrally formed with the holder 1131, but, hereinafter, the second member 1131a will be described as a separated structure.

The rotation part 1140 may include the tilting guide unit 1141. In addition, the rotation part 1140 may include magnetic members having the same polarities in order to press the tilting guide unit 1141.

The tilting guide unit 1141 may be coupled to the mover 1130 and the first housing 1120. Specifically, the tilting guide unit 1141 may be disposed between the holder 1131 and the first member 1126. Accordingly, the tilting guide unit 1141 may be coupled to the mover 1130 of the holder 1131 and the first housing 1120. However, unlike the above-described content, in the present embodiment, the tilting guide unit 1141 may be disposed between the first member 1126 and the holder 1131. Specifically, the tilting guide unit 1141 may be positioned between the first member 1126 and the fourth seating groove of the holder 1131.

The second member 1131a, the first member 1126, the tilting guide unit 1141, and the holder 1131 may be sequentially disposed in the third direction (Z-axis direction). In addition, the tilting guide unit 1141 may be disposed close to the optical axis. Accordingly, the actuator according to the embodiment may easily change an optical path through first and second axis tilts which will be described below.

The tilting guide unit 1141 may include first protruding portions spaced apart from each other in the first direction (X-axis direction) and second protruding portions spaced apart from each other in the second direction (Y-axis direction). In addition, the first protruding portions and the second protruding portions may protrude in opposite directions. Details thereof will be described below.

The first driving unit 1150 include the driving magnets 1151, the driving coils 1152, the Hall sensor units 1153, the first substrate part 1154, and the yoke parts 1155. Contents thereof will be described below.

In addition, the elastic member EE may be positioned between the mover 1130 and a fixed member (for example, the first housing 1120 or the first member 1126). In addition, the tilting guide unit 1141 may be positioned between the fixed member and the mover. In addition, the elastic member EE may pull the mover 1130 toward the fixed member to bring the tilting guide unit 1141 into close contact with the fixed member and the mover. In addition, the elastic member EE may bring the tilting guide unit 1141 into close contact with the mover 1130. In other words, the elastic member EE may pull the mover 1130 toward the housing 1220 or the first member 1126 which are the fixed member.

The elastic member EE may be disposed between the tilting guide unit 1141 and the housing 1120. Particularly, the elastic member EE may be sequentially disposed on the tilting guide unit 1141, the first member 1126, and the second member 1131a. That is, the first member 1126, the elastic member EE, the second member 1131a, the tilting guide unit 1141, and the mover 1130 may be sequentially disposed in the third direction.

The elastic member EE may be formed of an elastic material and disposed between the first member 1126 and the second member 1131a to couple the first member 1126 and the second member 1131a. In addition, the elastic member EE may provide an elastic force to the second member 1131a and the holder 1131 connected to the second member 1131a with respect to the first member 1126 fixed to the housing 1120.

Accordingly, the elastic member EE may be disposed between and coupled to the housing 1120 and the mover 1130, and may press the tilting guide unit 1141 through the mover 1130. Accordingly, an X-axis tilt and/or Y-axis tilt of the mover 1130 may be performed through the tilting guide unit 1141.

In the elastic member EE, a portion in contact with the first member 1126 and a portion in contact with the second member 1131a (or holder 1131) and the housing 1120 may be spaced apart from each other in the third direction (Z-axis direction). The elastic member EE may have a pre-load due to a separation distance between the contact portions (first and second contact portions which will be described below). In addition, the pre-load may be transmitted to the tilting guide unit 1141 through the mover 1130 and to the first member 1126 through the tilting guide unit 1141. Accordingly, the tilting guide unit 1141 disposed between the mover 1130 and the first member 1126 may be pressed by the elastic member EE. That is, a force by which the tilting guide unit 1141 is positioned between the mover 1130 and the first member 1126 may be maintained. Accordingly, even when X-axis tilting or Y-axis tilting is performed, the tilting guide unit 1141 is not separated, and a position of the tilting guide unit 1141 between the mover 1130 and the housing 1120 can be maintained. In addition, when a current is not supplied (for example, when a current is zero) after a current is supplied to a first coil and a second coil for an X-axis tilt or Y-axis tilt, the mover 1130 may return to an initial position by the above-described pre-load or a restoring force. That is, when a force (electromagnetic force which will be described below) greater than the pre-load is generated, the mover 1130 may perform X/Y-axis tilting, and when a force smaller than the pre-load is generated, the mover 1130 may return to the initial position, or a position may be maintained.

Figure 6A:
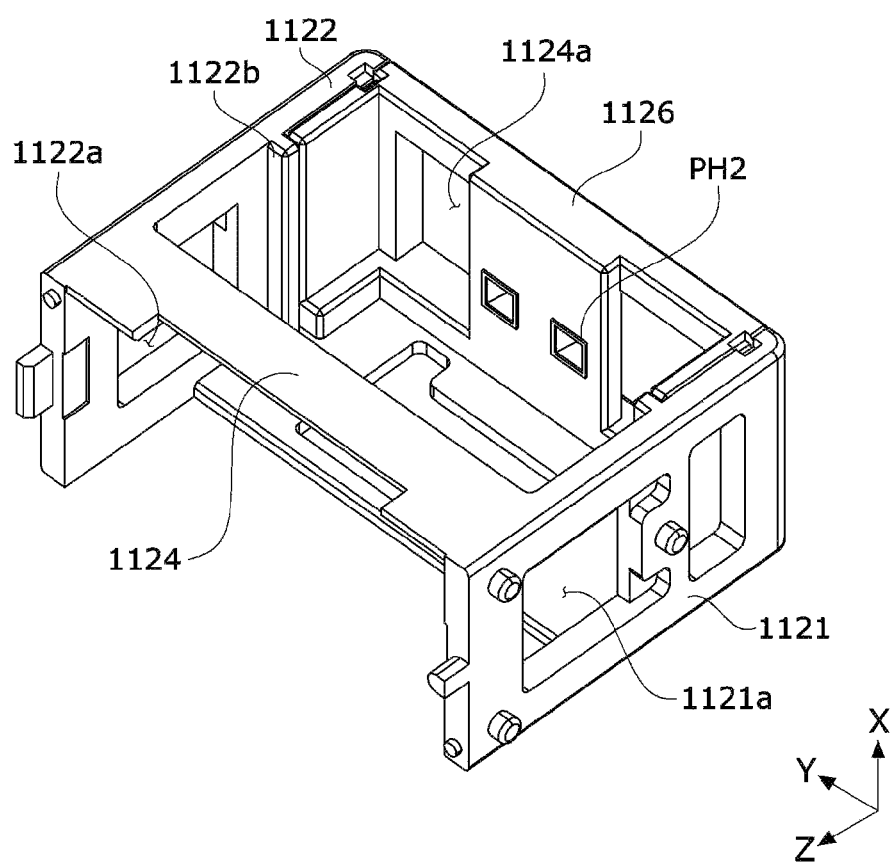
FIG. 6A is a perspective view illustrating a first housing of the first camera actuator according to the embodiment.
Figure 6B:
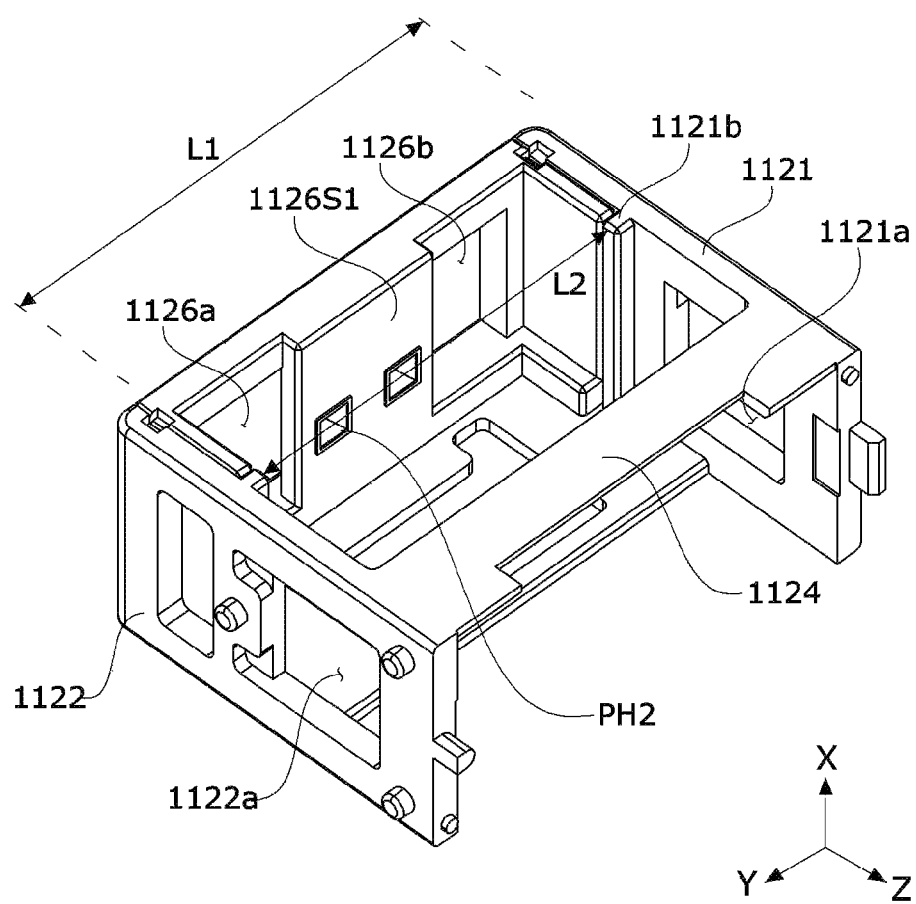
FIG. 6B is a perspective view illustrating the first housing in a direction different from a direction in FIG. 6A.

FIG. 6A is a perspective view illustrating the first housing of the first camera actuator according to the embodiment, FIG. 6B is a perspective view illustrating the first housing in a direction different from a direction in FIG. 6A, FIG. 6C is a front view illustrating the first housing of the first camera actuator according to the embodiment.

Referring to FIGS. 6A to 6C, the first housing 1120 according to the embodiment may include the first housing side portion 1121 to the fourth housing side portion 1124. In addition, the first member 1126 may be coupled to and integrally formed with the first housing 1120. Accordingly, the first member 1126 may be a component included in the first housing 1120. That is, the first housing 1120 may be coupled to and integrally formed with the first member 1126. Alternatively, the first housing 1120 may include the first member 1126.

The first housing side portion 1121 and the second housing side portion 1122 may be disposed to face each other. In addition, the third housing side portion 1123 and the fourth housing side portion 1124 may be disposed to face each other.

In addition, the third housing side portion 1123 and the fourth housing side portion 1124 may be disposed between the first housing side portion 1121 and the second housing side portion 1122.

The third housing side portion 1123 and the fourth housing side portion 1124 may be in contact with the first housing side portion 1121, and the second housing side portion 1122. In addition, the third housing side portion 1123 may be a lower surface in the first housing 1120. In addition, the fourth housing side portion 1124 may be an upper surface in the first housing 1120. In addition, the above-described content may also be equally applied to the description about directions.

The first housing side portion 1121 may include a first housing hole 1121a. The first coil, which will be described below, may be positioned in the first housing hole 1121a.

In addition, the second housing side portion 1122 may include a second housing hole 1122a. In addition, the second housing hole 1122a and the first housing hole 1121a may be symmetrically positioned with respect to the first direction or the third direction. The second housing hole 1122a may be an empty region.

In addition, the first housing side portion 1121 and the second housing side portion 1122 may be side surfaces of the first housing 1120.

The first coil may be coupled to the first substrate part. In the embodiment, the first coil may be electrically connected to the first substrate part, and a current may flow through the first coil. The current is a factor of an electromagnetic force by which the first camera actuator may perform tilting about the X-axis.

In addition, the third housing side portion 1123 may include a third housing hole 1123a.

The second coil, which will be described below, may be positioned in the third housing hole 1123a. In addition, the second coil may be electrically connected and coupled to the first substrate part in contact with the first housing 1120. Accordingly, the second coil may be electrically connected to the first substrate part and may receive a current from the first substrate part. The current is a factor of an electromagnetic force by which the first camera actuator may perform tilting about the Y-axis.

The first member 1126 may be seated between the first housing side portion 1121 to the fourth housing side portion 1124. Accordingly, the first member 1126 may be positioned on the third housing side portion 1123. For example, the first member 1126 may be positioned at one side. The first member 1126 and the holder may be sequentially positioned in the third direction.

The fourth housing side portion 1124 may be disposed between the first housing side portion 1121 and the second housing side portion 1122 and may be in contact with the first housing side portion 1121, the second housing side portion 1122, and the third housing side portion 1123.

In addition, the fourth housing side portion 1124 may include a fourth housing hole 1124a. The fourth housing hole 1124a may be positioned above the optical member. Accordingly, light may be pass through the fourth housing hole 1124a and may be incident on the optical member.

In addition, the first housing 1120 may include the accommodation portion 1125 formed by the first housing side portion 1121 to the fourth housing side portion 1124. The first member 1126, the second member 1131a, the mover 1130, and the elastic member EE may be positioned in the accommodation portion 1125 as components.

In addition, the first housing 1120 may further include a fifth housing side portion facing the first member 1126. In addition, the fifth housing side portion may be disposed between the first housing side portion 1121 and the second housing side portion 1122 and may be in contact with the first housing side portion 1121, the second housing side portion 1122, and the third housing side portion 1123. In addition, the fifth housing side portion may include an open region to provide a path through which light reflected by the optical member 1132 moves. In addition, the fifth housing side portion may include a protrusion, groove, or the like to be easily coupled to another adjacent camera actuator. By using such a structure, the optical path is provided, and at the same time, a coupling force between the fifth housing side portion, in which an opening providing the optical path is formed, and other components is increased, movement of the opening due to separation and the like is suppressed, and thus a change in the optical path can be minimized.

In addition, as described above, the first member 1126 may be a component coupled to and included in the first housing 1120. That is, the first member 1126 may be disposed in the first housing 1120. Alternatively, the first member 1126 may be positioned in the first housing 1120.

In addition, the first member 1126 may be coupled to the first housing 1120. In the embodiment, the first member 1126 may be positioned between the first housing side portion 1121 and the second housing side portion 1122. In addition, the first member 1126 may be positioned between the third housing side portion 1123 and the fourth housing side portion 1124.

In addition, the first member 1126 may be positioned on the third housing side portion 1123 and may be in contact with the first to third housing side portions.

In addition, a first stopper 1121b may be positioned on the inner side surface of the first housing side portion 1121. In addition, a second stopper 1122b may be positioned on an inner side surface of the second housing side portion 1122.

The first stopper 1121b and the second stopper 1122b may be symmetrically positioned with respect to the first direction (X-axis direction). The first stopper 1121b and the second stopper 1122b may extend in the first direction (X-axis direction). By using such a structure, even when the first member 1126 moves into the first housing 1120, a position thereof may be maintained by the first stopper 1121b and the second stopper 1122b. In other words, the first stopper 1121b and the second stopper 1122b may maintain a state in which the first member 1126 is positioned at one side in the first housing 1120.

In addition, the first stopper 1121b and the second stopper 1122b may fix the position of the first member 1126 to eliminate an error factor such as vibrations by fixing the position of the tilting guide unit between the first member 1126 and the mover. Accordingly, the first camera actuator according to the embodiment may accurately perform X-axis tilting and Y-axis tilting.

In addition, a separation distance L2 between the first stopper 1121b and the second stopper 1122b in the second direction (Y-axis direction) may be smaller than a maximum length L1 of the first member 1126 in the second direction (Y-axis direction). Accordingly, the first member 1126 may be coupled to the first housing 1120 by being laterally assembled to or inserted into the first housing 1120. In addition, the housing 1120 may include the accommodation portion 1125 formed by the first housing side portion 1121 to the fourth housing side portion 1124. The first member 1126, the second member 1131a, the tilting guide unit 1141, the mover 1130, and the elastic member EE may be positioned in the accommodation portion 1125 as the components.

The first member 1126 may be disposed in the housing 1120. The first member 1126 may be disposed or included in the first housing. In addition, the first member 1126 may be coupled to the housing 1120. In the embodiment, the first member 1126 may be seated in a housing groove 1123b' formed in the third housing side portion 1123 or pass through at least a part of the housing groove 1123b' to be coupled to the third housing side portion 1123. Therefore, the first member 1126 may be coupled to the housing 1120 and may maintain fixation between the mover 1130 and the tilting guide unit 1141, which will be described below.

In addition, the first member 1126 may include first coupling parts PP1 disposed in regions adjacent to the first housing side portion 1121 and the second housing side portion 1121. Each of the first coupling parts PP1 may be formed as a protrusion. In addition, the first coupling parts PP1 may be coupled to a first bonding part EP1. As will be described below, the first coupling parts PP1 may be inserted into first bonding holes of the first bonding part EP1.

In addition, the first member 1126 includes second protrusion grooves in which the second protruding portions of the tilting guide unit are seated. Second protrusion grooves PH2 may be positioned in an inner side surface 1126s1 of the first member 1126. Accordingly, in the first member 1126, protruding portions (for example, the second protruding portions) of the tilting guide unit may be disposed close to the prism in the fourth seating groove so that the protruding portions are disposed close to a center of gravity of the mover 1130. Accordingly, when the holder tilts, a moment by which the mover 1130 moves for the tilting can be minimized. Accordingly, since current consumption for driving the coil is also minimized, power consumption of the camera actuator can be reduced.

In addition, the first member 1126 may include through holes 1126a and 1126b. The through holes may be provided as a plurality of through holes and include a first through hole 1126a and a second through hole 1126b.

First and second extending portions of the second member, which will be described below, may pass through the first through hole 1126a and the second through hole 1126b, respectively. Therefore, the second member and the first member may be coupled. In other words, the first housing and the mover may be coupled to each other.

The second protrusion grooves PH2 may be positioned between the first through hole 1126a and the second through hole 1126b. By using such a structure, a coupling force between the tilting guide unit 1141 and the first member 1126 may be increased to inhibit degradation of accuracy of a tilt occurring due to movement of the tilting guide unit 1141 in the first housing.

In addition, a second groove gr2 may be positioned in an outer side surface 1126s2 of the first member 1126. A magnetic member may be seated in the second groove gr2. In addition, the outer side surface 1126s2 of the first member 1126 may face the second member or inner side surface of a member base portion. In addition, a magnetic member seated on the second member and the magnetic member of the first member 1126 may face each other and have the same polarities. Accordingly, a repulsive force may be generated. In addition, since the first member 1126 presses the tilting guide unit inward or the holder using the repulsive force, even when a current is not supplied to the coil, the mover may be spaced a predetermined distance from the third housing side portion in the first housing. In other words, a coupling force between the mover, the housing, and the tilting guide unit can be maintained.

In addition, when the first member 1126 is integrally formed with the first housing 1120, a coupling force between the first member 1126 and the first housing 1120 can be increased to improve the reliability of the camera actuator. In addition, when the first member 1126 and the first housing 1120 are separately formed, the ease of assemblability and manufacture of the first member 1126 and the first housing 1120 can be improved.

In addition, in the embodiment, the first member 1126 may include the first through hole 1126*a* and the second through hole 1126*b* as described above. In addition, the first through hole 1126*a* and the second through hole 1126*b* may be disposed in parallel to overlap each other in the second direction (Y-axis direction).

In addition, the first member 1126 may include an upper member UA positioned on the first through hole 1126*a* and the second through hole 1126*b* and a lower member BA disposed under the first through hole 1126*a* and the second through hole 1126*b*. Accordingly, the first through hole 1126*a* and the second through hole 1126*b* may be positioned in the middle of the first member 1126. That is, the first member 1126 may include a connecting member MA positioned beside the side portion first through hole 1126*a* and the second through hole 1126*b*. That is, the upper member UA and the lower member BA may be connected to each other through the connecting member MA. In addition, the lower member BA may be provided as a plurality of lower members BA in order to form the first and second through holes, and plurality of lower members BA may be spaced apart from each other in the second direction (Y-axis direction).

Accordingly, since the first member 1126 has the upper member UA, a rigidity can be improved. For example, the rigidity of the first member 1126 can be improved when compared to the case in which there is no upper member UA. For example, in the present embodiment, a unit of the rigidity may be [N/μm]. Accordingly, the reliability of the first camera actuator according to the embodiment can be improved.

In addition, first coupling grooves 1126*k* may be positioned in the outer side surface 1126*s*2 of the first member 1126. The first coupling grooves 1126*k* may be positioned in an edge of the outer side surface 1126*s*2 of the first member 1126. Particularly, the first coupling grooves 1126*k* may be positioned at end portions (for example, left and right side portions) in the outer side surface 1126*s*2 of the first member 1126 and positioned adjacent to the first housing side portion 1121.

The first coupling grooves 1126*k* may be positioned to correspond to second coupling grooves 1121*m* and 1122*m* of the first housing side portion 1121 and the second housing side portion 1122. In the embodiment, the first coupling grooves 1126*k* may be positioned to face the second coupling grooves 1121*m* and 1122*m* of the first housing side portion 1121 and the second housing side portion 1122. The second coupling grooves 1121*m* and 1122*m* may be positioned in a side surface adjacent to and coplanar with the outer side surface 1126*s*2 of the first member 1126.

In the embodiment, the first coupling grooves 1126*k* and second coupling grooves 1121*m* and 1122*m* may be provided as a plurality of first coupling grooves 1126*k* and a plurality of second coupling grooves 1121*m*, and the plurality of first coupling grooves 1126*k* and the plurality of second coupling grooves 1121*m* and 1122*m* may be symmetrically positioned with respect to the first direction or the second direction.

In addition, a bonding member may be applied on the first coupling grooves 1126*k* and the second coupling grooves 1121*m* and 1122*m*. That is, the bonding member may be applied between the first housing side portion (or the second housing side portion) and the first member 1126 to improve a coupling force between the housing 1120 and the first member 1126. The bonding member may include an epoxy or the like but is not limited to the material.

In addition, the first member 1126 may further include a first protruding portion and a second protruding portion. The first protruding portion may be in contact with the first housing side portion, and the second protruding portion may be in contact with the second housing side portion. The first protruding portion may extend from one end portion of the outer side surface 1126*s*2 of the first member in the third direction (Z-axis direction). The second protruding portion may extend from the other end portion of the outer side surface 1126*s*2 of the first member in the third direction (Z-axis direction). That is, the first protruding portion and the second protruding portion may extend toward the holder.

A position of the first protruding portion may be maintained by the first stopper 1121*b*, and a position of the second protruding portion may be maintained by the second stopper 1122*b*. Accordingly, the reliability of the camera actuator according to the embodiment can be improved.

Figure 7:
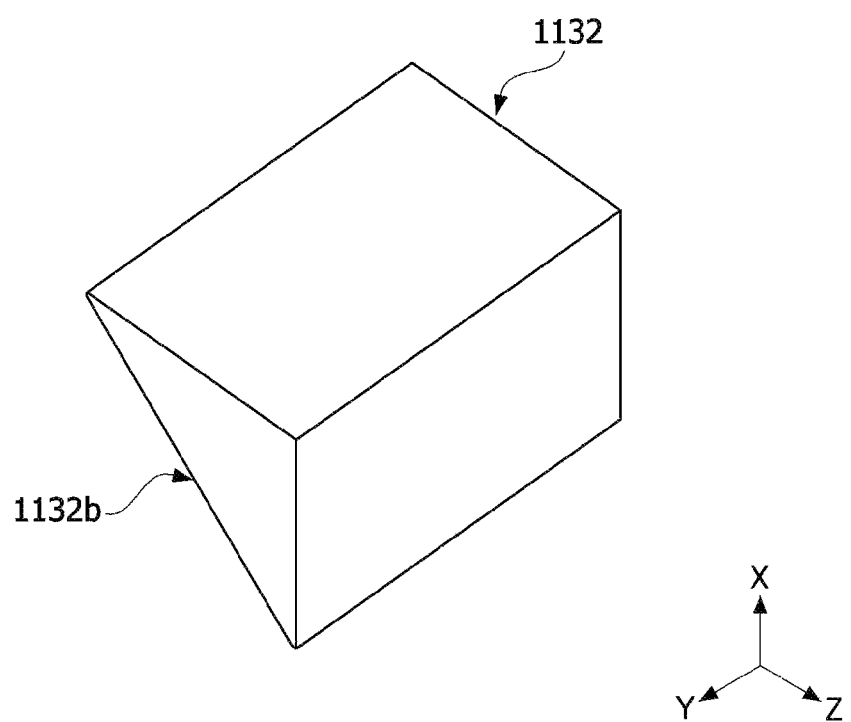
FIG. 7 is a perspective view illustrating an optical member of the first camera actuator according to the embodiment.

FIG. 7 is a perspective view illustrating the optical member of the first camera actuator according to the embodiment.

Referring to FIG. 7, the optical member 1132 may be seated in the holder. The optical member 1132 may be a right-angled prism as a reflecting part but is not limited thereto.

In the embodiment, the optical member 1132 may include a protruding portion (not shown) on a part of an outer side surface thereof. The optical member 1132 may be easily coupled to the holder using the protruding portion (not shown). In addition, the holder may also include a groove or protrusion to be coupled to the optical member 1132.

In addition, a lower surface 1132*b* of the optical member 1132 may be seated on the seating surface of the holder. Accordingly, the lower surface 1132*b* of the optical member 1132 may correspond to the seating surface of the holder. In the embodiment, the lower surface 1132*b* may be formed as an inclined surface like the seating surface of the holder. Accordingly, the prism may move according to movement of the holder, and the optical member 1132 may be inhibited from being separated from the holder according to the movement at the same time.

In addition, a groove may be formed in the lower surface 1132*b* of the optical member 1132, and a bonding member may be applied in the groove, and thus the optical member 1132 may be coupled to the holder. Alternatively, a bonding member may be applied to a groove or protrusion of the holder, and the holder may be coupled to the optical member 1132. The optical member 1132 and the holder may have various shapes to be coupled to each other.

In addition, as described above, the optical member 1132 may be formed as a structure capable of reflecting light reflected from the outside (for example, an object) into the camera module. Like the embodiment, the optical member 1132 may also be formed as a single mirror. In addition, the optical member 1132 may solve a spatial limitation of the first camera actuator and the second camera actuator by changing a path of reflected light. Accordingly, it should be understood that the camera module can provide a wide range of magnification by extending an optical path while minimizing the thickness of the camera module. In addition, it should be understood that the camera module including the camera actuator according to the embodiment can also provide a wide range of magnification by extending an optical path while minimizing a thickness.

Figure 8A:
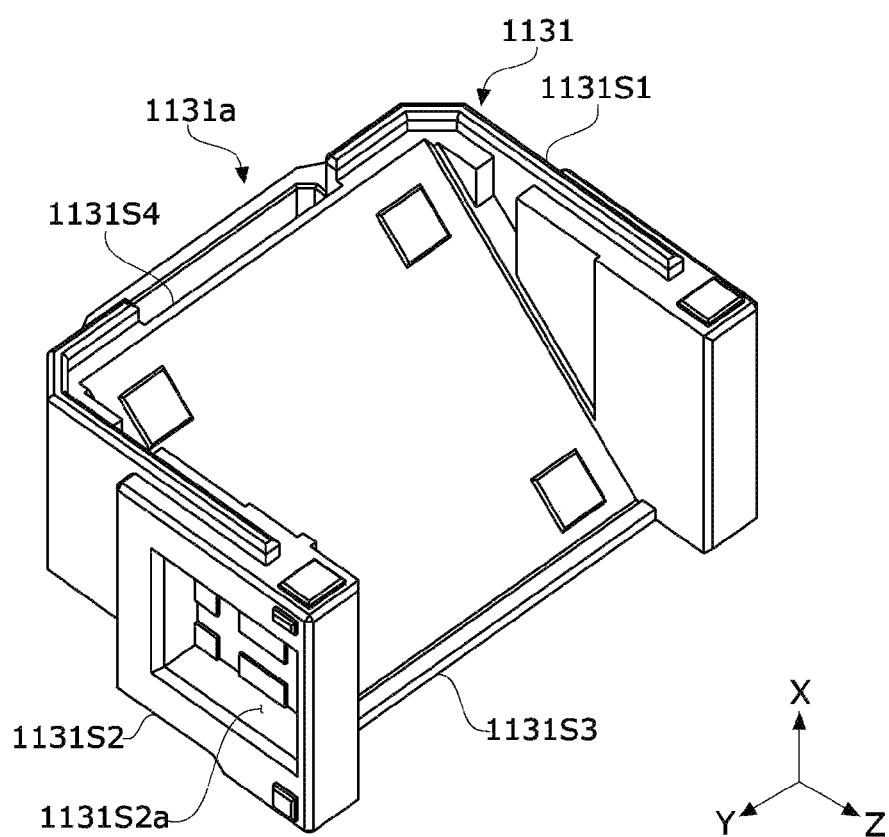
FIG. 8A is a perspective view illustrating a holder of the first camera actuator according to the embodiment.
Figure 8B:
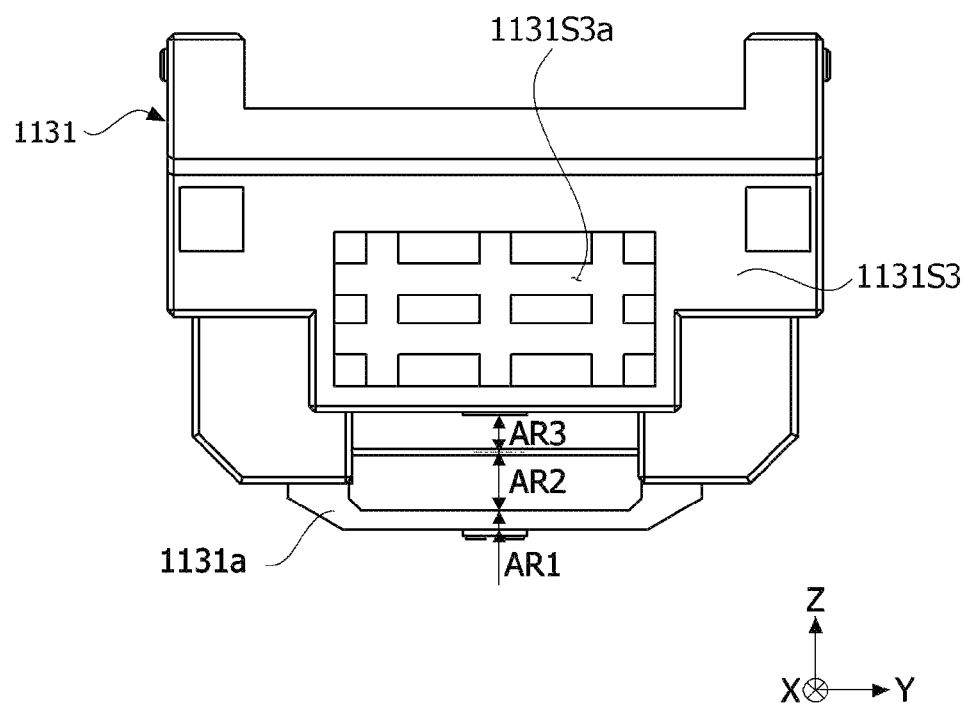
FIG. 8B is a bottom view illustrating the holder of the first camera actuator according to the embodiment.
Figure 8C:
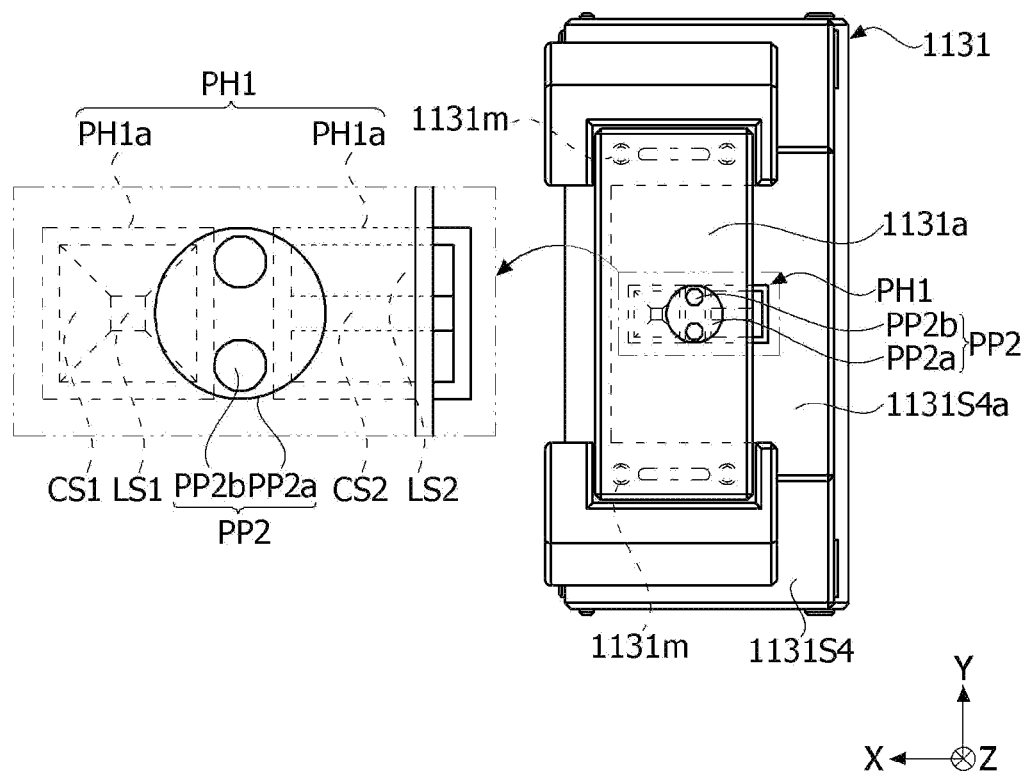
FIG. 8C is a front view illustrating the holder of the first camera actuator according to the embodiment.
Figure 8D:
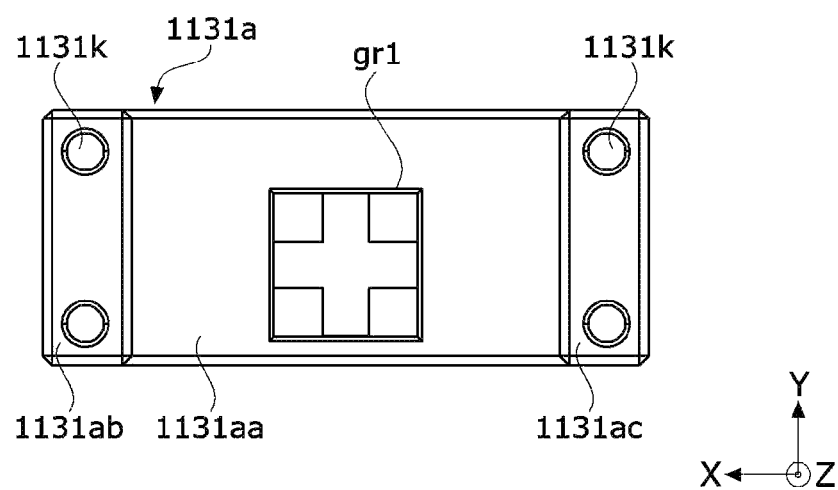
FIG. 8D is a rear view illustrating a second member of the first camera actuator according to the embodiment.
Figure 8E:
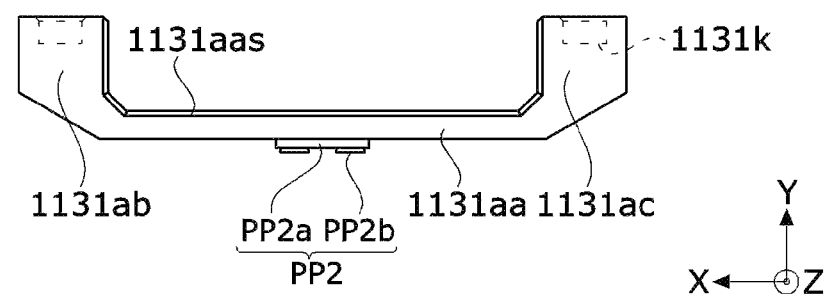
FIG. 8E is a bottom view illustrating the second member of the first camera actuator according to the embodiment.

FIG. 8A is a perspective view illustrating the holder of the first camera actuator according to the embodiment, FIG. 8B is a bottom view illustrating the holder of the first camera actuator according to the embodiment, and FIG. 8C is a front view illustrating the holder of the first camera actuator according to the embodiment. FIG. 8D is a rear view illustrating the second member of the first camera actuator according to the embodiment, and FIG. 8E is a bottom view illustrating the second member of the first camera actuator according to the embodiment.

Referring to FIGS. 8A to 8E, the holder 1131 may include a seating surface 1131k on which the optical member 1132 is seated. The seating surface 1131k may be an inclined surface. In addition, the holder 1131 may include a step portion on the seating surface 1131k. In addition, the step portion in the holder 1131 may be coupled to the protruding portion (not shown) of the optical member 1132.

The holder 1131 may include a plurality of outer side surfaces. For example, the holder 1131 may include a first holder outer side surface 1131S 1, a second holder outer side surface 1131S2, a third holder outer side surface 1131S3, and a fourth holder outer side surface 1131S4.

The first holder outer side surface 1131S1 may be positioned to face the second holder outer side surface 1131S2. That is, the first holder outer side surface 1131S1 and the second holder outer side surface 1131S2 may be symmetrically disposed with respect to the first direction (X-axis direction). The first holder outer side surface 1131S1 may be a first side surface. In addition, the second holder outer side surface 1131S2, which will be described below, may be a second side surface.

The first holder outer side surface 1131S1 may be positioned to correspond to the first housing side portion. That is, the first holder outer side surface 1131S1 may be positioned to face the first housing side portion. In addition, the second holder outer side surface 1131S2 may be positioned to correspond to the second housing side portion. That is, the second holder outer side surface 1131S2 may be positioned to face the second housing side portion.

In addition, the first holder outer side surface 1131S1 may include a first seating groove 1131S1a. In addition, the second holder outer side surface 1131S2 may include a second seating groove 1131S2a. The first seating groove 1131S1a and the second seating groove 1131S2a may be symmetrically disposed with respect to the first direction (X-axis direction).

In addition, the first seating groove 1131S1a and the second seating groove 1131S2a may be disposed to overlap in the second direction (Y-axis direction). In addition, a first magnet 1151a may be disposed in the first seating groove 1131S1a, and a dummy member DM may be disposed in the second seating groove 1131S2a. The first magnet 1151a and the dummy member DM may also be symmetrically disposed with respect to the first direction (X-axis direction). In the present specification, it should be understood that the first magnet and a second magnet can be coupled to the housing using yokes or a bonding member.

As described above, an electromagnetic force induced by the first magnet of the first seating groove 1131S1a may be provided to the holder 1131.

According to the embodiment, a weight of the first magnet of the first seating groove 1131S1a and a weight of the dummy member DM of the second seating groove 1131S2a may have the same weight. Accordingly, even when X-axis tilting of the holder 1131 is performed by the electromagnetic force generated by the first magnet, inclination to one side due to imbalance of weight can be inhibited. Accordingly, the X-axis tilting can be accurately performed.

The third holder outer side surface 1131S3 may be in contact with the first holder outer side surface 1131S1 and the second holder outer side surface 1131S2 and may be an outer side surface extending from one side of the first holder outer side surface 1131S1 and one side of the second holder outer side surface 1131S2 in the second direction (Y-axis direction). In addition, the third holder outer side surface 1131S3 may be positioned between the first holder outer side surface 1131S1 and the second holder outer side surface 1131S2. The third holder outer side surface 1131S3 may be a lower surface in the holder 1131. That is, the third holder outer side surface 1131S3 may be positioned to face the third housing side portion.

In addition, the third holder outer side surface 1131S3 may include a third seating groove 1131S3a. A second magnet 1151b may be disposed in the third seating groove 1131S3a. The third holder outer side surface 1131S3 may be positioned to face the third housing side portion 1123.

In addition, at least a part of the third housing hole 1123a may overlap the third seating groove 1131S3a in the first direction (X-axis direction). Accordingly, the second magnet 1151b in the third seating groove 1131S3a and a second coil 1152b in the third housing hole 1123a may be positioned to face each other. In addition, the second magnet 1151b and the second coil 1152b may generate an electromagnetic force so that the first camera actuator may perform Y-axis tilting.

In addition, X-axis tilting may be performed by the first magnet, and Y-axis tilting may be performed by only the second magnet.

In the embodiment, the third seating groove 1131S3a may be the same as the first seating groove 1131S1a or the second seating groove 1131S2a. By using such a structure, Y-axis tilting can be performed by current control like X-axis tilting.

The fourth holder outer side surface 1131S4 may be in contact with the first holder outer side surface 1131S1 and the second holder outer side surface 1131S2 and may be an outer side surface extending from the first holder outer side surface 1131S1 and the second holder outer side surface 1131S2 in the first direction (X-axis direction). In addition, the fourth holder outer side surface 1131S4 may be positioned between the first holder outer side surface 1131S1 and the second holder outer side surface 1131S2. That is, the fourth holder outer side surface 1131S4 may be positioned to face the first member.

The fourth holder outer side surface 1131S4 may include a fourth seating groove 1131S4a. The tilting guide unit 1141 may be positioned in the fourth seating groove 1131S4a. In addition, the second member 1131a and the first member 1126 may be positioned in the fourth seating groove 1131S4a. In addition, the fourth seating groove 1131S4a may include a plurality of regions. The fourth seating groove 1131S4a may include a first region AR1, a second region AR2, and a third region AR3.

The second member 1131a may be positioned in the first region AR1. That is, the first region AR1 may overlap the second member 1131a in the first direction (X-axis direction). Particularly, the first region AR1 may be a region in which the member base portion of the second member 1131a is positioned. In this case, the first region AR1 may be positioned on the fourth holder outer side surface 1131S4. That is, the first region AR1 may correspond to a region positioned above the fourth seating groove 1131S4a. In this case, the first region AR1 may not be one region in the fourth seating groove 1131S4a.

The first member 1126 may be positioned in the second region AR2. That is, the second region AR2 may overlap the first member 1126 in the first direction (X-axis direction).

In addition, the second region AR2 may be positioned on the fourth holder outer side surface 1131S4 like the first region. That is, the second region AR2 may correspond to a region positioned in an upper portion of the fourth seating groove 1131S4a.

The tilting guide unit may be positioned in the third region AR3. Particularly, a base of the tilting guide unit may be positioned in the third region AR3. That is, the third region AR3 may overlap the tilting guide unit (for example, the base) in the first direction (X-axis direction).

In addition, the second region AR2 may be positioned between the first region AR1 and the third region AR3.

In addition, the second member may be disposed in the first region AR1, and the second member 1131a may include a first groove gr1. In the embodiment, the second member 1131a may include the first groove gr1 formed in an inner side surface 1131aas. In addition, the magnetic member may be disposed in the first groove gr1 as described above.

In addition, the first member may be disposed in the second region AR2 as described above. The first groove gr1 may be positioned to face the second groove gr2. For example, at least a part of the first groove gr1 may overlap the second groove gr2 in the third direction (Z-axis direction). In addition, as described above, a repulsive force generated by the magnetic members disposed in the first and second grooves may be transmitted to the fourth seating groove 1131S4a of the holder 1131 through the second member. Accordingly, the holder may apply a force to the tilting guide unit in a direction the same as that of the repulsive force generated by the magnetic members. In conjunction with the pre-load of the elastic member, the applied force may firmly maintain coupling between the mover, the housing, and the tilting guide unit. Accordingly, the reliability of the camera module against an external impact and the like can be improved.

The first member may include the second groove gr2 facing the first groove gr1 formed in the outer side surface. In addition, the first member may include the second protrusion grooves formed in the inner side surface as described above. In addition, the second protruding portions may be seated in the second protrusion grooves. The tilting guide unit 1141 may be disposed in the third region AR3. In addition, first protrusion grooves PH1 may be positioned in the fourth seating groove 1131S4a. In addition, the first protruding portions of the tilting guide unit 1141 may be accommodated in the first protrusion grooves PH1. Accordingly, first protruding portions PR1 may be in contact with the first protrusion grooves. A maximum diameter of each of the first protrusion grooves PH1 may correspond to a maximum diameter of each of the first protruding portions PR1. This may be equally applied to the second protrusion grooves and second protruding portions PR2. That is, a maximum diameter of each of the second protrusion grooves may correspond to a maximum diameter of each of the second protruding portions PR2. Accordingly, the second protruding portions may be in contact with the second protrusion grooves. By using such a structure, first axis tilting can be easily performed based on the first protruding portions, second axis tilting can be easily performed based on the second protruding portions, and radii of a tilt can be extended.

In addition, in the embodiment, the first protrusion groove PH1 may be provided as a plurality of first protrusion grooves PH1. For example, any one of the first protrusion grooves PH1 and the second protrusion grooves PH2 may include a 1-1 protrusion groove PH1a and a 1-2 protrusion groove PH1b. Hereinafter, the present invention will be described that the first protrusion grooves PH1 includes the 1-1 protrusion groove PH1a and the 1-2 protrusion groove PH1b. In addition, the following description may be equally applied to the second protrusion grooves PH2. For example, the second protrusion grooves PH2 may include a 2-1 protrusion groove and a 2-2 protrusion groove, a description of the 1-1 protrusion groove may be applied to the 2-1 protrusion groove, and a description of the 1-2 protrusion groove may be applied to the 2-2 protrusion groove.

The 1-1 protrusion groove PH1a and the 1-2 protrusion groove PH1b may be disposed in parallel in the first direction (X-axis direction). A maximum area of the 1-1 protrusion groove PH1a may be the same as that of the 1-2 protrusion groove PH1b.

The numbers of inclined surfaces of the plurality of first protrusion grooves PH1 may be different. For example, the first protrusion grooves PH1 may include groove lower surfaces and inclined surfaces. In this case, the numbers of the inclined surfaces of the plurality of protrusion grooves may be different. In addition, areas of the lower surfaces of the protrusion grooves may also be different.

For example, the 1-1 protrusion groove PH1a may include a first groove lower surface LS1 and first inclined surfaces CS1. The 1-2 protrusion groove PH1b may include second groove lower surfaces LS2 and a second inclined surfaces CS2.

In this case, an area of the first groove lower surface LS1 may be different from an area of each of the second groove lower surfaces LS2. The area of each of the first groove lower surfaces LS1 may be smaller than the area of the second groove lower surface LS2.

In addition, the number of the first inclined surfaces CS1 in contact with the first groove lower surface LS1 may be different from the number of the second inclined surface CS2. For example, the number of the first inclined surfaces CS1 may be greater than the number of the second inclined surface CS2.

Using such a structure, an assembly tolerance of the first protruding portions seated in the first protrusion grooves PH1 can be easily compensated for. For example, since the number of the first inclined surfaces CS1 is greater than the number of the second inclined surface CS2, the first protruding portion may be in contact with the larger number of the inclined surfaces, and thus the position of the first protruding portion can be more accurately maintained in the 1-1 protrusion groove PH1a.

Unlike this, since the number of inclined surfaces in the 1-2 protrusion groove PH1b in contact with the first protruding portion is smaller than that in the 1-1 protrusion groove PH1a, the position of the first protruding portion can be easily adjusted.

In the embodiment, the second inclined surfaces CS2 may be spaced apart from each other in the second direction (Y-axis direction). In addition, the second groove lower surface LS2 may extend in the first direction (X-axis direction), and in a state in which the first protruding portion is in contact with the second inclined surface CS2, the first protruding portion may easily move in the first direction (X-axis direction). That is, in the 1-2 protrusion groove PH1*b*, the position of the first protruding portion can be easily adjusted.

In addition, in the present embodiment, heights of the first region AR1, the second region AR2, and the third region AR3 may be different in the first direction (X-axis direction). In the embodiment, the height of the first region AR1 may be greater than the height of the second region AR2 and the height of the third region AR3 in the first direction (X-axis direction). Accordingly, a step may be positioned between the first region AR1 and the second region AR2.

In addition, the second member 1131*a* may be seated on the fourth holder outer side surface 1131S4. A second coupling part PP2 may be positioned on the outer side surface (for example, a surface opposite to a surface facing the second member) of the second member 1131*a*. The second coupling part PP2 may include a coupling base PP2*a* and second coupling protruding portions PP2*b*. The second coupling part PP2 may be disposed to overlap the first protruding portion, which will be described below, in the first direction (X-axis direction).

The second coupling protruding portion PP2*b* may be provided as a plurality of second coupling protruding portions PP2*b*, and the plurality of second coupling protruding portions PP2*b* may be spaced apart from each other in the second direction (Y-axis direction). In this case, all bisectors between the plurality of second coupling protruding portions PP2*b* may be positioned on top points of the first protruding portions in the first direction (X-axis direction).

In addition, the second member 1131*a* may include the first groove gr1. In other words, the first groove gr1 may be positioned in an inner side surface of a member base portion 1131*aa*. In addition, the above-described magnetic member may be seated in the first groove gr1. In addition, the first groove gr1 may be provided as a plurality of first grooves gr1 according to the number of magnetic members. That is, the number of the first grooves gr1 may correspond to the number of the magnetic members.

In addition, the second member 1131*a* may include the member base portion 1131*aa*, a first extending portion 1131*ab*, and a second extending portion 1131*ac*.

The member base portion 1131*aa* may be positioned at an outermost side of the first camera actuator. The member base portion 1131*aa* may be positioned outside the first member. That is, the first member may be positioned between the member base portion 1131*aa* and the tilting guide unit.

The first extending portion 1131*ab* may extend from an edge of the member base portion 1131*aa* in the third direction (Z-axis direction). That is, the first extending portion 1131*ab* may extend from the member base portion 1131*aa* toward the holder 1131. This may be the same as the second extending portion 1131*ac*. In addition, the second extending portion 1131*ac* may extend from an edge of the member base portion 1131*aa* in the third direction (Z-axis direction). In the embodiment, the first extending portion 1131*ab* and the second extending portion 1131*ac* may be positioned at the edges of the member base portion 1131*aa* in the second direction (Y-axis direction). In addition, the first extending portion 1131*ab* and the second extending portion 1131*ac* may be disposed between the upper member and the lower member.

Accordingly, the second member 1131*a* may have a groove formed by the first extending portion 1131*ab* and the second extending portion 1131*ac*. That is, the groove may be positioned between the first extending portion 1131*ab* and the second extending portion 1131*ac*. Accordingly, the first extending portion 1131*ab* and the second extending portion 1131*ac* may be connected to each other by only the member base portion 1131*aa*.

In addition, since the second member 1131*a* is coupled to the holder and moves when X-axis tilting and Y-axis tilting are performed, a rigidity of the second member 1131*a* may be greater than a rigidity of the first member.

In addition, as described above, the first member according to the embodiment may have the upper member and the lower member to improve the rigidity. By using such a structure, a difference in rigidity between the second member and the first member can decrease. Accordingly, when X-axis tilting or Y-axis tilting of both the second member 1131*a* and the holder 1131 coupled to the second member 1131*a* is performed, an adjacent distance of the second member 1131*a* from the first member may decrease, and the second member 1131*a* may be in contact with the first member. Accordingly, as described above, since the first member has the improved rigidity, the first member can easily serve as a stopper. That is, the reliability of the camera actuator can be improved.

In addition, the difference in rigidity between the first member and the second member decreases, when tilting is performed, damage due to contact can be minimized. That is, the reliability of the camera actuator can be improved.

In addition, the first extending portion 1131*ab* may be spaced apart from the second extending portion 1131*ac* in the second direction (Y-axis direction) to form a separation space. The first member and the tilting guide unit may be seated in the separation space.

In addition, a length of the first extending portion 1131*ab* and a length of the second extending portion 1131*ac* may be the same in the third direction (Z-axis direction. Accordingly, since coupling forces, weights, and the like are balanced, tilting of the holder can be accurately performed without being tilted toward one side.

In addition, the first extending portion 1131*ab* and the second extending portion 1131*ac* may be coupled to the holder. In the present specification, it should be understood that the coupling may be performed between each other by a bonding member in addition to the above-described protrusion and groove structures. In the embodiment, the first extending portion 1131*ab* and the second extending portion 1131*ac* may include third coupling grooves 1131*k* formed in the third direction (Z-axis direction). In addition, coupling protrusions 1131*m* may be positioned in regions of the fourth seating groove 1131S4*a* overlapping the first extending portion 1131*ab* and the second extending portion 1131*ac* in the third direction (Z-axis direction). The coupling protrusions 1131*m* may be positioned to correspond to the third coupling grooves 1131*k*.

For example, a bonding member such as an epoxy may be applied in the third coupling grooves 1131*k*. In addition, coupling protrusions 1131*m* may be inserted into the third coupling grooves 1131*k* of the first extending portion 1131*ab* and the second extending portion 1131*ac*. By using such a structure, the second member 1131*a* and the holder 1131 may be coupled to each other. In addition, due to the coupling, a repulsive force applied to the second member 1131*a* may be transmitted to the holder 1130. However, as described above, it should be understood that positions of the protrusion and groove structures may be changed.

Figure 9A:
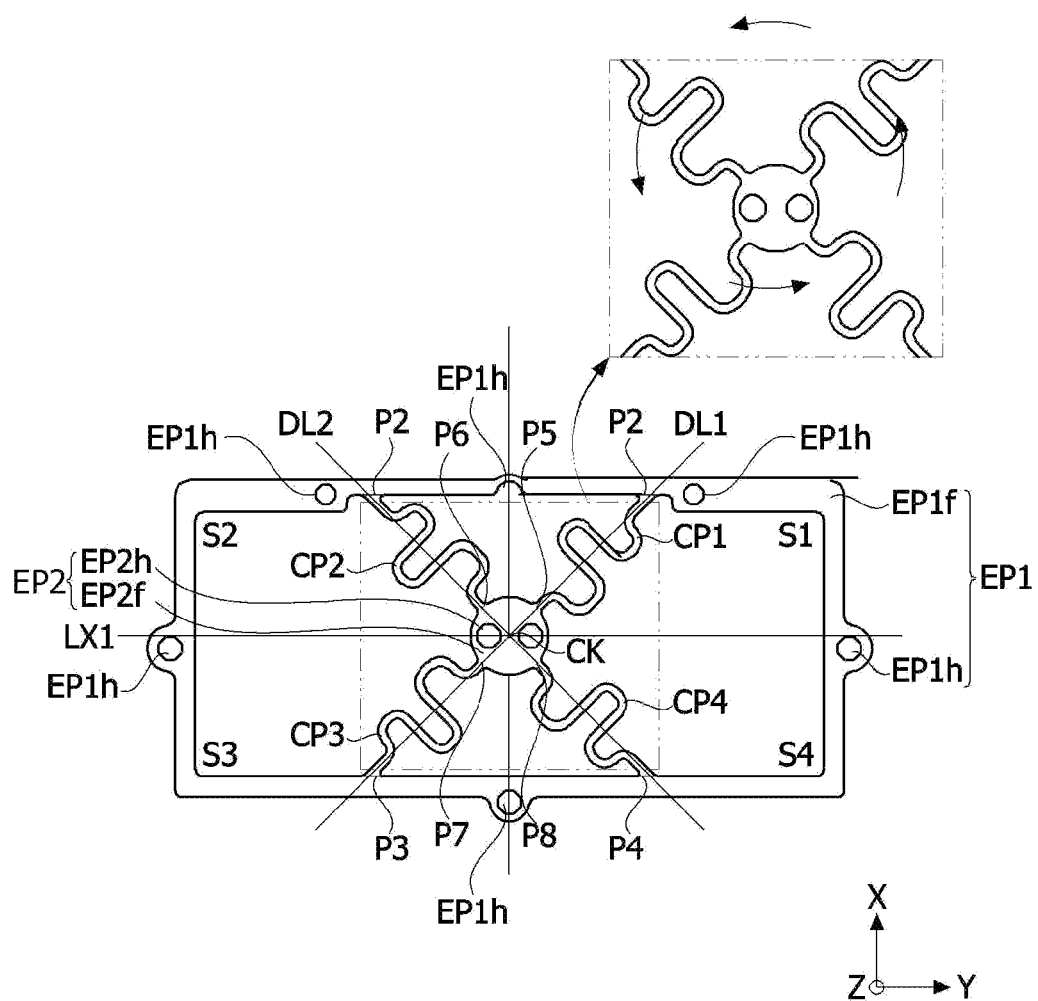
FIG. 9A is a plan view illustrating an elastic member according to the embodiment.
Figure 9B:
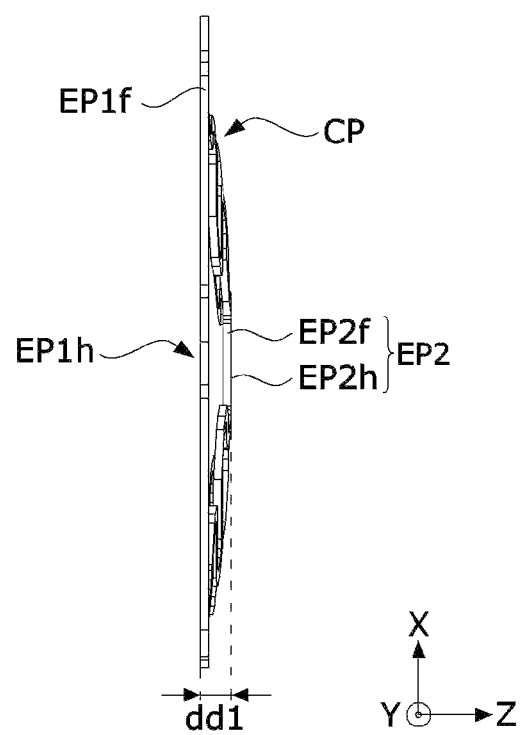
FIG. 9B is a side view illustrating the elastic member according to the embodiment.
Figure 9C:
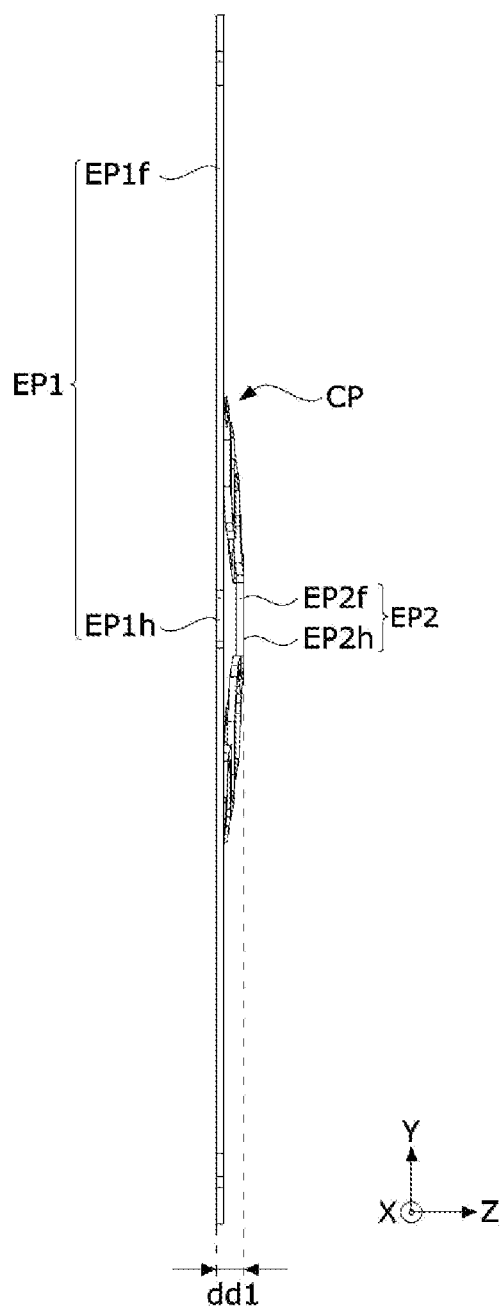
FIG. 9C is a top view illustrating the elastic member according to the embodiment.
Figure 9D:
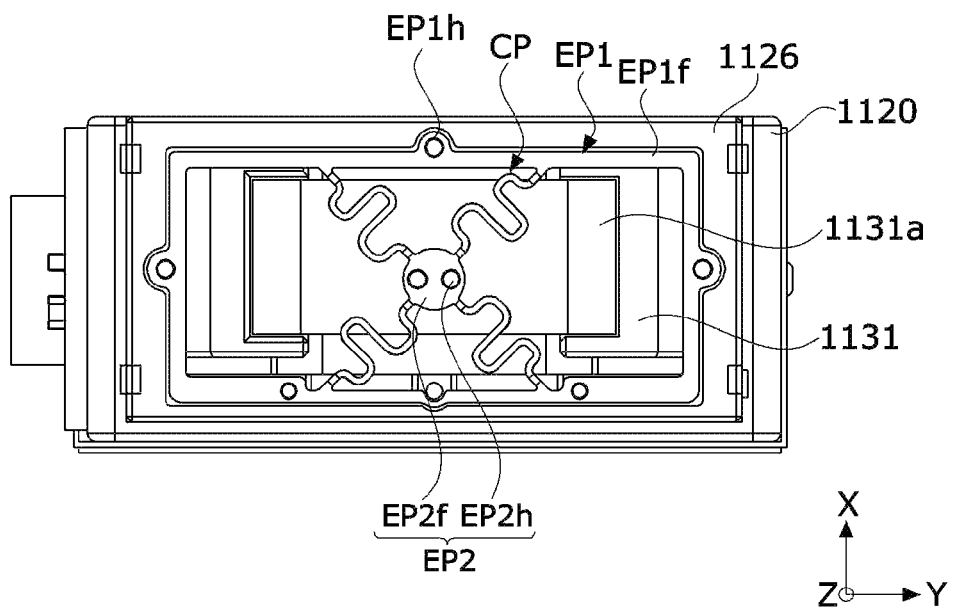
FIG. 9D is a view for describing that a first member, the second member, and the elastic member are coupled in the first camera actuator according to the embodiment.
Figure 9E:
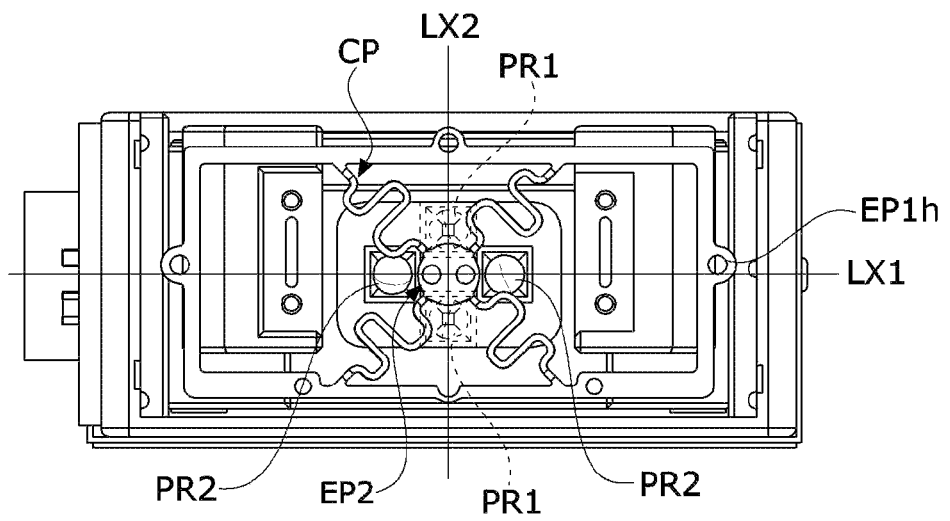
FIG. 9E is a view in which the first member and the second member are removed from the first camera actuator in FIG. 9D.

FIG. 9A is a plan view illustrating the elastic member according to the embodiment, FIG. 9B is a side view illustrating the elastic member according to the embodiment, and FIG. 9C is a top view illustrating the elastic member according to the embodiment. FIG. 9D is a view for describing that the first member, the second member, and the elastic member are coupled in the first camera actuator according to the embodiment, and FIG. 9E is a view in which the first member and the second member are removed from the first camera actuator in FIG. 9D.

Referring to FIGS. 9A to 9C, the elastic member EE according to the embodiment may include a first bonding part EP1, a second bonding part EP2, and connecting parts CP.

In the embodiment, the first bonding part EP1 may be connected to the first housing 1120, and thus the first bonding part EP1 may be coupled to the first housing 1120. That is, in addition, the first bonding part EP1 may be coupled to the fixed member. Alternatively, the first bonding part EP1 may be coupled to the housing 1120 or the first member 1126. Hereinafter, like the drawings, the first bonding part EP1 may be coupled to the first member 1126. Therefore, the first bonding part EP1 may be coupled to the housing 1120.

In addition, the second bonding part EP2 may be coupled to the second member 1131a, and thus the second bonding part EP2 may be coupled to the second member 1131a.

The connecting parts CP may be disposed between the first bonding part EP1 and the second bonding part EP2. That is, one end of each of the connecting parts CP may be connected to the first bonding part EP1, and the other end may be connected to the second bonding part EP2. Specifically, the first bonding part EP1 according to the embodiment may include a first flat region EP1f and a plurality of first bonding holes EP1h positioned in the first flat region EP1f.

The first flat region EP1f may have a rectangular shape. Accordingly, the first flat region EP1f may have a closed loop shape. In addition, the first flat region EP1f may be positioned along an edge of the first member 1126. Accordingly, a coupling force of the first bonding part EP1 with the first member 1126 may be increased, when a pre-load, which will be described below, is generated, the first bonding part EP1 is supported by and coupled to the first member 1126, and thus the reliability of the element can be improved.

The first bonding hole EP1h may be provided as the plurality of first bonding holes EP1h, and the plurality of first bonding holes EP1h may have hole or groove shapes. In addition, the first bonding hole EP1h may be coupled to a protrusion or the like formed on the first member 1126.

In addition, the first bonding holes EP1h may be disposed on a first bisector LX1 or second bisector LX2 or may be symmetrically disposed with respect to the first bisector LX1 or second bisector LX2. Accordingly, since a coupling force generated by the elastic member EE is not concentrated on one side, X-axis tilting or Y-axis tilting can be accurately performed.

In addition, the first bisector LX1 may be a line which bisects the first bonding part EP1 in the first direction (X-axis direction). Alternatively, the first bisector LX1 may be a line which bisects the second bonding part EP2 in the first direction (X-axis direction). In addition, the second bisector LX2 may be a line which bisects the first bonding part EP1 in the second direction (Y-axis direction). Alternatively, the second bisector LX2 may be a line which bisects the second bonding part EP2 in the second direction (Y-axis direction). In addition, an intersection point CK may be a point at which the first bisector LX1 and the second bisector LX2 intersect each other. Hereinafter, the present invention will be described based on this.

The second bonding part EP2 may be positioned inside the first bonding part EP1. Specifically, the second bonding part EP2 may be surrounded by the first bonding part EP1. The term "inside" refers to a direction from the first bonding part EP toward the second bonding part EP2 and corresponds to a direction from the first coupling part toward the second coupling part.

In addition, the second bonding part EP2 may be disposed between the mover 1130 and the first bonding part EP1. Alternatively, the second bonding part EP2 may be disposed between the second member 1131a and the first bonding part EP1. That is, the second bonding part EP2 may be spaced apart from the first bonding part EP1 in the third direction (Z-axis direction).

The connecting parts CP according to the embodiment may extend from the second member 1131a toward the first member 1126 or from the first member 1126 toward the second member 1131a. That is, the connecting parts CP may extend in the third direction (Z-axis direction). For example, the connecting parts CP may be disposed between the first bonding part EP1 and the second bonding part EP2 and may connect the first bonding part EP1 and the second bonding part EP2. Accordingly, since the first bonding part EP1 is a fixed member fixed to the housing (the housing is fixed), an elastic restoring force generated by the elastic member EE may be generated from the second bonding part EP2 toward the first bonding part EP1. Accordingly, the second member 1131a connected to the second bonding part EP2 and the mover 1130 connected to the second member 1131a may also generate forces from the second bonding part EP2 toward the first bonding part EP1. Accordingly, the above-described force may be applied between the mover 1130 and the tilting guide unit 1141. In addition, since the tilting guide unit 1141 ultimately presses the first member 1126, the position of the tilting guide unit 1141 between the mover 1130 and the first member 1126 (or the housing) may be maintained to perform first axis tilting or second axis tilting which will be described below.

In addition, due to a separation distance dd1 between the first bonding part EP1 and the second bonding part EP2 in the third direction (Z-axis direction), the elastic member EE may have the pre-load which is the above-described force.

In addition, the second bonding part EP2 of the elastic member EE may not be disposed on a surface in contact with the first bonding part EP1 of the elastic member EE and one surface of the first member 1126 which is the fixed member. As described above, the first bonding part EP1 and the second bonding part EP2 may be positioned on different planes (XY) and may be spaced apart from each other in the third direction (Z-axis direction). Accordingly, the second bonding part EP2 may be positioned closer to a reflection member than the first bonding part EP1.

In addition, in the embodiment, even when the pre-load is generated in a direction opposite to the third direction (for example, a direction from the tilting guide unit toward the second member), a position of the tilting guide unit 1141 may be easily maintained. In addition, when a magnetic member and the like are not used, a malfunction of another camera actuator (for example, the second camera actuator) adjacent to the first camera actuator due to a magnetic force can be inhibited. In addition, in the first camera actuator according to the embodiment, a magnetic member and the like are not used, the light and thin elastic member is used, and thus miniaturization can be easily achieved. Alternatively, as a modified example, a repulsive force may be generated between magnetic members by arranging the magnetic members having the same polarity in the above-described first groove and second groove. In this case, the generated repulsive force may be transmitted to a fourth seating groove of a holder through a second member. In addition, the holder may apply a force toward a tilting guide unit in a direction which is the same as that of the generated repulsive force. Accordingly, an elastic member can be easily restored by the repulsive force generated by the magnetic members. That is, the reliability of the elastic member can be improved. In addition, since a position of a tilting guide unit 1141 is more easily maintained by the repulsive force, X-axis tilting or Y-axis tilting can be accurately performed.

In the embodiment, the second bonding part EP2 may include a second flat region EP2f and a plurality of second bonding holes EP2h positioned in the second flat region EP2f. The second flat region EP2f may have a circular shape, and may be in contact with the second member 1131a. In addition, the second bonding holes EP2h may be coupled to the second coupling part PP2.

In addition, in the embodiment, the plurality of first bonding holes EP1h may be spaced apart from each other in the first direction (X-axis direction) or the second direction (Y-axis direction). In addition, the second bonding holes EP2h may be spaced apart from each other in the second direction (Y-axis direction).

In addition, the second bonding holes EP2h may be positioned between the adjacent first bonding holes EP1h. For example, the second bonding holes EP2h and the first bonding holes EP1h may be disposed on the first bisector LX1. In addition, the first bonding holes EP1h may also be disposed on the second bisector LX2. Accordingly, in the first camera actuator according to the embodiment, a force applied by the elastic member EE may be uniformly provided to the mover.

In addition, as an amount of a current provided to the first coil is adjusted, X-axis tilting may be performed. That is, since the position of the mover is restored to the initial position by the elastic member EE after driving, the X-axis tilting can be easily performed using only the current applied to the first coil. Accordingly, an energy efficiency of the camera module according to the embodiment can be greatly improved, and the camera module can be easily driven.

In the embodiment, the connecting parts CP may include a first connecting part CP1, a second connecting part CP2, a third connecting part CP3, and a fourth connecting part CP4, which are positioned between the first bonding part EP1 and the second bonding part EP2.

The first connecting part CP1, the second connecting part CP2, the third connecting part CP3, and the fourth connecting part CP4 may be respectively disposed in first to fourth quadrant regions S1 to S4 that are divided by the first bisector LX1 and the second bisector LX2.

The first connecting part CP1, the second connecting part CP2, the third connecting part CP3, and the fourth connecting part CP4 may be sequentially disposed from the first bonding part EP1 to the second bonding part EP2 clockwise or counter-clockwise. Hereinafter, the present invention will be described based on a counter-clockwise direction. For example, the first connecting part CP1, the second connecting part CP2, the third connecting part CP3, and the fourth connecting part CP4 may be respectively positioned in the first quadrant region S1, the second quadrant region S2, the third quadrant region S3, and the fourth quadrant region S4 that are divided by the first bisector LX1 and the second bisector LX2. The first quadrant region S1 to the fourth quadrant region S4 are positioned counter-clockwise.

In addition, each of the first connecting part CP1, the second connecting part CP2, the third connecting part CP3, and the fourth connecting part CP4 may have a bent shape or the like between the first bonding part EP1 and the second bonding part EP2.

Particularly, the first connecting part CP1, the second connecting part CP2, the third connecting part CP3, and the fourth connecting part CP4 according to the embodiment may be disposed counter-clockwise and have the same shape. In other words, the first connecting part CP1 and the third connecting part CP3 may be symmetrical with respect to the first bisector LX1 and the second bisector LX2. In addition, the second connecting part CP2 and the fourth connecting part CP4 may be symmetrical with respect to the first bisector LX1 and the second bisector LX2. By using such a structure, the linearity of a restoring force against X-axis tilting or Y-axis tilting can be improved. For example, when the first connecting part CP1 to the fourth connecting part CP4 are symmetrical with respect to only any one of the first bisector LX1 and the second bisector LX2, a restoring force against X/Y-axis tilting may be unbalanced in one direction. However, in the camera actuator according to the embodiment, since the connecting parts are symmetrical with respect to the first bisector LX1 and the second bisector LX2, such unbalance can be solved.

In the embodiment, the first bonding part EP1 may include a first bonding point P1 to a fourth bonding point P4 in contact with the connecting parts CP. In addition, the second bonding part EP2 may include a fifth bonding point P5 to an eighth bonding point P5 in contact with the connecting parts CP.

The first connecting part CP1 may be in contact with the first bonding point P1 of the first bonding part EP1 and the fifth bonding point P5 of the second bonding part EP2. In addition, the second connecting part CP2 may be in contact with the second bonding point P2 of the first bonding part EP1 and the sixth bonding point P6 of the second bonding part EP2. In addition, the third connecting part CP3 may be in contact with the third bonding point P3 of the first bonding part EP1 and the seventh bonding point P7 of the second bonding part EP2. In addition, the fourth connecting part CP4 may be in contact with the fourth bonding point P1 of the first bonding part EP1 and the eighth bonding point P8 of the second bonding part EP2.

In addition, the first bonding point P1, the fifth bonding point P5, the third bonding point P3, and the seventh bonding point P7 may be disposed on a first virtual line DL1 passing through the intersection point CK. In addition, the second bonding point P2, the sixth bonding point P6, the fourth bonding point P4, and the eighth bonding point P8 may be disposed on a second virtual line DL2 passing through the intersection point CK.

In addition, the first connecting part CP1 may have a structure which extends inward from the first bonding point P1, is bent downward from the first virtual line DL1, extends inward, and protrudes toward a lower portion of the first virtual line DL1. In addition, the first connecting part CP1 may have the structure which extends upward from the first virtual line DL1, is bent, and protrudes toward the first virtual line DL1. In addition, the first connecting part CP1 may have the structure which extends downward from the first virtual line DL1, is bent, and protrudes toward the lower portion the first virtual line DL1 and may be in contact with the fifth bonding point P5 of the bonding part EP2.

The second connecting part CP2 may have a structure which extends inward from the second bonding point P2, is bent upward from the second virtual line DL2, extends inward, and protrudes downward to the second virtual line DL2. In addition, the second connecting part CP2 may have the structure which extends downward from the second virtual line DL2, is bent, and protrudes toward a lower portion of the second virtual line DL2, may have the structure which extends upward from the second virtual line DL2, is bent, and protrudes toward an upper portion of the second virtual line DL2, and may be in contact with the sixth bonding point P6 of the second bonding part EP2.

The third connecting part CP3 may have a structure which extends inward from the third bonding point P3, is bent upward from the first virtual line DL1, extends inward, and protrudes downward to the first virtual line DL1. In addition, the third connecting part CP3 may have the structure which extends downward from the first virtual line DL1, is bent, and protrudes toward the lower portion of the first virtual line DL1, and may have the structure which extends upward from the first virtual line DL1, is bent, and protrudes toward an upper portion of the first virtual line DL1, and may be in contact with the seventh bonding point P7 of the second bonding part EP2.

The fourth connecting part CP4 may have a structure which extends inward from the fourth bonding point P4, is bent downward from the second virtual line DL2, extends inward, and protrudes toward the lower portion of the second virtual line DL2. In addition, the fourth connecting part CP4 may have the structure which extends upward from the second virtual line DL2, is bent, and protrudes toward the upper portion of the second virtual line DL2. In addition, the fourth connecting part CP4 may have the structure which extends downward from the second virtual line DL2, is bent, and protrudes toward the lower portion of the second virtual line DL2 and may be in contact with the eighth bonding point P8 of the second bonding part EP2.

Referring to FIGS. 9D and 9E, in the first camera actuator according to the embodiment, the second bonding part EP2 may overlap the first protruding portions PR1 in the second axis or in the first direction.

In addition, in a base which will be described below, the top points of the first protruding portions PR1 may be disposed on an intermediate axis (corresponding to the second bisector LX2) which bisects the plurality of second bonding holes EP2h. By using such a structure, when second axis tilting is performed by the first protruding portions PR1, a force applied to the tilting guide unit by the elastic member EE may be uniformly generated with respect to the second axis or the first direction.

In addition, the top point of the second protruding portion PR2 may be positioned on the first bisector LX1. That is, the top point of the second protruding portion PR2 may be disposed on the first bisector LX1 which bisects the first bonding holes EP1h. Accordingly, in the camera actuator according to the embodiment, a force pressed by the elastic member EE may be uniformly provided to both an upper portion and a lower portion of the mover.

Figure 10A:
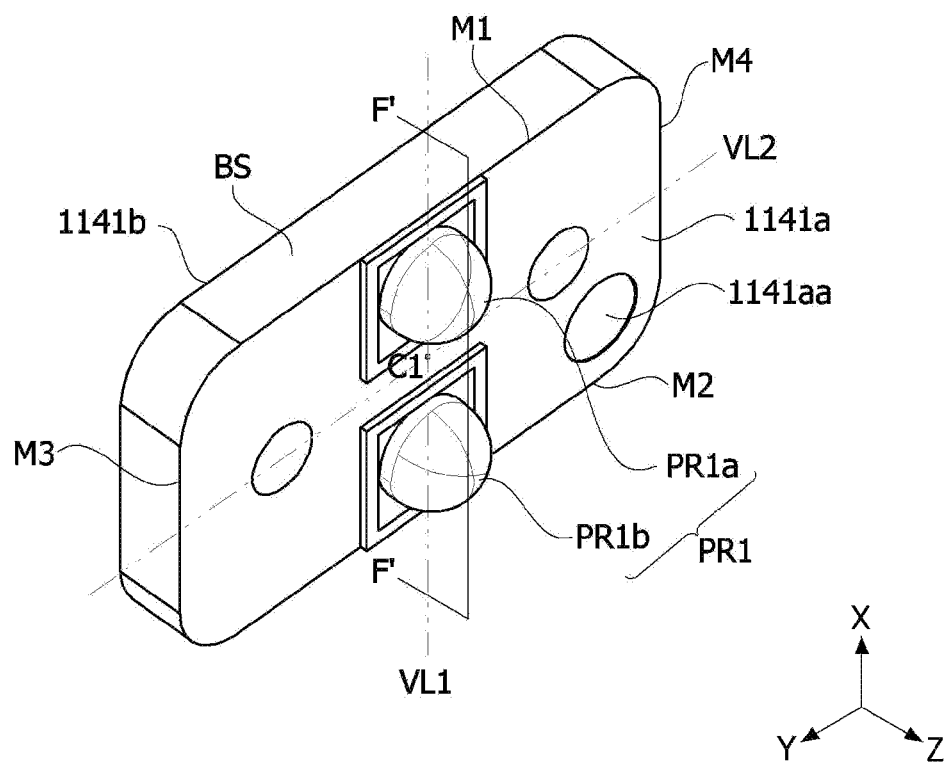
FIG. 10A is a perspective view illustrating a tilting guide unit of the first camera actuator according to the embodiment.
Figure 10B:
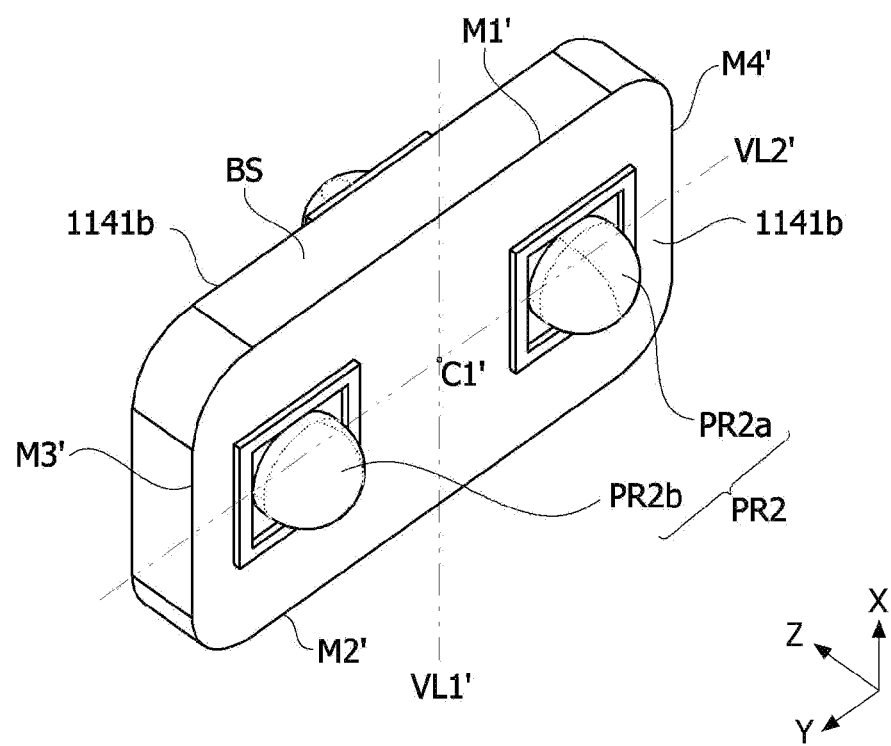
FIG. 10B is a perspective view illustrating the tilting guide unit in a direction different from a direction in FIG. 10A.
Figure 10C:
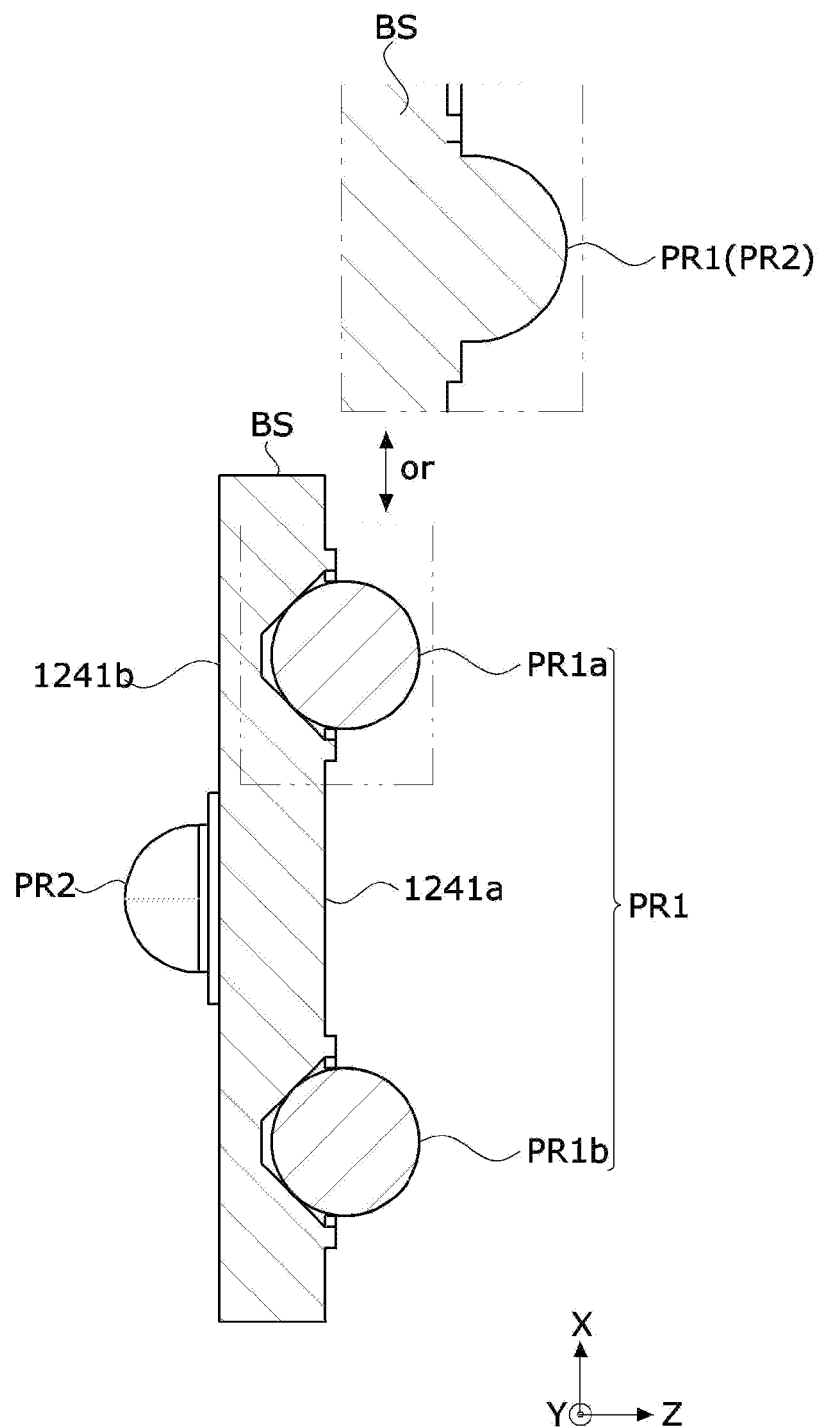
FIG. 10C is a cross-sectional view along line FF' in 10A.

FIG. 10A is a perspective view illustrating the tilting guide unit of the first camera actuator according to the embodiment, FIG. 10B is a perspective view illustrating the tilting guide unit in a direction different from a direction in FIG. 10A, and FIG. 10C is a cross-sectional view along line FF' in 10A.

The tilting guide unit 1141 according to the embodiment may include a base BS, the first protruding portions PR1 protruding from a first surface 1141a of the base BS, and the second protruding portions PR2 protruding from a second surface 1141b of the base BS. In addition, the surfaces on which the first protruding portions and the second protruding portions are formed may be opposite according to the structure, but the present invention will be described with reference to the drawings hereinafter. In addition, the first protruding portions PR1 and the second protruding portions PR2 may be integrally formed with the base BS, and like the drawings, it should be understood that the first protruding portions PR1 and the second protruding portions RP2 may have a spherical shape like a ball.

First, the base BS may include the first surface 1141a and the second surface 1141b opposite to the first surface 1141a. That is, the first surface 1141a may be spaced apart from the second surface 1141b in the third direction (Z-axis direction), and the first surface 1141a and the second surface 1141b may be outer side surfaces which are opposite to or face each other in the tilting guide unit 1141.

The tilting guide unit 1141 may include the first protruding portions PR1 extending from the first surface 1141a toward one side. According to the embodiment, the first protruding portions PR1 may protrude from the first surface 1141a toward the holder. The plurality of first protruding portions PR1 may include a 1-1 protruding portion PR1a and a 1-2 protruding portion PR1b.

The 1-1 protruding portion PR1a and the 1-2 protruding portion PR1b may be positioned in parallel in the first direction (X-axis direction). In other words, the 1-1 protruding portion PR1a and the 1-2 protruding portion PR1b may overlap in the first direction (X-axis direction). In addition, in the embodiment, the 1-1 protruding portion PR1a and the 1-2 protruding portion PR1b may be bisected by a virtual line extending in the first direction (X-axis direction).

In addition, each of the 1-1 protruding portion PR1a and the 1-2 protruding portion PR1b may have a curvature and, for example, a hemispherical shape. In addition, the 1-1 protruding portion PR1a and the 1-2 protruding portion PR1b may be in contact with first grooves of the housing at a point spaced farthest from the first surface 1141a of the base BS.

In addition, an alignment groove 1141aa may be positioned in the first surface 1141a. The alignment groove 1141aa may be disposed at one side in the first surface 1141a and may provide an assembly position or assembly direction of the tilting guide unit 1141 when an assembly process is performed.

In addition, the tilting guide unit 1141 may include the second protruding portions PR2 extending on the second surface 1141a toward one side. According to the embodiment, the second protruding portions PR2 may protrude from the second surface 1141b toward the housing. In addition, the second protruding portion PR2 is provided as the plurality of second protruding portions PR2 and may include a 2-1 protruding portion PR2a and a 2-2 protruding portion PR2b in the embodiment.

The 2-1 protruding portion PR2a and the 2-2 protruding portion PR2b may be positioned in parallel in the second direction (Y-axis direction). That is, the 2-1 protruding portion PR2a and the 2-2 protruding portion PR2b may overlap in the second direction (Y-axis direction). In addition, in the embodiment, the 2-1 protruding portion PR2a and the 2-2 protruding portion PR2b may be bisected by a virtual line extending in the second direction (Y-axis direction).

Each of the 2-1 protruding portion PR2a and the 2-2 protruding portion PR2b may have a curvature and, for example, a hemispherical shape. In addition, the 2-1 protruding portion PR2a and the 2-2 protruding portion PR2b may be in contact with the second member 1131a at a point spaced apart from the second surface 1141b of the base BS.

The 1-1 protruding portion PR1a and the 1-2 protruding portion PR1b may be positioned in a region between the 2-1 protruding portion PR2a and the 2-2 protruding portion PR2b in the second direction. According to the embodiment, the 1-1 protruding portion PR1a and the 1-2 protruding portion PR1b may be positioned in a central region of a separation space between the 2-1 protruding portion PR2a and the 2-2 protruding portion PR2b in the second direction. By using such a structure, the actuator according to the embodiment may allow an angle of an X-axis tilt to have the same range about the X-axis. In other words, the tilting guide unit 1141 may allow the holder to provide the same range (for example, a plus/minus range), within which X-axis tilting may be performed, about the X-axis based on the 1-1 protruding portion PR1a and the 1-2 protruding portion PR1b.

In addition, the 2-1 protruding portion PR2a and the 2-2 protruding portion PR2b may be positioned in a region between the 1-1 protruding portion PR1a and the 1-2 protruding portion PR1b in the first direction. According to the embodiment, the 2-1 protruding portion PR2a and the 2-2 protruding portion PR2b may be positioned in a central portion of a separation space between the 1-1 protruding portion PR1a and the 1-2 protruding portion PR1b in the first direction. By using such a structure, the actuator according to the embodiment may allow an angle of a Y-axis tilt to have the same range about the Y-axis. In other words, the tilting guide unit 1141 and the holder may provide the same range (for example, a plus/minus range) within which Y-axis tilting is performed about the Y-axis based on the 2-1 protruding portion PR2a and the 2-2 protruding portion PR2b.

Specifically, the first surface 1141a may include a first outer side line M1, a second outer side line M2, a third outer side line M3, and a fourth outer side line M4. The first outer side line M1 and the second outer side line M2 may face each other, and the third outer side line M3 and the fourth outer side line M4 may face each other. In addition, the third outer side line M3 and the fourth outer side line M4 may be positioned between the first outer side line M1 and the second outer side line M2. In addition, the first outer side line M1 and the second outer side line M2 are perpendicular to the first direction (X-axis direction), and the third outer side line M3 and the fourth outer side line M4 may be in parallel in the first direction (X-axis direction).

In this case, the first protruding portions PR1 may be positioned on a first virtual line VL1. In this case, the first virtual line LV1 is a line which bisects the first outer side line M1 and the second outer side line M2. Alternatively, first and third virtual lines LV1 and LV1' are lines which bisect the base BS in the second direction (Y-axis direction). Accordingly, the tilting guide unit 1141 may easily perform X-axis tilting using the first protruding portions PR1. In addition, since the tilting guide unit 1141 performs the X-axis tilting about the first virtual line VL1, a rotational force may be uniformly applied to the tilting guide unit 1141. Accordingly, the X-axis tilting can be delicately performed, and the reliability of the element can be improved.

In addition, the 1-1 protruding portion PR1a and the 1-2 protruding portion PR1b may be symmetrically disposed with respect to the first virtual line VL1 and the second virtual line VL2. Alternatively, the 1-1 protruding portion PR1a and the 1-2 protruding portion PR1b may be symmetrically positioned with respect to a first central point C1. By using such a structure, when X-axis tilting is performed, a support force supported by the first protruding portions PR1 may be uniformly applied to an upper side and a lower side with respect to the second virtual line VL2. Accordingly, the reliability of the tilting guide unit can be improved. In this case, the second virtual line VL2 is a line which bisects the third outer side line M3 and the fourth outer side line M4. Alternatively, second and fourth virtual lines LV2 and LV2' are lines which bisect the base BS in the first direction (X-axis direction).

In addition, the first central point C1 may be an intersection point of the first virtual line VL1 and the second virtual line VL2. Alternatively, the first central point C1 may be a point corresponding to a center of gravity according to a shape of the tilting guide unit 1141.

In addition, the second surface 1141b may include a fifth outer side line M1', a sixth outer side line M2', a seventh outer side line M3', and an eighth outer side line M4'. The fifth outer side line M1' and the sixth outer side line M2' may face each other, and the seventh outer side line M3' and the eighth outer side line M4' may face each other. In addition, the seventh outer side line M3' and the eighth outer side line M4' may be positioned between the fifth outer side line M1' and the sixth outer side line M2'. In addition, the fifth outer side line M1' and the sixth outer side line M2' are perpendicular to the first direction (X-axis direction), and the seventh outer side line M3' and the eighth outer side line M4' may be in parallel in the first direction (X-axis direction).

In addition, since the tilting guide unit 1141 performs Y-axis tilting about the fourth virtual line VL2', a rotational force can be uniformly applied to the tilting guide unit 1141. Accordingly, the Y-axis tilting can be delicately performed, and the reliability of the element can be improved.

In addition, the 2-1 protruding portion PR2a and 2-2 protruding portion PR2b may be disposed on the fourth virtual line VL2' to be symmetrical with respect to the third virtual line VL1'. Alternatively, the 2-1 protruding portion PR2a and the 2-2 protruding portion PR2b may be symmetrically positioned with respect to a second central point C1'. By using such a structure, when the Y-axis tilting is performed, the same support force supported by the second protruding portions PR2 can be applied to an upper side and a lower side of the tilting guide unit with respect to the fourth virtual line VL2'. Accordingly, the reliability of the tilting guide unit can be improved. In this case, the third virtual line LV1' is a line which bisects the fifth outer side line M1' and the sixth outer side line M2'. In addition, the second central point C1' may be an intersection point of the third virtual line VL1' and the fourth virtual line VL2'. Alternatively, the second central point C1' may also be a point corresponding to the center of gravity according to the shape of the tilting guide unit 1141.

In addition, a distance DR2 between the 1-1 protruding portion PR1a and the 1-2 protruding portion PR1b in the first direction (X-axis direction) may be greater than a length of each of the second protruding portions PR2 in the first direction (X-axis direction). Accordingly, when X-axis tilting is performed based on the 1-1 protruding portion PR1a and the 1-2 protruding portion PR1b, a resistance due to the second protruding portions PR2 can be minimized.

In correspondence to this, a distance ML2 between the 2-1 protruding portion PR2a and the 2-2 protruding portion PR2b in the second direction (Y-axis direction) may be greater than a length of each of the first protruding portions PR1 in the second direction (Y-axis direction). Accordingly, when the Y-axis tilting is performed based on the 2-1 protruding portion PR2a and the 2-2 protruding portion PR2b, a resistance due to the first protruding portions PR1 can be minimized.

Figure 11:
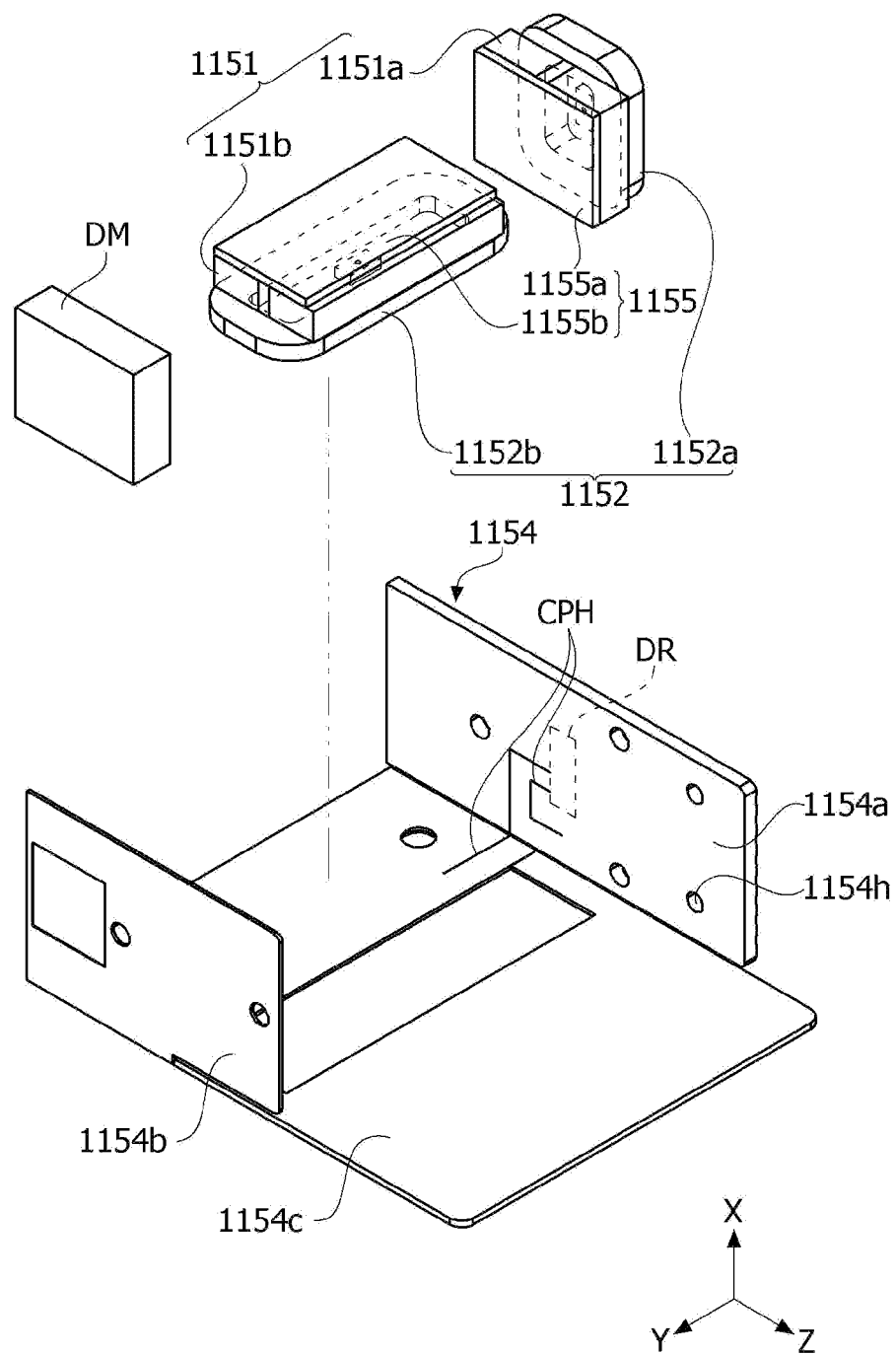
FIG. 11 is a view illustrating a first driving unit of the first camera actuator according to the embodiment.

FIG. 11 is a view illustrating the first driving unit of the first camera actuator according to the embodiment.

Referring to FIG. 11, the first driving unit 1150 may include the driving magnets 1151, the driving coils 1152, the Hall sensor units 1153, the first substrate part 1154, and the yoke parts 1155.

In addition, as described above, the driving magnets 1151 may include the first magnet 1151a and the second magnet 1151b which provide a driving force due to an electromagnetic force. The first magnet 1151a and the second magnet 1151b may be positioned on the outer side surfaces of the holder 1131.

In addition, as described above, although it is described that the dummy member DM is included in the driving unit 1150 in the drawings, it should be understood that the dummy member DM may also be a separate member. That is, since the dummy member DM is not disposed opposite to a coil, an electromagnetic force is not generated, and thus the dummy member DM is not a driving source which generates a driving force for performing tilting with respect to a predetermined direction, for example, Y-axis tilting. However, the dummy member DM may be seated on the outer side surface of the holder and symmetrically positioned with the first magnet 1151a in the first direction or the second direction. In addition, a weight of the dummy member DM may be the same as a weight of the first magnet 1151a. Accordingly, the dummy member DM may compensate for the weight of the first magnet 1151a in the holder and inhibit the weight from being concentrated on the first magnet 1151a when the holder rotates in the second direction (Y-axis direction). In other words, the dummy member DM may improve accuracy of a Y-axis tilt of the holder 1131. In addition, due to the dummy member DM, since a coil is not disposed at a position symmetrical with a first coil 1152a in the first direction and the second direction, a current efficiency for the Y-axis tilt can be improved. In addition, since a total weight of the first camera actuator according to the embodiment decreases, weight reduction can be achieved.

In addition, the driving coil 1152 may include a plurality of coils. In the embodiment, the driving coils 1152 may include the first coil 1152a and the second coil 1152c.

The first coil 1152a may be positioned opposite to the first magnet 1151a. Accordingly, as described above, the first coil 1152a may be positioned in the first housing hole 1121a of the first housing side portion 1121.

In addition, since the second housing hole 1122a of the second housing side portion 1122 is open, a weight of the first camera actuator may decrease. The open portion may be positioned opposite to the dummy member DM.

In addition, the first camera actuator according to the embodiment can minimize an occurrence of a decentering or tilting phenomenon to provide best optical characteristics when OIS is performed by controlling the mover 1130 to rotate about the first axis (X-axis direction) or second axis (Y-axis direction) using an electromagnetic force between the driving magnets 1151 and the driving coils 1152.

In addition, according to the embodiment, a size limitation of the actuator can be solved to provide an ultra-slim and ultra-small camera actuator and a camera module including the same by implementing the OIS using the tilting guide unit 1141 of the rotation part 1140 disposed between the first housing 1120 and the mover 1130.

The first substrate part 1154 may include a first substrate side portion 1154a, a second substrate side portion 1154b, and a third substrate side portion 1154c.

The first substrate side portion 1154a and the second substrate side portion 1154b may be disposed to face each other. In addition, the third substrate side portion 1154c may be positioned between the first substrate side portion 1154a and the second substrate side portion 1154b.

In addition, the first substrate side portion 1154a may be positioned between the first housing side portion and the shield can, and the second substrate side portion 1154b may be positioned between the second housing side portion and the shield can. In addition, the third substrate side portion 1154c may be positioned between the third housing side portion and the shield can and may be a lower surface of the first substrate part 1154.

The first substrate side portion 1154a may be coupled and electrically connected to the first coil 1152a. In addition, the first substrate side portion 1154a may be coupled and electrically connected to a first Hall sensor 1153a.

The second substrate side portion 1154b may be a dummy substrate.

In addition, the third substrate side portion 1154c may be coupled and electrically connected to the second coil 1152c. In addition, the third substrate side portion 1154c may be coupled and electrically connected to a second Hall sensor 1153b.

Accordingly, in the first camera actuator according to the embodiment, since electrical connection to the second substrate side portion 1154b is not required, an electrical path CPH may be formed on only the first substrate side portion 1154a and the third substrate side portion 1154c. Accordingly, a length for electrical connection can decrease to decrease an electrical resistance. That is, a current efficiency can be improved.

In addition, a driver dR which controls an amount of current applied to the first coil, the second coil, or the like may also be disposed on any one of the first substrate side portion 1154a and the third substrate side portion 1154b. Accordingly, the electrical path can be minimized to minimize the electrical resistance.

In addition, the yoke parts 1155 may include a first yoke 1155a and a second yoke 1155b. The first yoke 1155a may be positioned in the first seating groove and coupled to the first magnet 1151a. In addition, the second yoke 1155b may be positioned in the third seating groove and coupled to the second magnet 1151b. In addition, a dummy yoke may be positioned in the second seating groove and coupled to the dummy member DM. The first yoke 1155a and the second yoke 1155b allow the first magnet 1151a and the second magnet 1151b to be easily seated in the first seating groove and the third seating groove and to be coupled to the housing.

Figure 12A:
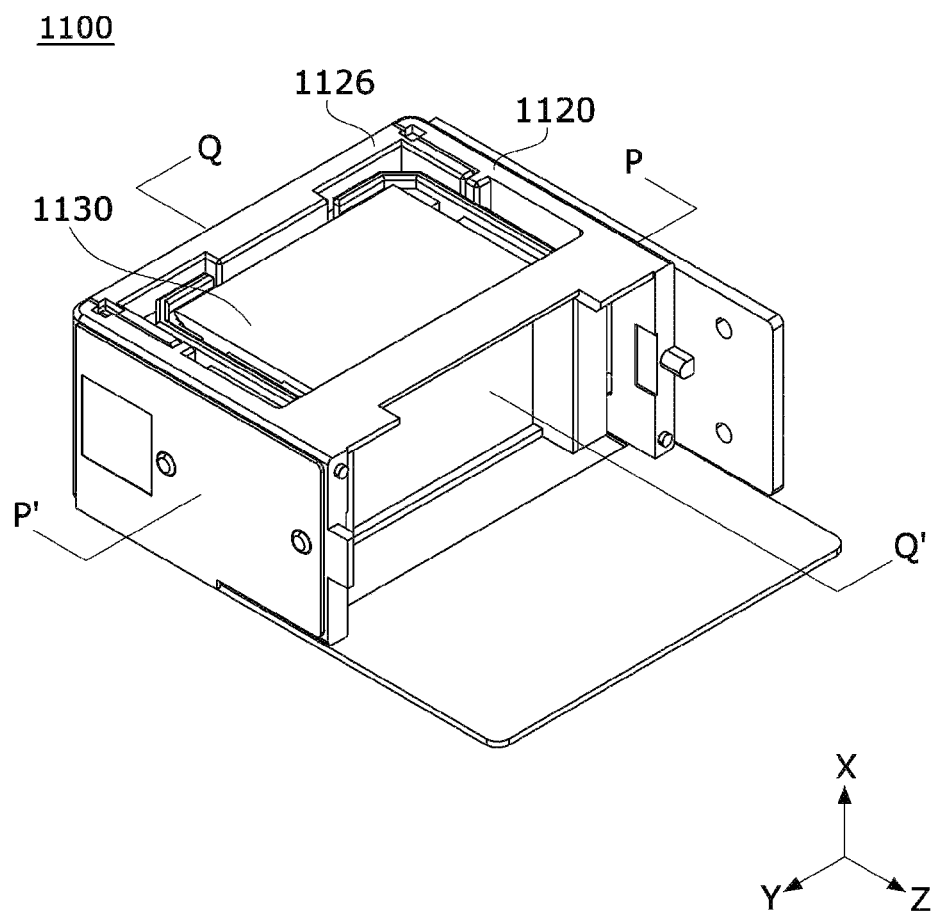
FIG. 12A is a perspective view illustrating the first camera actuator according to the embodiment.
Figure 12B:
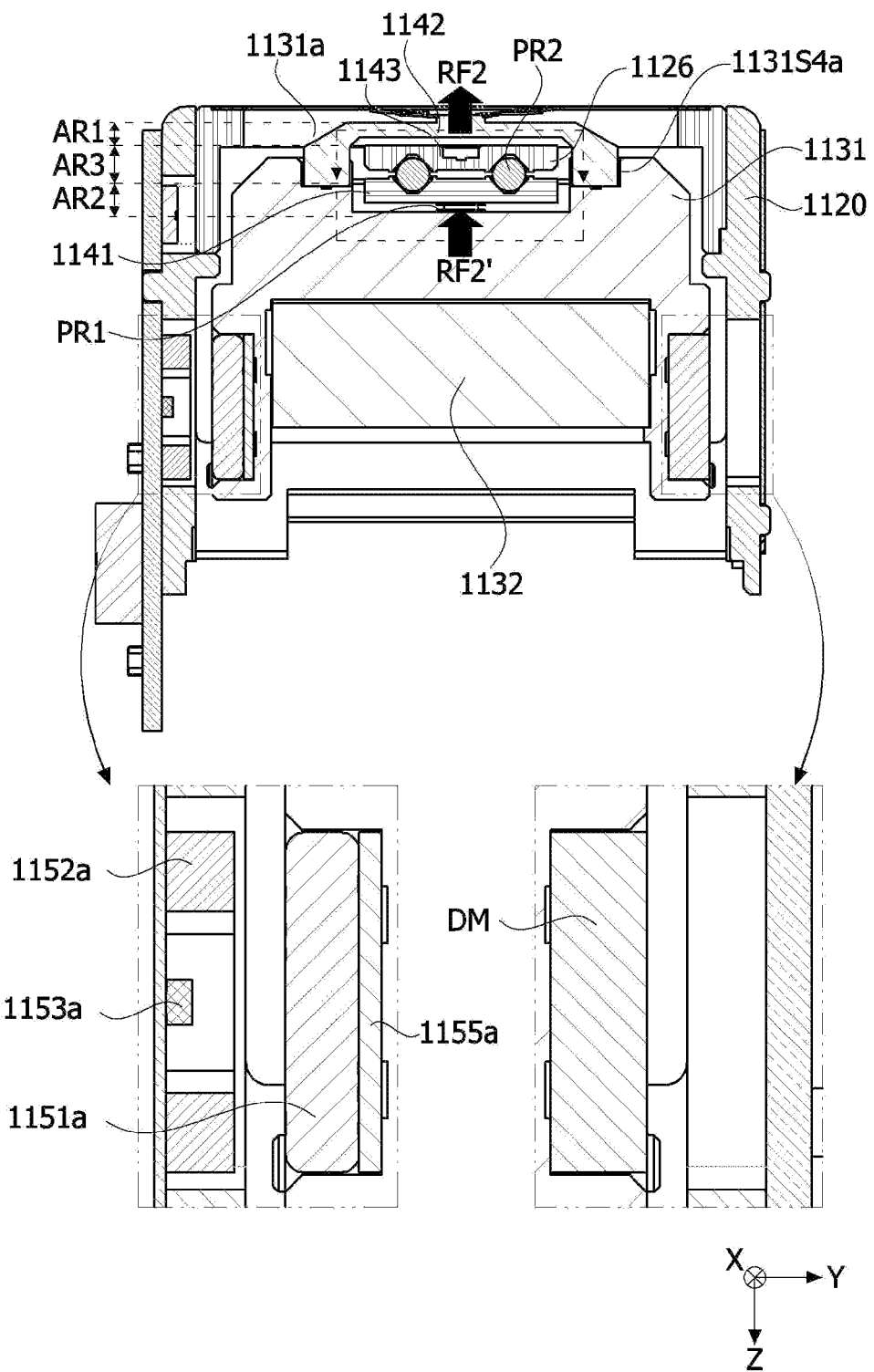
FIG. 12B is a cross-sectional view along line PP' in FIG. 12A.
Figure 12C:
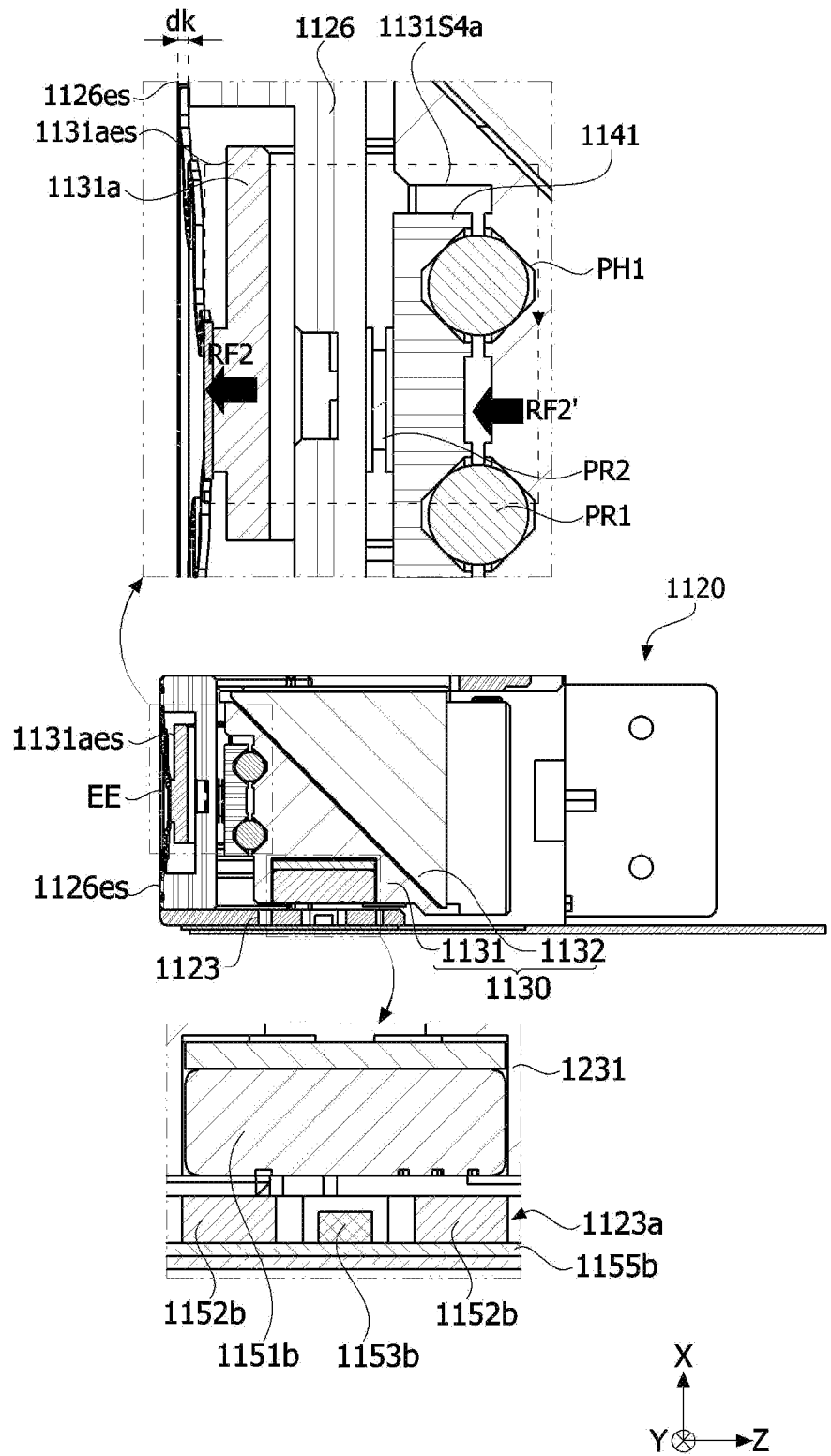
FIG. 12C is a cross-sectional view along line QQ' in FIG. 12A.

FIG. 12A is a perspective view illustrating the first camera actuator according to the embodiment, and FIG. 12B is a cross-sectional view along line PP' in FIG. 12A, and FIG. 12C is a cross-sectional view along line QQ' in FIG. 12A.

Referring to FIGS. 12A to 12C, the first coil 1152a may be positioned on the first housing side portion 1121, and the first magnet 1151a may be positioned on the first holder outer side surface 1131S1 of the holder 1131. Accordingly, the first coil 1152a and the first magnet 1151a may be positioned opposite to each other. At least a part of the first magnet 1151a may overlap the first coil 1152a in the second direction (Y-axis direction).

In addition, the dummy member DM may be positioned on the second holder outer side surface 1131S2 of the holder 1131. In addition, the first magnet 1151a and the dummy member DM may overlap in the second direction (Y-axis direction).

X-axis tilting can be performed by an electromagnetic force applied to the outer side surface (the first holder outer side surface) of the holder by the first magnet 1151a and the first coil 1152a.

In addition, the second protruding portions PR2a and PR2b of the tilting guide unit 1141 may be in contact with the first member 1126 of the first housing 1120. The second protruding portions PR2 may be seated in the second protrusion grooves PH2 formed in one side surface of the first member 1126. In addition, when X-axis tilting is performed, the second protruding portions PR2a and PR2b may serve as reference axes (or rotation axes) of a tilt. Accordingly, the tilting guide unit 1141 and the mover 1130 may move in the second direction.

In addition, as described above, the first Hall sensor 1153a may be positioned outside to be electrically connected and coupled to the first substrate part 1154. However, the position of the first Hall sensor 1153a is not limited thereto.

In addition, the second coil 1152b may be positioned on the third housing side portion 1123, and the second magnet 1151b may be positioned on the third holder outer side surface 1131S3 of the holder 1131. The second coil 1152b and the second magnet 1151b may overlap at least partially in the first direction (X-axis direction). Accordingly, a magnitude of an electromagnetic force between the second coil 1152b and the second magnet 1151b can be easily controlled.

As described above, the tilting guide unit 1141 may be positioned on the fourth holder outer side surface 1131S4 of the holder 1131. In addition, the tilting guide unit 1141 may be seated in the fourth seating groove 1131S4a in the fourth holder outer side surface. As described above, the fourth seating groove 1131S4a may include the first region AR1, the second region AR2, and the third region AR3 which are described above.

The second member 1131a may be disposed in the first region AR1, and the second member 1131a may include the first grooves gr1 formed in the inner side surface.

The first member 1126 may be disposed in the second region AR2. The first member 1126 may include the second groove gr2 facing the first groove gr1. In addition, the first member 1126 may include the second protrusion grooves PH2 disposed in a surface corresponding to the second groove gr2.

A repulsive force may be generated by the magnetic members having the same polarity, which are disposed in the first groove gr1 and the second groove gr2. The above-described content may be equally applied to the repulsive force. The tilting guide unit 1141 may be disposed in the third region AR3. As described above, the tilting guide unit 1141 may include the first protruding portions PR1 and the second protruding portions PR2. In this case, the first protruding portions PR1 and the second protruding portions PR2 may be respectively disposed on the second surface 1141b and the first surface 1141a of the base BS. As described above, in another embodiment which will be described below, first protruding portions PR1 and second protruding portions PR2 may be variously positioned on facing surfaces of a base BS.

The first protrusion grooves PH1 may be positioned in the fourth seating groove 1131S4a. In addition, the first protruding portions PR1 of the tilting guide unit 1141 may be accommodated in the first protrusion grooves PH1. Accordingly, the first protruding portions PR1 may be in contact with the first protrusion grooves PH1. The maximum diameter of the first protrusion groove PH1 may correspond to the maximum diameter of the first protruding portion PR1. This may be equally applied to the second protrusion groove PH2 and the second protruding portion PR2. That is, the maximum diameter of the second protrusion groove PH2 may correspond to the maximum diameter of the second protruding portion PR2. In addition, accordingly, the second protruding portions PR2 may be in contact with the second protrusion grooves PH2. By using such a structure, first axis tilting can be easily performed based on the first protruding portions PR1, second axis tilting can be easily performed based on the second protruding portions PR2, and radii of a tilt can be extended.

In addition, the tilting guide unit 1141 may be disposed parallel to the second member 1131a and the first member 1126 in the third direction (Z-axis direction), and the tilting guide unit 1141 may overlap the optical member 1132 in the first direction (X-axis direction). More specifically, in the embodiment, the first protruding portion PR1 may overlap the optical member 1132 in the first direction (X-axis direction). In addition, at least a part of the first protruding portion PR1 may overlap the second coil 1152b or the second magnet 1151b in the first direction (X-axis direction). That is, in the camera actuator according to the embodiment, the protruding portions which are central axes of a tilt may be positioned adjacent to the center of gravity of the mover 1130. Accordingly, the tilting guide unit may be positioned adjacent to a center of gravity of the holder. Accordingly, in the camera actuator according to the embodiment, a moment value for tilting the holder can be minimized, and a consumption amount of current applied to a coil part and the like in order to tilt the holder can be minimized, and thus a power consumption amount can be decreased, and the reliability of the element can be improved.

In addition, as described above, the second Hall sensor 1153b positioned inside the second coil 1152b may detect a change in magnetic flux, and thus position detection between the second magnet 1151b and the second Hall sensor 1153b may be performed.

In the first camera actuator according to the embodiment, the elastic member EE, the second member 1131a, the first member 1126, the tilting guide unit 1141, and the holder 1131 may be sequentially disposed in the third direction.

In addition, according to the embodiment, a partial region of the tilting guide unit 1141 may be positioned further outward than the fourth holder outer side surface of the holder 1131.

The tilting guide unit 1141 excluding the first protruding portions PR1 and the second protruding portions PR2 may be seated in the fourth seating groove 1131S4a based on the base BS. In other words, a length of the base BS in the third direction (Z-axis direction) may be smaller than a length of the fourth seating groove 1131S4a in the third direction (Z-axis direction). By using such a structure, miniaturization can be easily achieved.

In addition, a maximum length of the tilting guide unit 1141 in the third direction (Z-axis direction) may be greater than the length of the fourth seating groove 1131S4a in the third direction (Z-axis direction). Accordingly, as described above, an end of the second protruding portion PR2 may be positioned between the fourth holder outer side surface and the first member 1126. That is, at least a port of the second protruding portion PR2 may be positioned in a direction opposite to the holder 1131 in the third direction (Z-axis direction). In other words, the holder 1131 may be spaced a predetermined distance from an end of the second protruding portion PR2 (a portion in contact with the second protrusion groove) in the in the third direction (Z-axis direction).

In addition, a front surface 1131aes of the second member 1131a according to the embodiment may be spaced apart from a front surface 1126es of the first member 1126.

Particularly, the front surface 1131aes of the second member 1131a according to the embodiment may be positioned on the front surface 1126es of the first member 1126 in the third direction (Z-axis direction). Alternatively, the front surface 1131aes of the second member 1131a according to the embodiment may be positioned inside the front surface 1126es of the first member 1126. To this end, the first member 1126 may have a structure which extends and is bent inward. In addition, a partial region of the second member 1131a may be positioned in a groove formed by a structure of the first member 1126 which extends and is bent.

By using such a structure, since the second member 1131a is positioned inside the first member 1126, a spatial efficiency can be improved, and miniaturization can be achieved. In addition, even when driving (tilting or rotation of the mover 1130) by an electromagnetic force is performed, since the second member 1131a does not protrude further outward than the first member 1126, contact with a surrounding element can be blocked. Accordingly, the reliability can be improved.

Figure 13A:
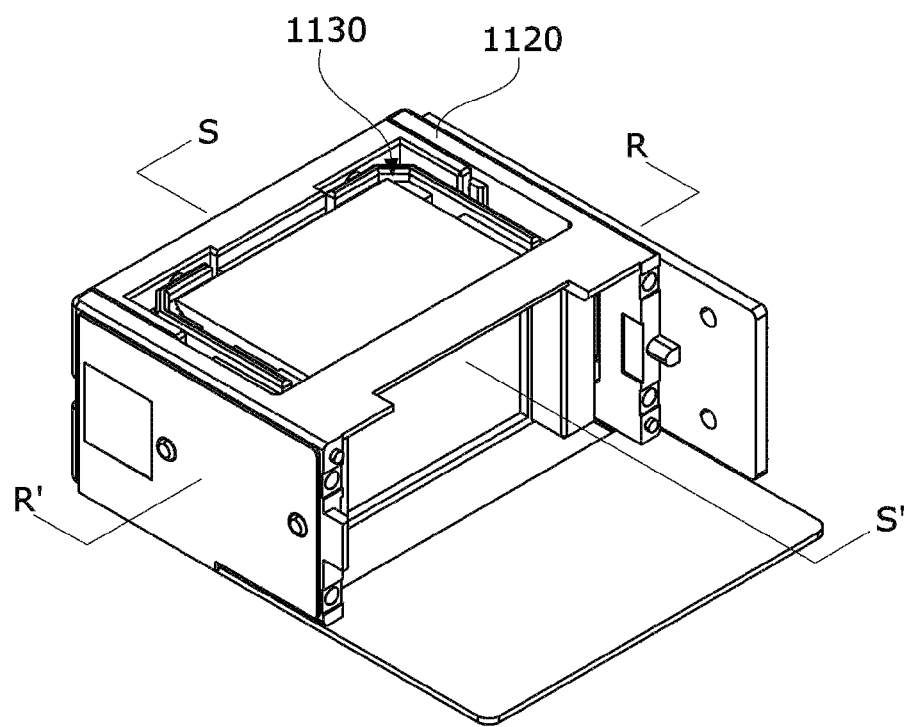
FIG. 13A is a perspective view illustrating the first camera actuator according to the embodiment.
Figure 13B:
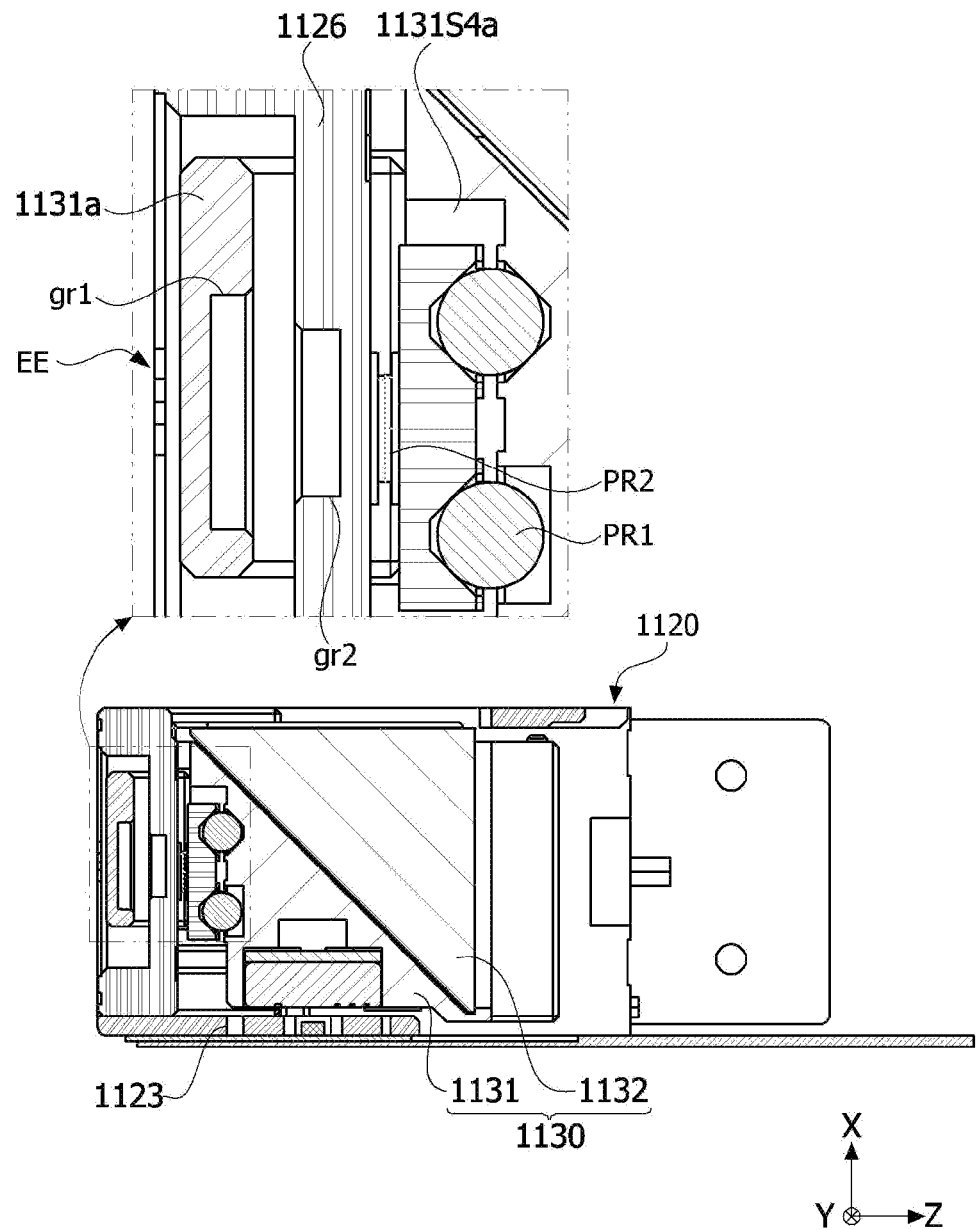
FIG. 13B is a cross-sectional view along line SS' in FIG. 13A.
Figure 13C:
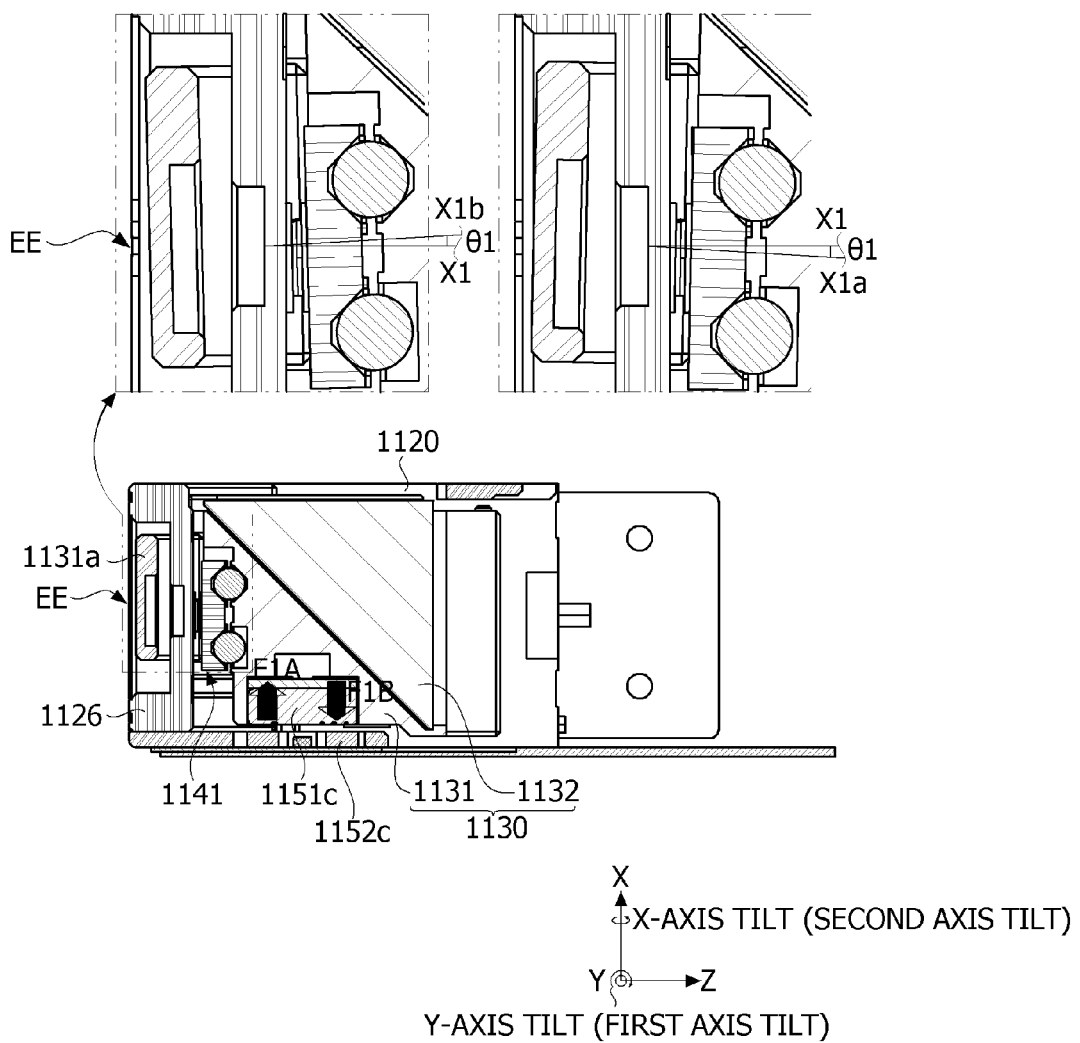
FIG. 13C is an exemplary view of movement of the first camera actuator illustrated in FIG. 13B.

FIG. 13A is a perspective view illustrating the first camera actuator according to the embodiment, FIG. 13B is a cross-sectional view along line SS' in FIG. 13A, and FIG. 13C is an exemplary view of movement of the first camera actuator illustrated in FIG. 13B.

Referring to FIGS. 13A to 13C, in the first camera actuator according to the embodiment, Y-axis tilting may be performed. That is, rotation may be performed with respect to the first direction (X-axis direction) to implement OIS.

The first coil 1152a may be positioned on the first housing side portion 1121, and the first magnet 1151a may be positioned on the first holder outer side surface 1131S1 of the holder 1131. Accordingly, the first coil 1152a and the first magnet 1151a may be positioned opposite to each other. At least a part of the first magnet 1151a may overlap the first coil 1152a in the second direction (Y-axis direction).

In addition, the dummy member DM may be positioned on the second holder outer side surface 1131S2 of the holder 1131. In addition, the first magnet 1151a and the dummy member DM may overlap in the second direction (Y-axis direction).

By using such a structure, a weight of the first magnet 1151a and a weight of the dummy member DM are uniformly applied to the holder 1131, and thus X-axis tilting can be accurately and precisely performed by an electromagnetic force applied to the outer side surfaces (the first holder outer side surface and the second holder outer side surface) of the holder.

In addition, the second protruding portions PR2a and PR2b of the tilting guide unit 1141 may be in contact with the first member 1126 of the housing 1120. The second protruding portions PR2 may be seated in the second protrusion grooves PH2 formed in one side surface of the first member 1126. In addition, when the X-axis tilting is performed, the second protruding portions PR2a and PR2b may be reference axes (or rotation axes) of the tilt. Accordingly, the tilting guide unit 1141 and the mover 1130 can vertically move.

In addition, as described above, the first Hall sensor 1153a may be positioned outside to be electrically connected and coupled to the substrate part 1154. However, the position of the first Hall sensor 1153a is not limited thereto.

In addition, the second coil 1152b may be positioned on the third housing side portion 1123, and the third magnet 1151c may be positioned on the third holder outer side surface 1131S3 of the holder 1131. The second coil 1152b and the third magnet 1151c may overlap at least partially in the first direction (X-axis direction). Accordingly, a magnitude of an electromagnetic force between the second coil 1152b and the third magnet 1151c can be easily controlled.

As described above, the tilting guide unit 1141 may be positioned on the fourth holder outer side surface 1131S4 of the holder 1131. In addition, the tilting guide unit 1141 may be seated in the fourth seating groove 1131S4a of the fourth holder outer side surface. As described above, the fourth seating groove 1131S4a may include the first region AR1, the second region AR2, and the third region AR3 which are described above.

The tilting guide unit 1141 may be disposed on the fourth holder outer side surface of the holder 1131. As described above, the tilting guide unit 1141 may include the first protruding portions PR1 and the second protruding portions PR2. In this case, the first protruding portions PR1 and the second protruding portions PR2 may be respectively disposed on the second surface and the first surface of the base. The first protruding portions PR1 and the second protruding portions PR2 may be variously positioned on the facing surfaces of the base BS. However, the present invention will be described below with reference to the drawings.

In addition, the first protrusion grooves PH1 may be positioned in the holder 1131. Particularly, the first protrusion grooves PH1 may be positioned in the fourth seating groove 1131S4a. In addition, the first protruding portions PR1 may be positioned in the first protrusion grooves PH1. Accordingly, at least a part of the first protruding portion PR1 may be in contact with the first protrusion groove PH1. In addition, as described above, the top points of the first protruding portions PR1 may be positioned on the bisector of the bonding holes of the second bonding part.

In addition, the maximum diameter of the first protrusion groove PH1 may correspond to the maximum diameter of the first protruding portion PR1. This may be equally applied to the second protrusion grooves PH2 and the second protruding portions PR2. That is, the maximum diameter of the second protrusion groove PH2 may correspond to the maximum diameter of the second protruding portion PR2. In addition, accordingly, the second protruding portions PR2 may be in contact with the second protrusion grooves PH2. By using such a structure, the second axis tilting can be easily performed based on the first protruding portions PR1, the first axis tilting can be easily performed based on the second protruding portions PR2, and radii of a tilt can be extended.

In addition, the tilting guide unit 1141 may be disposed parallel to the second member 1131a and the first member 1126 in the third direction (Z-axis direction), and thus the tilting guide unit 1141 may overlap the optical member 1132 in the first direction (X-axis direction). More specifically, in the embodiment, the first protruding portion PR1 may overlap the optical member 1132 in the first direction (X-axis direction). In addition, at least a part of the first protruding portion PR1 may overlap the second coil 1152b or the second magnet 1151b in the first direction (X-axis direction). That is, in the camera actuator according to the embodiment, the protruding portions, which are central axes of a tilt, may be positioned adjacent to the center of gravity of the mover 1130. Accordingly, the tilting guide unit may be positioned adjacent to the center of gravity of the mover. Accordingly, in the camera actuator according to the embodiment, a moment value for tilting the mover can be minimized, and a consumption amount of current applied to the coil part and the like in order to tilt the mover can be minimized, and thus a power consumption amount can be decreased, and the reliability of the element can be improved.

In addition, as described above, the second Hall sensor 1153b positioned inside the second coil 1152b may detect a change in magnetic flux, and thus position detection between the second magnet 1151b and the second Hall sensor 1153b may be performed.

In the embodiment, with the second coil 1152b, the second magnet 1151b disposed under the holder 1131 may generate an electromagnetic force to tilt or rotate the mover 1130 with respect to the second direction (Y-axis direction).

In addition, the first member 1126 may be disposed in the fourth holder outer side surface of the holder 1131. In addition, the second member 1131a may be positioned on the first member 1126. An outer side surface of the second member 1131a may be coupled to the second bonding part EP2 of the elastic member EE through the second coupling part PP2. Accordingly, the holder 1131 may apply a force RF2' to the tilting guide unit 1141 in the same direction of a restoring force RF2 generated by the elastic member EE.

In addition, the first member 1126 may include the second protrusion grooves PH2. The second protrusion grooves PH2 may be positioned in a surface of the first member 1126 facing the holder 1131.

In addition, the restoring force RF2 generated by the elastic member EE may be applied to the first member 1126 through the above-described path. Accordingly, the restoring forces RF2 and RF2' generated through the elastic member EE may press the tilting guide unit 1141 disposed between the first member 1126 and the holder 1131.

Specifically, the restoring force of the elastic member EE may be transmitted to the second member 1131a and ultimately transmitted to the tilting guide unit 1141 disposed between the first member 1126 and the holder 1131. Accordingly, the tilting guide unit 1141 may be pressed by the mover 1130 and the housing 1120 using the above-described restoring force.

In addition, the second protruding portions PR2 may be supported by the first member 1126. In this case, in the embodiment, the tilting guide unit 1141 may rotate or tilt about the second protruding portions PR2, which are reference axes (or rotation axes) and protrude toward the first member 1126, that is, may rotate or tilt about the second direction (Y-axis direction). In other words, the tilting guide unit 1141 may rotate or tilt about the second protruding portions PR2, which are the reference axes (or rotation axes) and protrude toward the first member 1126, that is, may rotate or tilt with respect to the first direction (X-axis direction).

For example, while the mover 1130 is rotated (X1→X1a) a first angle θ1 with respect to the X-axis direction by first electromagnetic forces F1A and F1B between the second magnet 1151b disposed in the third seating groove and the second coil part 1152b disposed on the third substrate side portion, OIS may be performed. In addition, while the mover 1130 is rotated (X1→X1b) a first angle θ1 with respect to the X-axis direction by the first electromagnetic forces F1A and F1B between the second magnet 1151b disposed in the third seating groove and the second coil part 1152b disposed on the third substrate side portion, OIS may be performed. The first angle θ1 may be in the range of ±1° to ±3°. However, the present invention is not limited thereto.

Figure 14A:
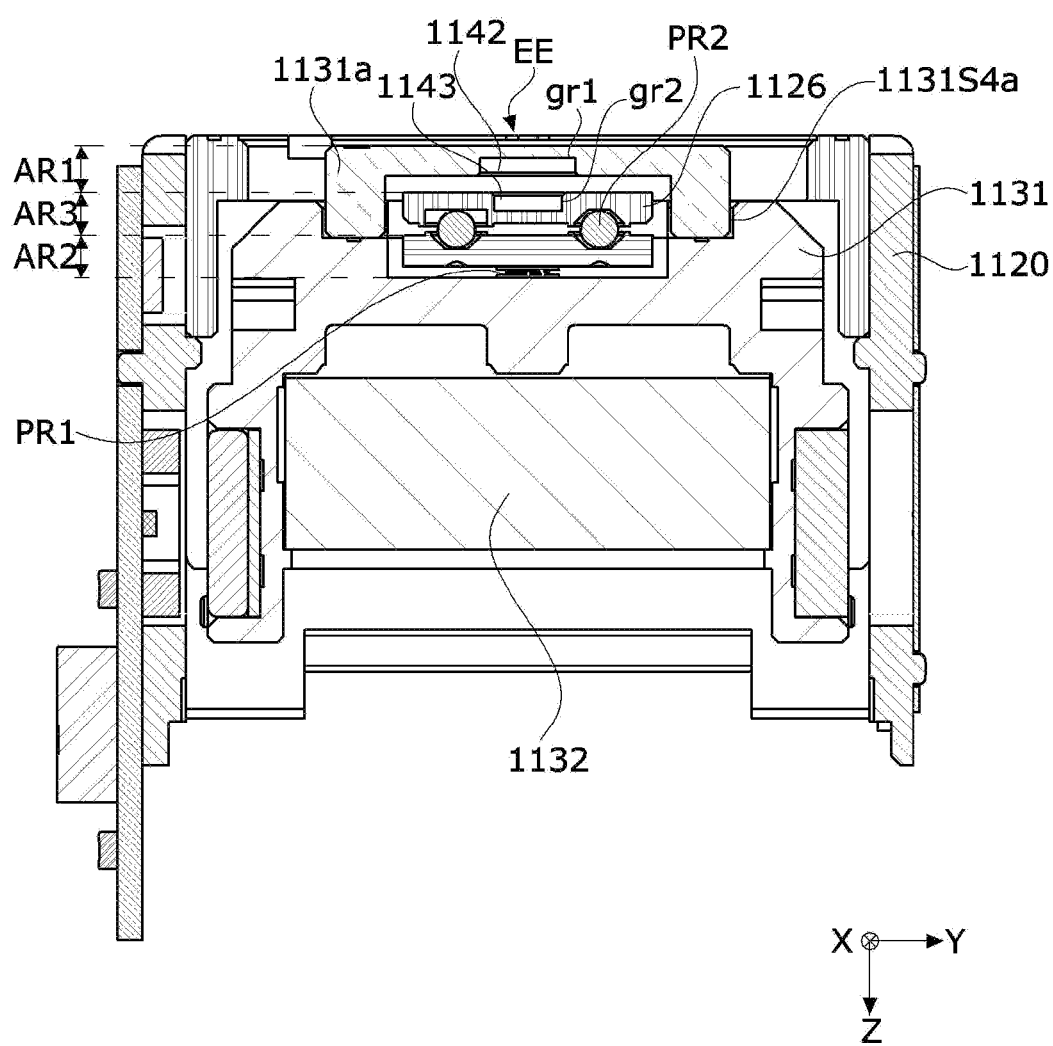
FIG. 14A is a cross-sectional view along line RR' in FIG. 13A.
Figure 14B:
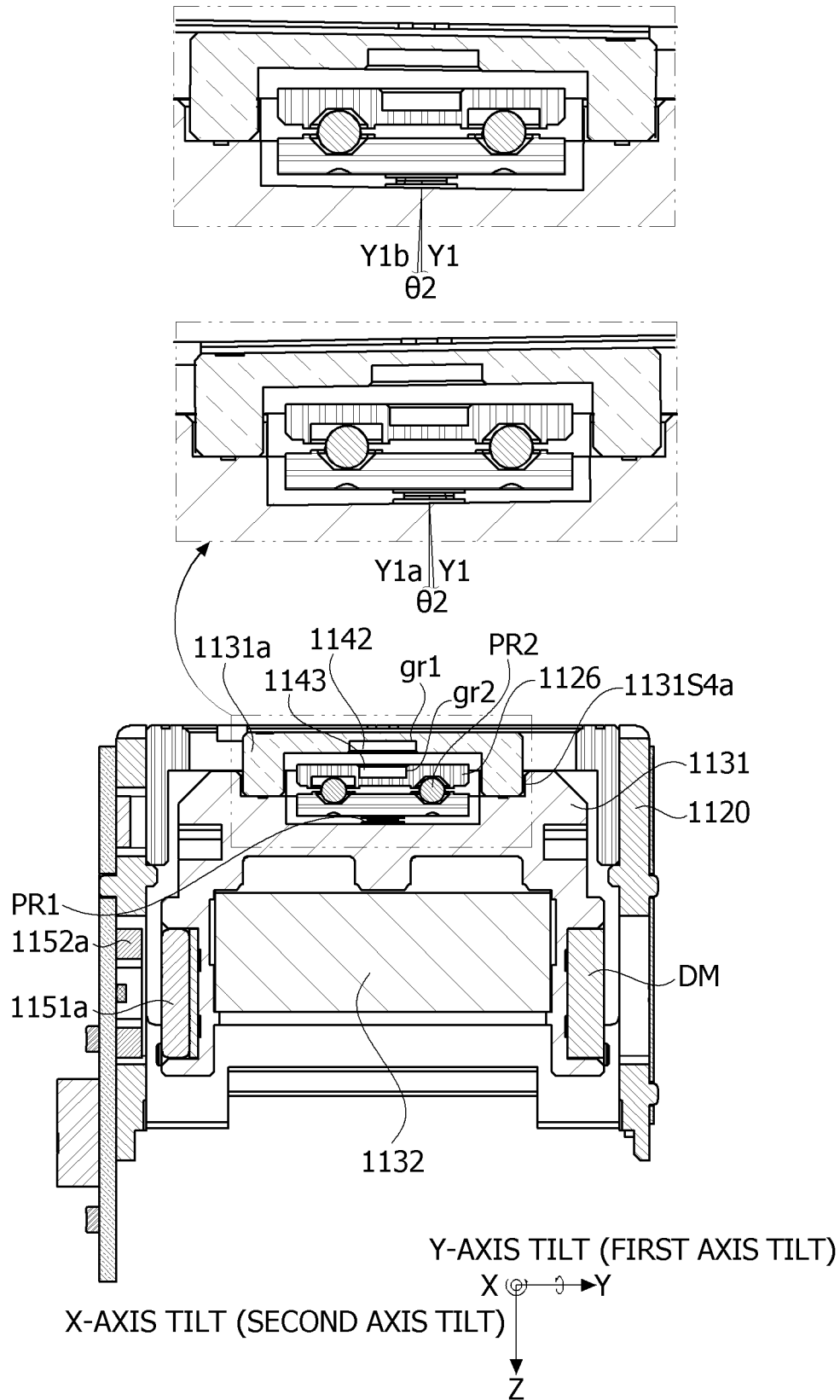
FIG. 14B is an exemplary view of movement of the first camera actuator illustrated in FIG. 14A.

FIG. 14A is a cross-sectional view along line RR' in FIG. 13A, and FIG. 14B is an exemplary view of movement of the first camera actuator illustrated in FIG. 14A.

Referring to FIGS. 14A and 14B, X-axis tilting may be performed. That is, while the mover 1130 tilts or rotates with respect to the Y-axis direction, OIS can be implemented.

In the embodiment, the first magnet 1151a disposed in the holder 1131 and the first coil 1152a may generate an electromagnetic force and tilt or rotate the tilting guide unit 1141 and the mover 1130 with respect to the first direction (X-axis direction).

Specifically, a restoring force of the elastic member EE may be transmitted to the second member 1131a and the holder 1131 and ultimately transmitted to the tilting guide unit 1141 disposed between the holder 1131 and the first member 1126. Accordingly, the tilting guide unit 1141 may be pressed by the mover 1130 and the housing 1120 using the above-described restoring force.

In addition, the 1-1 protruding portion PR1a and the 1-2 protruding portion PR1b may be spaced apart from each other in the first direction (X-axis direction) and supported by the first protrusion grooves PH1 formed in the fourth seating grooves 1131S4a of the holder 1131. In addition, in the embodiment, the tilting guide unit 1141 may rotate or tilt about the first protruding portions PR1, which are reference axes (or rotation axes) and protrude toward the holder 1131 (for example, in the third direction), that is, may rotate or tilt about the first direction (X-axis direction).

For example, while the mover 1130 is rotated (Y1→Y1a) by a second angle θ2 with respect to the Y-axis direction by second electromagnetic forces F2A and F2B between the first magnet 1151a disposed in the first seating groove and the first coil part 1152a disposed on the first substrate side portion, OIS can be implemented. In addition, while the mover 1130 is rotated (Y1→Y1b) by a second angle θ2 with respect to the Y-axis direction by the second electromagnetic forces F2A and F2B between the first magnet 1151a disposed in the first seating groove and the first coil part 1152a disposed on the first substrate side portion, OIS can be implemented. The second angle θ2 may be in the range of ±1° to 3°. However, the present invention is not limited thereto.

As described above, the first actuator according to the embodiment can minimize a decentering or tilting phenomenon to provide best optical properties when OIS is implemented by controlling the mover 1130 to rotate about the first direction (X-axis direction) or the second direction (Y-axis direction) using an electromagnetic force between the driving magnet in the holder and the driving coil disposed in the housing. In addition, as described above, the term "Y-axis tilting" refers to rotation or tilting with respect to the first direction (X-axis direction), and the term "X-axis tilting" refers to rotation or tilting with respect to the second direction (Y-axis direction).

Figure 15:
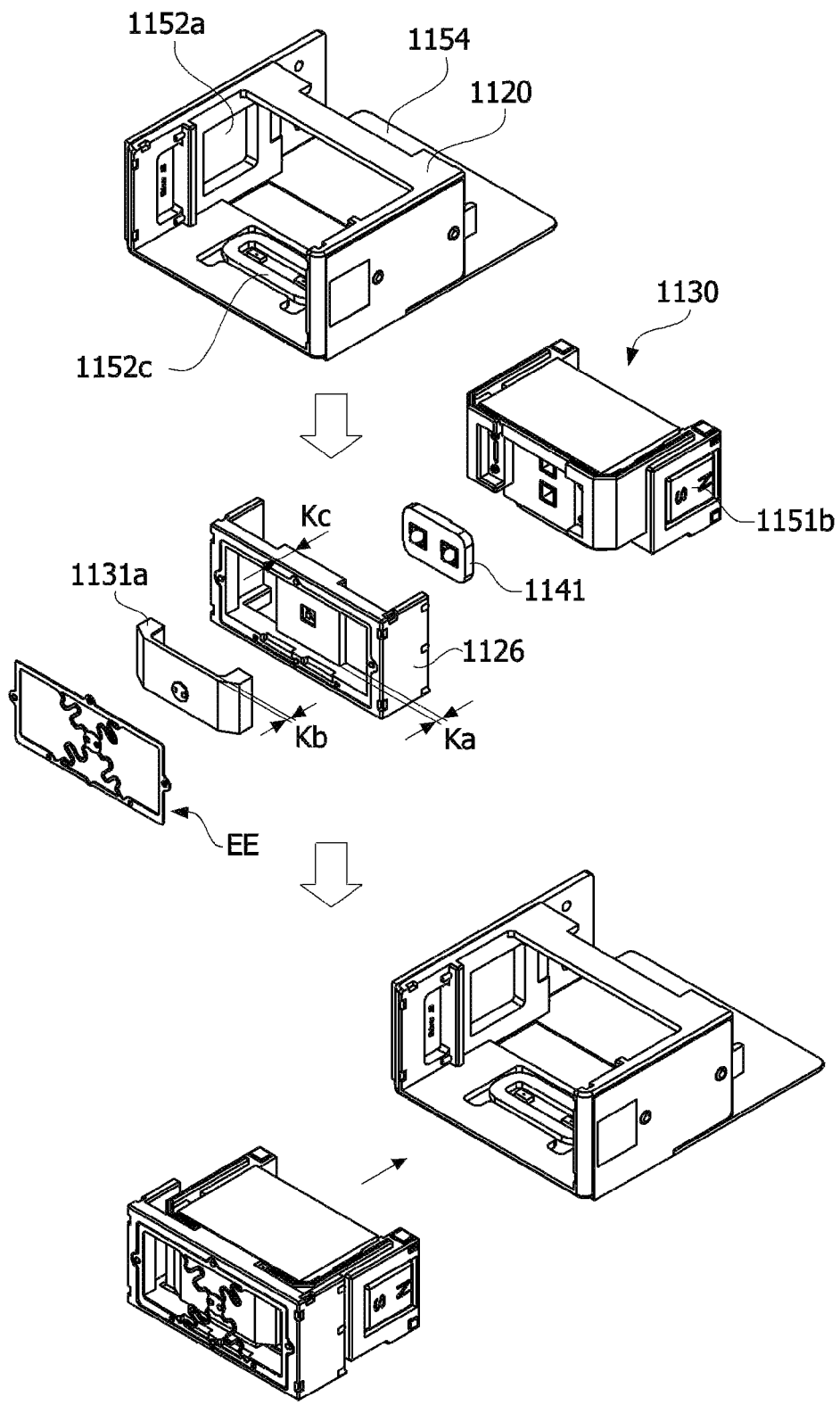
FIG. 15 is a view for describing an assembly order of the first camera actuator according to the embodiment.

FIG. 15 is a view for describing an assembly order of the first camera actuator according to the embodiment.

Referring to FIG. 15, a method of assembling the first camera actuator according to the embodiment may include coupling the first to second coils and the first substrate part to the first housing, coupling the first mover 1130, the tilting guide unit 1141, the first member 1126, the second member 1131a, and the elastic member EE to the first housing, and inserting the mover 1130, the tilting guide unit 1141, the first member 1126, and the second member 1131a, which are coupled, into the first housing 1120.

In the embodiment, after the coupling of the first to second coils and the first substrate part to the first housing, the inserting of the mover 1130, the tilting guide unit 1141, the first member 1126, the second member 1131a, and the elastic member EE, which are coupled, into the first housing 1120 may be performed. Accordingly, an influence of a tolerance or foreign material, which is generated while the first coil and the first substrate part are coupled to the first housing, on the optical member or the holder may be minimized. Accordingly, driving accuracy of the first camera actuator can be improved.

In addition, since the mover 1130, the tilting guide unit 1141, the first member 1126, and the second member 1131a, which are coupled, are inserted into the first housing 1120 in, for example, the third direction (Z-axis direction), an impact on the mover 1130, the tilting guide unit 1141, the first member 1126, and the second member 1131a, which are coupled, can be minimized when compared to a case of being vertically inserted into the first housing 1120.

In addition, the sum of a length ka of a central portion (corresponding to the tilting guide unit, overlapping the tilting guide unit in the third direction, or corresponding to a "connecting member" between the first through hole and the second through hole) of the first member 1126 in the third direction (Z-axis direction) and a length kb of the member base portion of the second member 1131a in the third direction (Z-axis direction) may be smaller than or equal to a length kc of a vertical frame (corresponding to the upper member and the lower member) connected to a central portion of the first member 1126 in the third direction (Z-axis direction). By using such a structure, as described above, even when the second member 1131a tilts or rotates, the second member 1131a may not protrude further outward than the outer side surface of the first member 1126.

In addition, as described above, the first member 1126 may be coupled to the first housing 1120 to form one housing. For example, the one housing may include a 1-2 housing and a 1-1 housing 11200 which form the first member.

Figure 16:
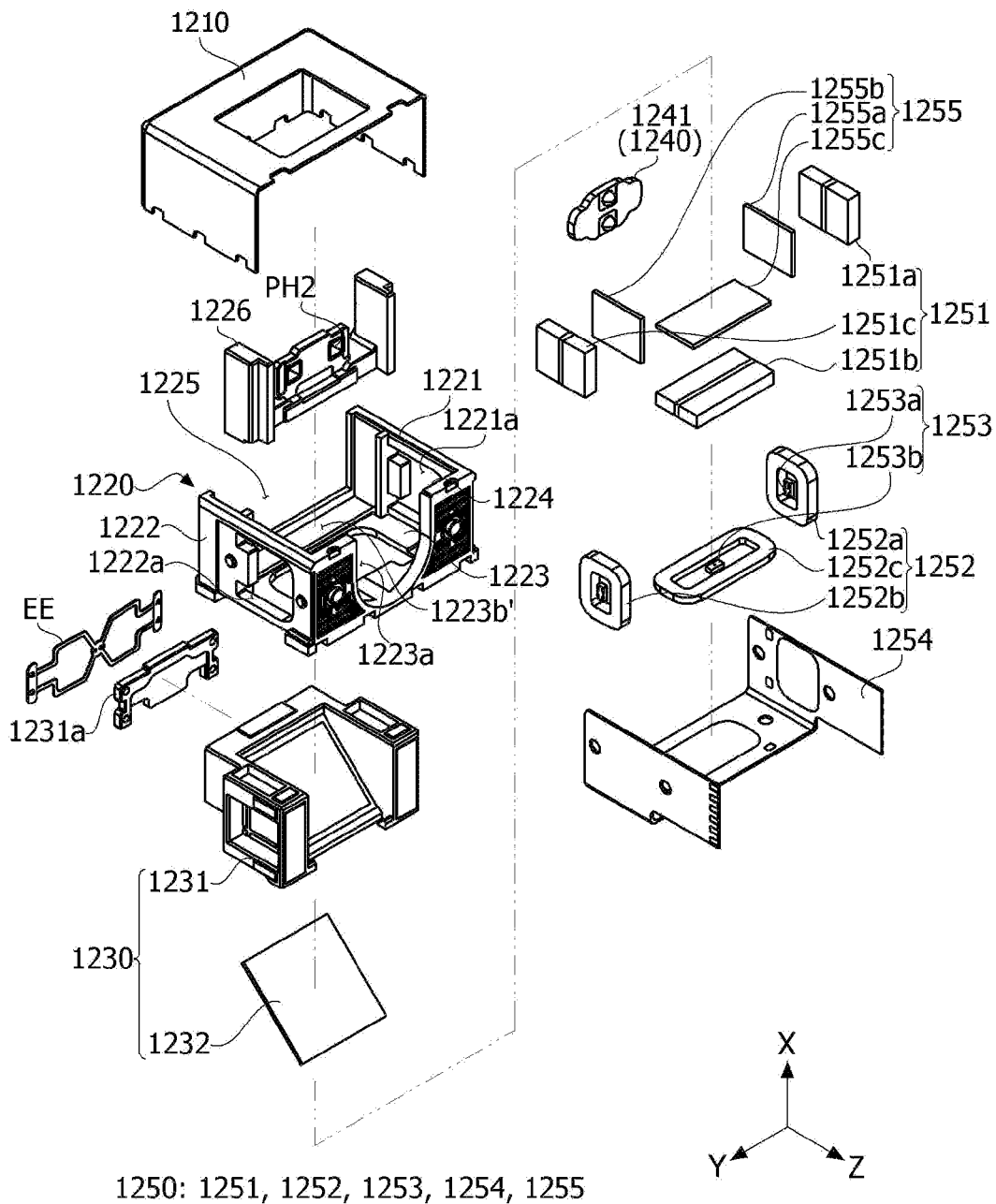
FIG. 16 is an exploded perspective view illustrating a first camera actuator according to another embodiment.
Figure 17:
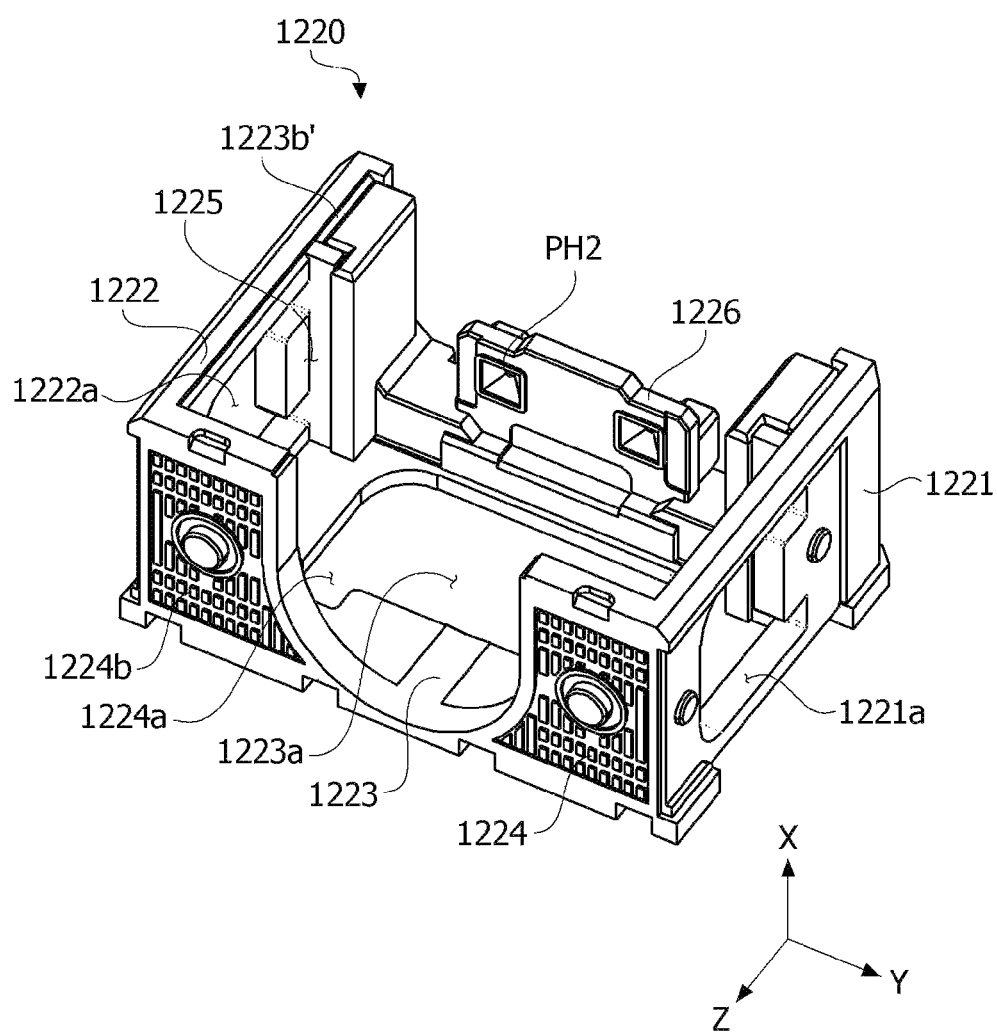
FIG. 17 is a perspective view illustrating a housing according to another embodiment.
Figure 18:
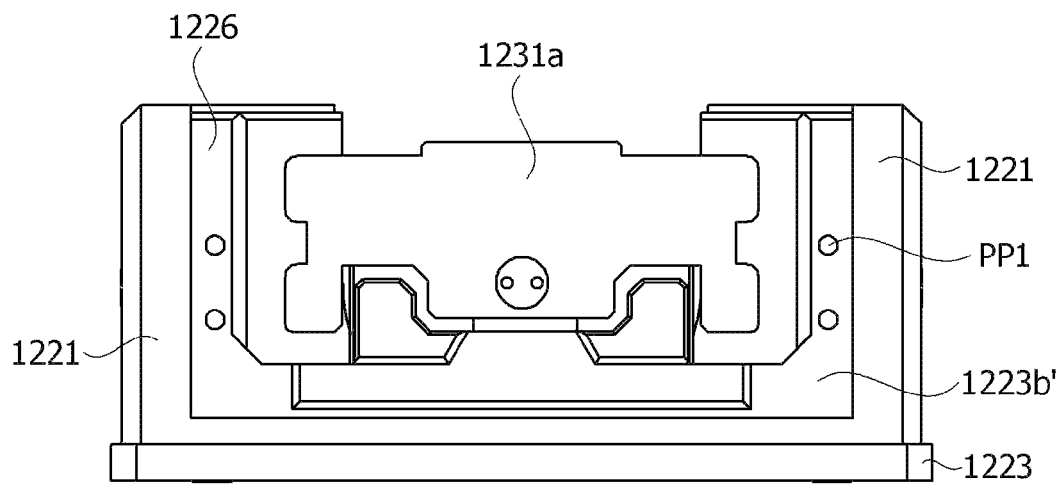
FIG. 18 is a view illustrating the housing according to another embodiment.

FIG. 16 is an exploded perspective view illustrating a first camera actuator according to another embodiment, FIG. 17 is a perspective view illustrating a housing according to another embodiment, and FIG. 18 is a view illustrating the housing according to another embodiment.

Referring to FIGS. 16 to 18, a first camera actuator 1200 according to another embodiment includes a shield can 1210, a housing 1220, a mover 1230, a rotation part 1240, an elastic member EE, a driving unit 1250, a first member 1231a, and a second member 1226. The content of all the above-described components (the shield can, the housing, the mover, the rotation part, the elastic member, the driving unit, the first member, and the second member) of the first camera actuator according to the embodiment may be equally applied to the content of a structure excluding an elastic member EE which will be described below. That is, even in a different content in addition to the redundant content, the content of the above-described camera actuator according to the embodiment may be equally applied thereto, excluding, for example, a structure of the elastic member EE and a structure of the housing 1220 or a structure of the mover 1230 which are changed according to the structure of the elastic member EE.

The mover 1230 may include a holder 1231 and an optical member 1232 seated in the holder 1231. In addition, the rotation part 1240 may include a tilting guide unit 1241. In addition, the driving unit 1250 includes driving magnets 1251, driving coils 1252, Hall sensor units 1253, a substrate part 1254, and yoke parts 1255.

The shield can 1210 may be positioned at an outermost side of the first camera actuator 1200 to surround the rotation part 1240, the driving unit 1250, the housing 1220, and the like which will be described below.

The shield can 1210 may block or reduce electromagnetic waves generated from the outside. That is, the shield can 1210 may reduce an occurrence of a malfunction of the rotation part 1240 or the driving unit 1250.

The housing 1220 may be positioned in the shield can 1210. In addition, the housing 1220 may be positioned inside the substrate part 1254 which will be described below. The housing 1220 may be fastened to the shield can 1210 by being fitted to or engaged with each other.

The housing 1220 may include a first housing side portion 1221, a second housing side portion 1222, a third housing side portion 1223, and a fourth housing side portion 1224.

The first housing side portion 1221 and the second housing side portion 1222 may be disposed to face each other. In addition, the third housing side portion 1223 and the fourth housing side portion 1224 may be disposed between the first housing side portion 1221 and the second housing side portion 1222.

The third housing side portion 1223 may be in contact with the first housing side portion 1221, and the second housing side portion 1222. In addition, the third housing side portion 1223 may have a lower surface in the housing 1220. In addition, the first housing side portion 1221, the second housing side portion 1222, and the fourth housing side portion 1224 may have side surfaces.

In this case, the lower surface refers to one side in a first direction. In addition, the first direction may be an X-axis direction in the drawings and may be interchangeably used with a second axis direction or the like. A second direction may be a Y-axis direction in the drawings and may be interchangeably used with a first axis direction or the like. The second direction is a direction perpendicular to the first direction. In addition, a third direction may be a Z-axis direction in the drawings and may be interchangeably used with a third axis direction or the like. The third direction is a direction perpendicular to both the first direction and the second direction. In this case, the third direction (Z-axis direction) may correspond to a direction of an optical axis (for light reflected by an optical member and moved), the first direction (X-axis direction) and the second direction (Y-axis direction) may be directions perpendicular to the optical axis, and tilting may be performed by the first camera actuator. Details thereof will be described below.

In addition, the first housing side portion 1221 may include a first housing hole 1221a. A first coil 1252a, which will be described below, may be positioned in the first housing hole 1221a.

In addition, the second housing side portion 1222 may include a second housing hole 1222a. In addition, a second coil 1252b, which will be described below, may be positioned in the second housing hole 1222a.

The first coil 1252a and the second coil 1252b may be coupled to the substrate part 1254. In the embodiment, the first coil 1252a and the second coil 1252b may be electrically connected to the substrate part 1254, and a current may flow through the first coil 1252a and the second coil 1252b. The current is a factor of an electromagnetic force by which the first camera actuator may perform tilting about an X-axis.

In addition, the third housing side portion 1223 may include a third housing hole 1223*a* and a housing groove 1223*b'*.

A third coil 1252*c*, which will be described below, may be positioned in the third housing hole 1223*a*. The third coil 1252*c* may be coupled to the substrate part 1254. In addition, the third coil 1252*c* may be electrically connected to the substrate part 1254, and a current may flow through the third coil 1252*c*. The current is a factor of an electromagnetic force by which the first camera actuator may perform tilting about a Y-axis.

The second member 1226, which will be described below, may be seated in the housing groove 1223*b'*. The housing groove 1223*b'* may be formed to extend from the third housing side portion 1223 along the first housing side portion 1221 and the second housing side portion 1222. That is, the housing groove 1223*b'* may be positioned in the first housing side portion 1221, the second housing side portion 1222, and the third housing side portion 1223. Accordingly, the second member 1226 may be coupled to the first housing side portion 1221, the second housing side portion 1222, and the third housing side portion 1223. Like a camera actuator according to a second embodiment, the second member 1226 may be seated in the housing groove formed by a protrusion and the like and coupled to the housing 1220. The second member 1226 may be coupled to the housing 1220 according to the above-described content. However, due to the coupling through the housing groove, the mover 1230, the tilting guide unit 1241, the second member 1226, and the first member 1231*a*, which will be described below, may be sequentially stacked on the fourth housing side portion 1224. Accordingly, ease of assembly can be improved. Alternatively, the second member 1226 may also be integrally formed with the housing 1220.

Accordingly, a camera module according to another embodiment may include a fixed member, and the fixed member may be a component which does not move when a camera actuator performs one axis tilting or two axis tilting. In the embodiment, the fixed member may include at least one of the housing 1220 and the second member 1226. In the present specification, the present invention will be described based on this. The elastic member EE may be positioned between the mover 1230 and the fixed member. In addition, the tilting guide unit 1241 may be positioned between the fixed member and the mover. In addition, the elastic member EE may bring the tilting guide unit 1241 into close contact with the fixed member and the mover by pulling the mover 1230 to the fixed member. In addition, the elastic member EE may bring the tilting guide unit 1241 into close contact with the mover 1230. In other words, the elastic member EE may pull the mover 1230 toward the housing 1220 or the second member 1226 which is the fixed member. Such a structure will be described below.

In addition, the fourth housing side portion 1224 may be disposed between the first housing side portion 1221 and the second housing side portion 1222 and may be in contact with the first housing side portion 1221, the second housing side portion 1222, and the third housing side portion 1223.

The fourth housing side portion 1224 may be in contact with the first camera actuator connected to another first camera actuator. Accordingly, the fourth housing side portion 1224 may include a protrusion, a groove, or a plurality of grooves formed in a housing outer side surface 1224*b*. Accordingly, the fourth housing side portion may allow ease coupling with another adjacent camera actuator. That is, in the first camera actuator, a coupling force between the first camera actuators can be further increased through the fourth housing side portion 1224. In addition, by using such a structure, the fourth housing side portion may provide an optical path, increase the coupling force with another component, suppress movement of an opening due to separation or the like, and thus minimize a change in the optical path.

In addition, the fourth housing side portion 1224 may include an open region 1224*a*. Light of which a path is changed by the optical member of the first camera actuator may move to the first camera actuator through the open region 1224*a*. As described above, the first camera actuator may perform AF and/or zoom, and the first camera actuator may perform OIS.

In addition, the housing 1220 may include an accommodation portion 1225 formed by the first housing side portion 1221 to the fourth housing side portion 1224. The second member 1226, the first member 1231*a*, the tilting guide unit 1241, the mover 1230, and the elastic member EE may be positioned in the accommodation portion 1225 as components.

The second member 1226 may be disposed in the housing 1220. The second member 1226 may be disposed or included in the housing. In addition, the second member 1226 may be coupled to the housing 1220. In the embodiment, the second member 1226 may be seated in the housing groove 1223*b'* formed in the third housing side portion 1223 or may pass through at least a part of the housing groove 1223*b'* to be coupled to the third housing side portion 1223. Therefore, the second member 1226 may be coupled to the housing 1220 and may maintain fixation between the mover 1230 and the tilting guide unit 1241 which will be described below.

In addition, the second member 1226 may include the first housing side portion 1221 and first coupling parts PP1 disposed in a region adjacent to the second housing side portion 1221. The first coupling parts PP1 may be formed as protrusions. In addition, the first coupling parts PP1 may be coupled to first bonding parts EP1. As will be described below, the first coupling parts PP1 may be inserted into first bonding holes of the first bonding parts EP1.

In addition, the second member 1226 includes second protrusion grooves PH2 in which second protrusions of the tilting guide unit are seated. Accordingly, the second member 1226 allows protrusions of the tilting guide unit to be disposed adjacent to the optical member in a fourth seating groove. Accordingly, the protrusions which are reference axes of a tilt may be disposed close to a center of gravity of the mover 1230. Accordingly, when the tilting is performed, since a moment of moving the mover 1230 for the tilting is minimized, consumption of a current for driving a coil can also be minimized to reduce power consumption.

In addition, as described above, the second member 1226 may be integrally formed with the housing 1220 or separately formed from the housing 1220. In the case of being integrally formed, a coupling force of the second member 1226 and the housing 1220 may increase, and thus the reliability of the camera actuator can be improved. In addition, in the case of being separately formed, ease of assembly and manufacturing of the second member 1226 and the housing 1220 can be improved. Hereinafter, the present invention will be described based on the case of being separately formed.

The mover 1230 includes the holder 1231 and the optical member 1232 seated in the holder 1231.

First, the holder 1231 may be seated in the accommodation portion 1225 of the housing 1220. The holder 1231 may include a first holder outer side surface to a fourth holder outer side surface corresponding to the first housing side portion 1221, the second housing side portion 1222, the third housing side portion 1223, and the fourth housing side portion 1224, respectively. In addition, the holder 1231 may include a first member 1231a disposed in a fourth seating groove 1231S4a. Details thereof will be described below.

The optical member 1232 may be seated in the holder 1231. To this end, the holder 1231 may have a seating surface, and the seating surface may be formed by an accommodation groove. In the embodiment, the optical member 1232 may be formed as a mirror. Hereinafter, although the optical member 1232 will be described based on the mirror, the optical member 1232 may also be formed as a plurality of lenses like the above-described embodiment. For example, the optical member 1232 may include a reflecting part disposed therein. However, the present invention is not limited thereto. In addition, the optical member 1232 may reflect light reflected from the outside (for example, by an object) into the camera module. In other words, the optical member 1232 may change a path of reflected light to improve the first camera actuator and solve a spatial limitation of the first camera actuator. Accordingly, it should be understood that the camera module may also extend an optical path to provide a wide range of magnification while minimizing a thickness.

In addition, the first member 1231a may be coupled to the holder 1231. The first member 1231a may be in contact with a protruding portion positioned in a region excluding the fourth seating groove in the fourth holder outer side surface in the holder 1231. The first member 1231a may be integrally formed with the holder 1231. Alternatively, the first member 1231a may be formed as a structure separated from the holder 1231. Even when the first member 1231a and the holder 1231 are integrally coupled, the fourth seating groove may be positioned in the holder 1231. In addition, when the first member 1231a is not coupled to the holder 1231, although the fourth seating groove is open downward and rearward, when the first member 1231a is coupled to the holder 1231, the fourth seating groove may be open downward.

The elastic member EE may be disposed between the tilting guide unit 1241 and the housing 1220. Particularly, the elastic member EE, the tilting guide unit 1241, the second member 1226, and the first member 1231a may be sequentially disposed. Accordingly, the elastic member EE may be disposed on the first member 1231a.

The elastic member EE may be formed of an elastic material, may couple the second member 1226 and the first member 1231a, and may provide an elastic force to the first member 1231a and the holder 1231 connected thereto with respect to the second member 1226 fixed to the housing 1220.

Accordingly, the elastic member EE may be disposed between the housing 1220 and the mover 1230, may be coupled to the housing 1220 and the mover 1230, and may press the tilting guide unit 1241 through the mover 1230. Accordingly, X-axis tilting and/or Y-axis tilting of the mover 1230 may be performed using the tilting guide unit 1241.

In the elastic member EE, portions in contact with the first member 1231a (or the holder 1231) and the housing 1220 may be spaced apart from each other in the third direction (Z-axis direction). Due to a distance between the contact portions (first and second bonding parts which will be described below), the elastic member EE may have a preload. In addition, the pre-load may be transmitted to the tilting guide unit 1241 through the mover 1230 and transmitted to the second member 1226 through the tilting guide unit 1241. Accordingly, the tilting guide unit 1241 disposed between the mover 1230 and the second member 1226 may be pressed by the elastic member EE. That is, a force by which the tilting guide unit 1241 is positioned between the mover 1230 and the second member 1226 may be maintained. Accordingly, even when the X-axis tilting or Y-axis tilting is performed, the tilting guide unit 1241 is not separated, and a position of the tilting guide unit 1241 between the mover 1230 and the housing 1220 can be maintained.

The rotation part 1240 may include the tilting guide unit 1241.

The tilting guide unit 1241 may be coupled to the mover 1230 and the housing 1220 described above. In addition, the tilting guide unit 1241 may be disposed between the mover 1230 and the second member 1226 and coupled to the mover 1230 and the housing 1220. In other words, the tilting guide unit 1241 may be disposed between the second member 1226 and the holder 1231. The tilting guide unit 1241 may be positioned between the second member 1226 and the fourth seating groove 1231S4a of the holder 1231.

Accordingly, in the camera actuator according to another embodiment, the first member 1231a, the second member 1226, the tilting guide unit 1241, the holder 1231, and the fourth housing side portion 1224 may be sequentially disposed in the third direction (Z-axis direction).

In addition, the tilting guide unit 1241 may be disposed adjacent to the optical axis. Accordingly, the camera actuator according to another embodiment can easily change the optical path through the first and second axis tilting which will be described below.

In the embodiment, the tilting guide unit 1241 may include first protruding portions spaced apart from each other in the first direction (X-axis direction) and second protruding portions spaced apart from each other in the second direction (Y-axis direction). In addition, the first protruding portions and the second protruding portions may protrude in opposite directions. Details thereof will be described below.

The driving unit 1250 includes the driving magnets 1251, the driving coils 1252, the Hall sensor units 1253, the substrate part 1254, and the yoke parts 1255. The above-described content may be equally applied to the content thereof.

Figure 19:
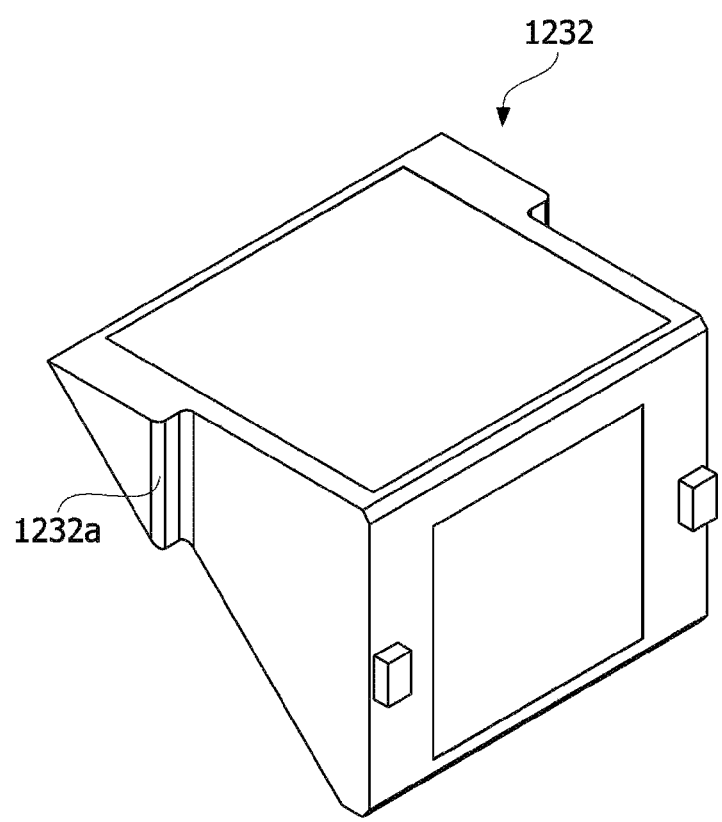
FIG. 19 is a perspective view illustrating a mover according to another embodiment.
Figure 20:
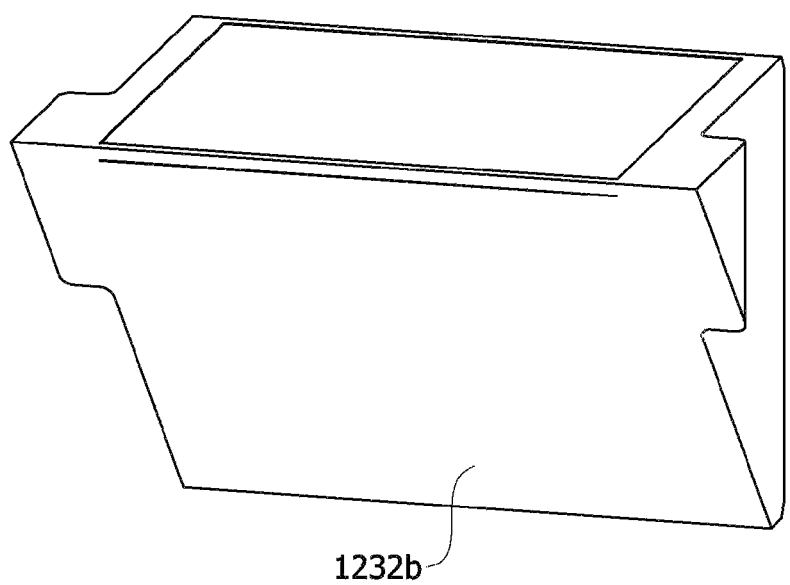
FIG. 20 is a perspective view illustrating the mover in a direction different from a direction in FIG. 19.

FIG. 19 is a perspective view illustrating the mover according to another embodiment, and FIG. 20 is a perspective view illustrating the mover in a direction different from a direction in FIG. 19.

Referring to FIGS. 19 and 20, the optical member 1232 may be seated in the holder. The optical member 1232 may be a rectangular optical member as a reflecting part but is not limited thereto.

In the embodiment, the optical member 1232 may include protruding portions 1232a on parts of outer side surfaces. The optical member 1232 may be easily coupled to the holder through the protruding portions 1232a. In addition, a lower surface 1232b of the optical member 1232 may be seated on the seating surface of the holder. Accordingly, the lower surface 1232b of the optical member 1232 may correspond to the seating surface of the holder. In the embodiment, the lower surface 1232b may be formed as an inclined surface like the seating surface of the holder. Accordingly, the optical member may be moved according to movement of the holder, and the optical member 1232 may be inhibited from being separated from the holder according to the movement at the same time.

In addition, as described above, the optical member 1232 may be formed as a structure capable of reflecting light reflected from the outside (for example, by an object) into the camera module. Like the embodiment, the optical member 1232 may also be formed as a single mirror. In addition, the optical member 1232 may change a path of reflected light to improve the first camera actuator and solve a spatial limitation of the first camera actuator. Accordingly, it should be understood that the camera module may increase an optical path to provide a wide range of magnification while minimizing a thickness. In addition, it should be understood that the camera module including the camera actuator according to another embodiment may also increase an optical path to provide a wide range of magnification while minimizing a thickness.

Figure 21:
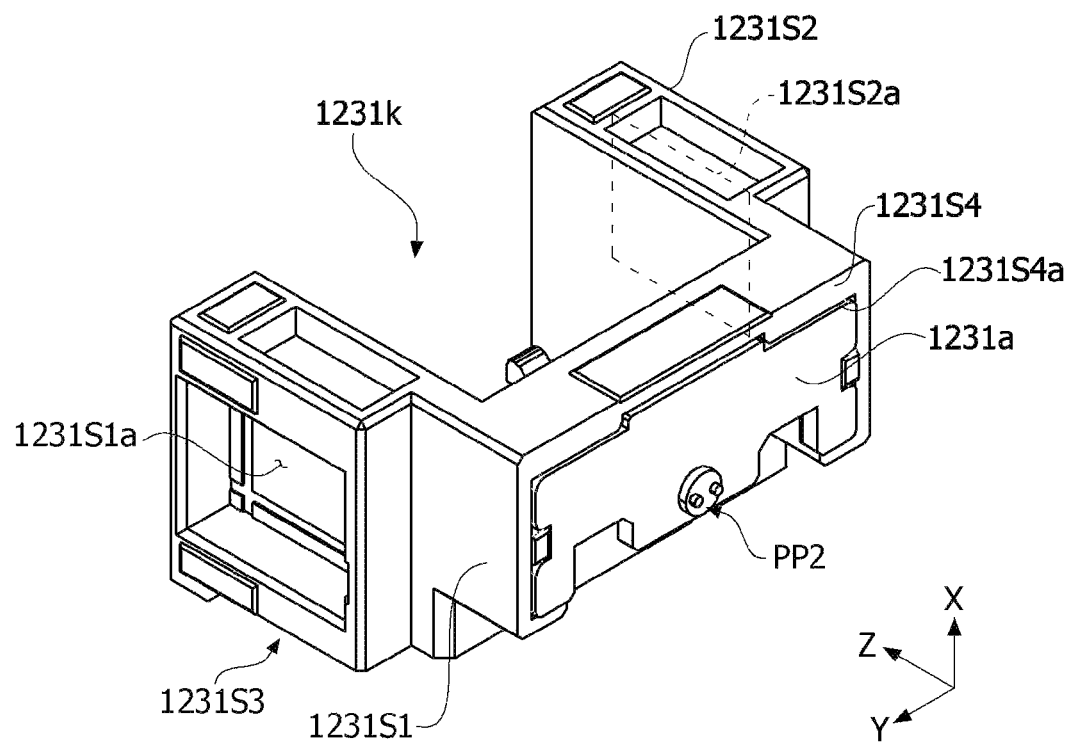
FIG. 21 is a perspective view illustrating a holder according to another embodiment.
Figure 22:
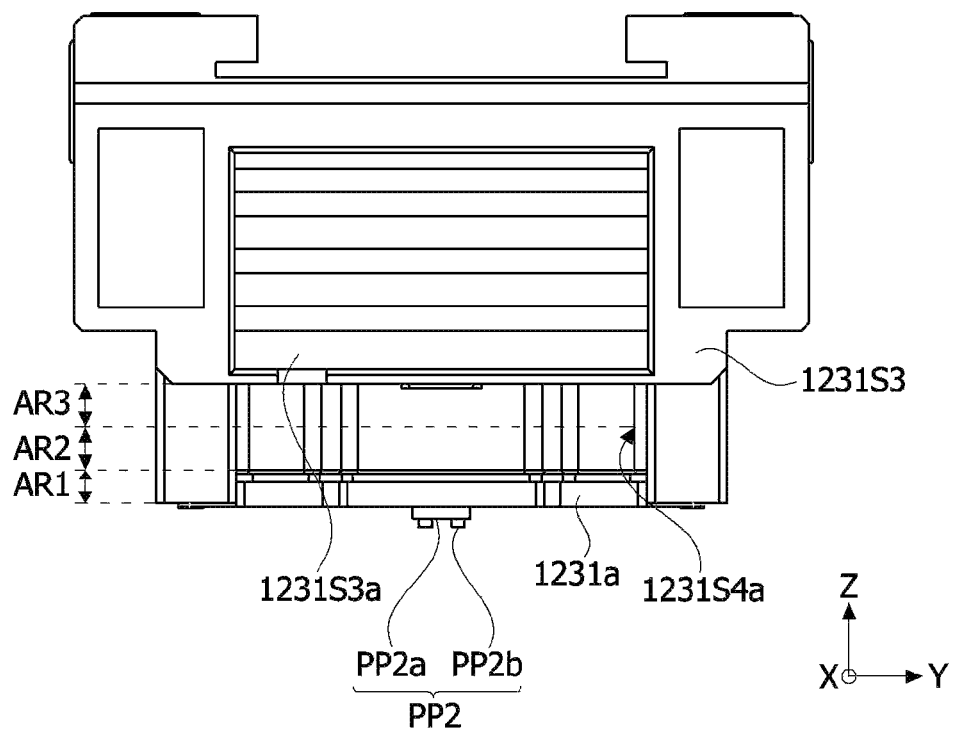
FIG. 22 is a bottom view illustrating the holder according to another embodiment.
Figure 23:
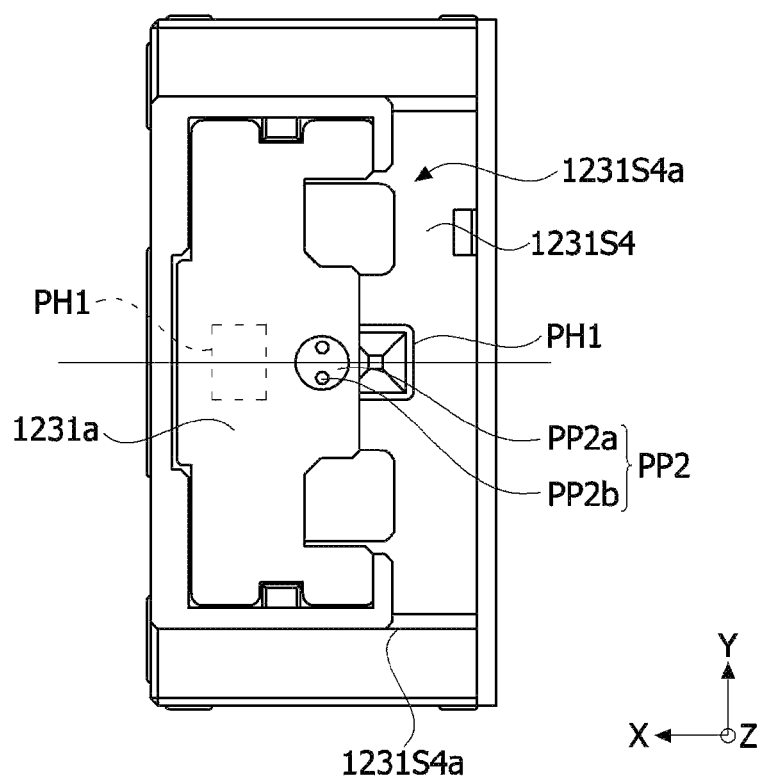
FIG. 23 is a side view illustrating the holder according to another embodiment.

FIG. 21 is a perspective view illustrating the holder according to another embodiment, FIG. 22 is a bottom view illustrating the holder according to another embodiment, and FIG. 23 is a side view illustrating the holder according to another embodiment.

Referring to FIGS. 21 to 23, the holder 1231 may include a seating surface 1231k on which the optical member 1232 is seated. The seating surface 1231k may be an inclined surface. In addition, the holder 1231 may include a step portion 1231b on the seating surface 1231k. In addition, in the holder 1231, the step portion 1231b may be coupled to the protruding portions 1232a of the optical member 1232.

The holder 1231 may include the plurality of outer side surfaces. For example, the holder 1231 may include a first holder outer side surface 1231S1, a second holder outer side surface 1231S2, a third holder outer side surface 1231S3, and a fourth holder outer side surface 1231S4. The description of the above-described embodiment may be equally applied to the description about this.

Specifically, the fourth holder outer side surface 1231S4 may include the fourth seating groove 1231S4a. In addition, the first member 1231a, the second member 1226, and the tilting guide unit 1241 may be sequentially positioned in the fourth seating groove 1231S4a in the third direction (Z-axis direction).

In the embodiment, the fourth seating groove 1231S4a may include a plurality of regions. The fourth seating groove 1231S4a may include a first region AR1, a second region AR2, and a third region AR3.

The first member 1231a may be positioned in the first region AR1. That is, the first region AR1 may overlap the first member 1231a in the first direction (X-axis direction).

The second member 1226 may be positioned in the second region AR2. That is, the second region AR2 may overlap the second member 1226 in the first direction (X-axis direction).

The tilting guide unit 1241 may be positioned in the third region AR3. In addition, the third region AR3 may overlap the tilting guide unit 1241 in the first direction (X-axis direction). Particularly, the third region AR3 may overlap a base of the tilting guide unit 1241 in the first direction (X-axis direction).

In addition, according to the embodiment, the second region AR2 may be positioned between the first region AR1 and the third region AR3. In addition, heights of the first region AR1, the second region AR2, and the third region AR3 in the first direction (X-axis direction) may be different. In the embodiment, the height of the first region AR1 may be greater than the height of the second region AR2 and the height of the third region AR3 in the first direction (X-axis direction). Accordingly, a step may be positioned between the first region AR1 and the second region AR2.

The first member 1231a may be seated in the fourth holder outer side surface 1231S4. A second coupling part PP2 may be positioned on an outer side surface (for example, a surface opposite to a surface facing the second member) of the first member 1231a. The second coupling part PP2 may include a coupling base PP2a and second coupling protruding portions PP2b. The second coupling part PP2 may be disposed to overlap the first protruding portion, which will be described below, in the first direction (X-axis direction).

The second coupling protruding portion PP2b may be provided as a plurality of second coupling protruding portions PP2b spaced apart from each other in the second direction (Y-axis direction). In this case, all bisectors between the plurality of second coupling protruding portions PP2b may be positioned on top points of the first protruding portions in the first direction (X-axis direction).

Figure 24:
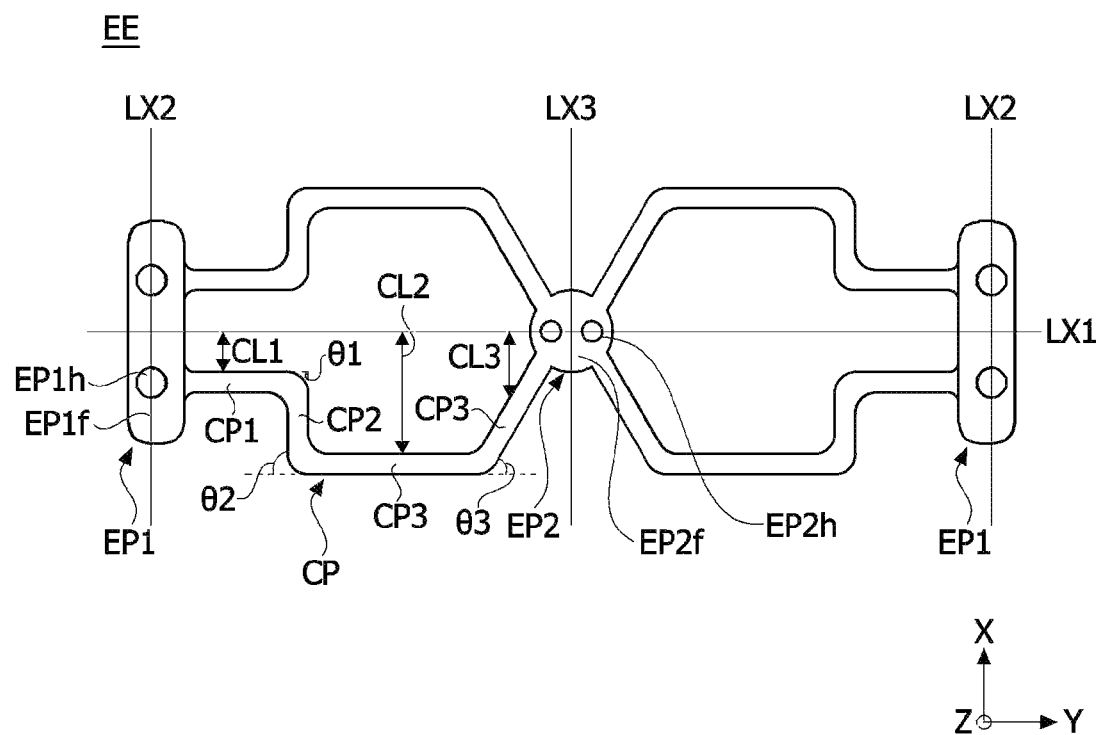
FIG. 24 is a plan view illustrating an elastic member according to another embodiment.
Figure 25:
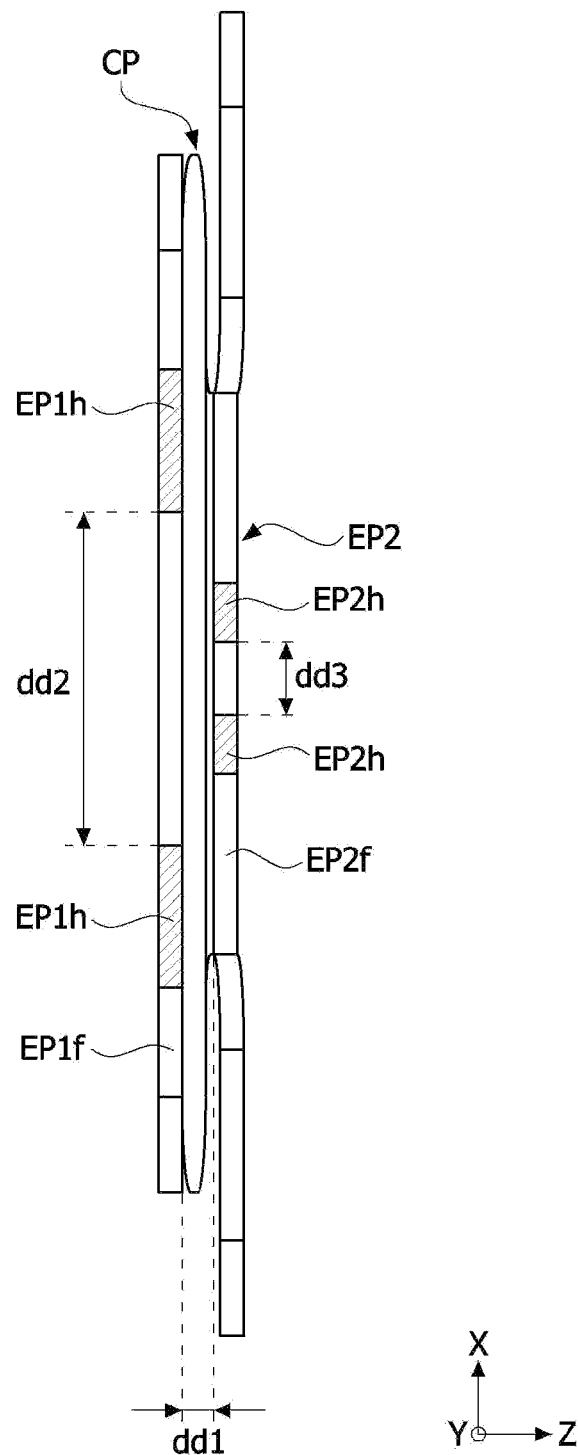
FIG. 25 is a side view illustrating the elastic member according to another embodiment.
Figure 26:
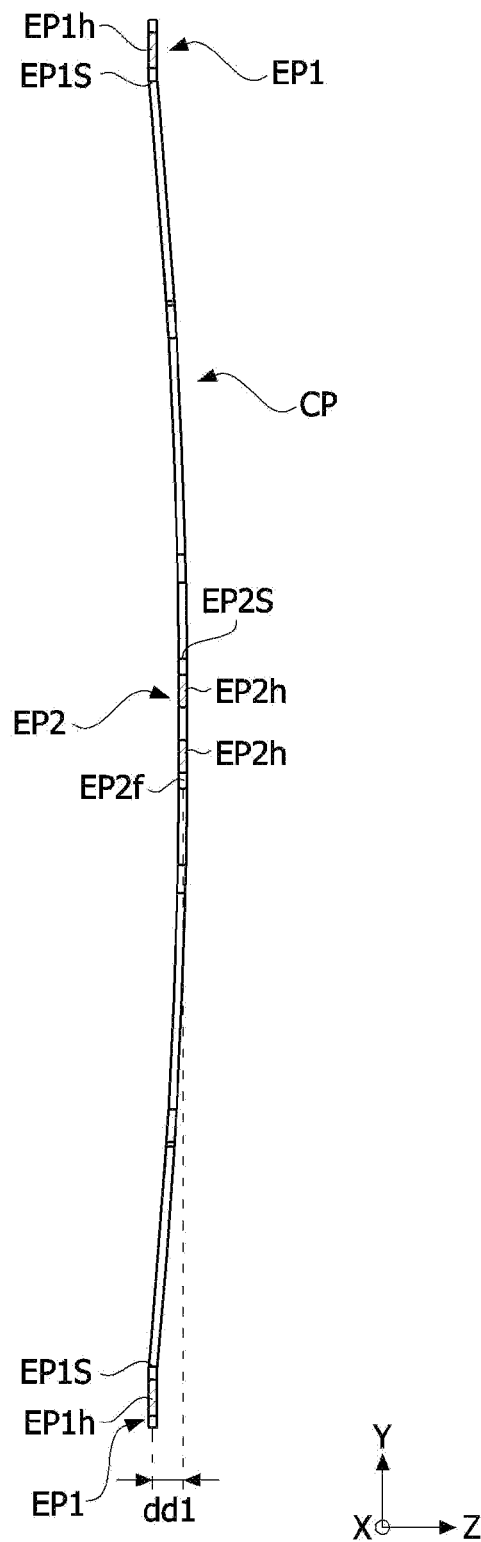
FIG. 26 is a top view illustrating the elastic member according to another embodiment.
Figure 27:
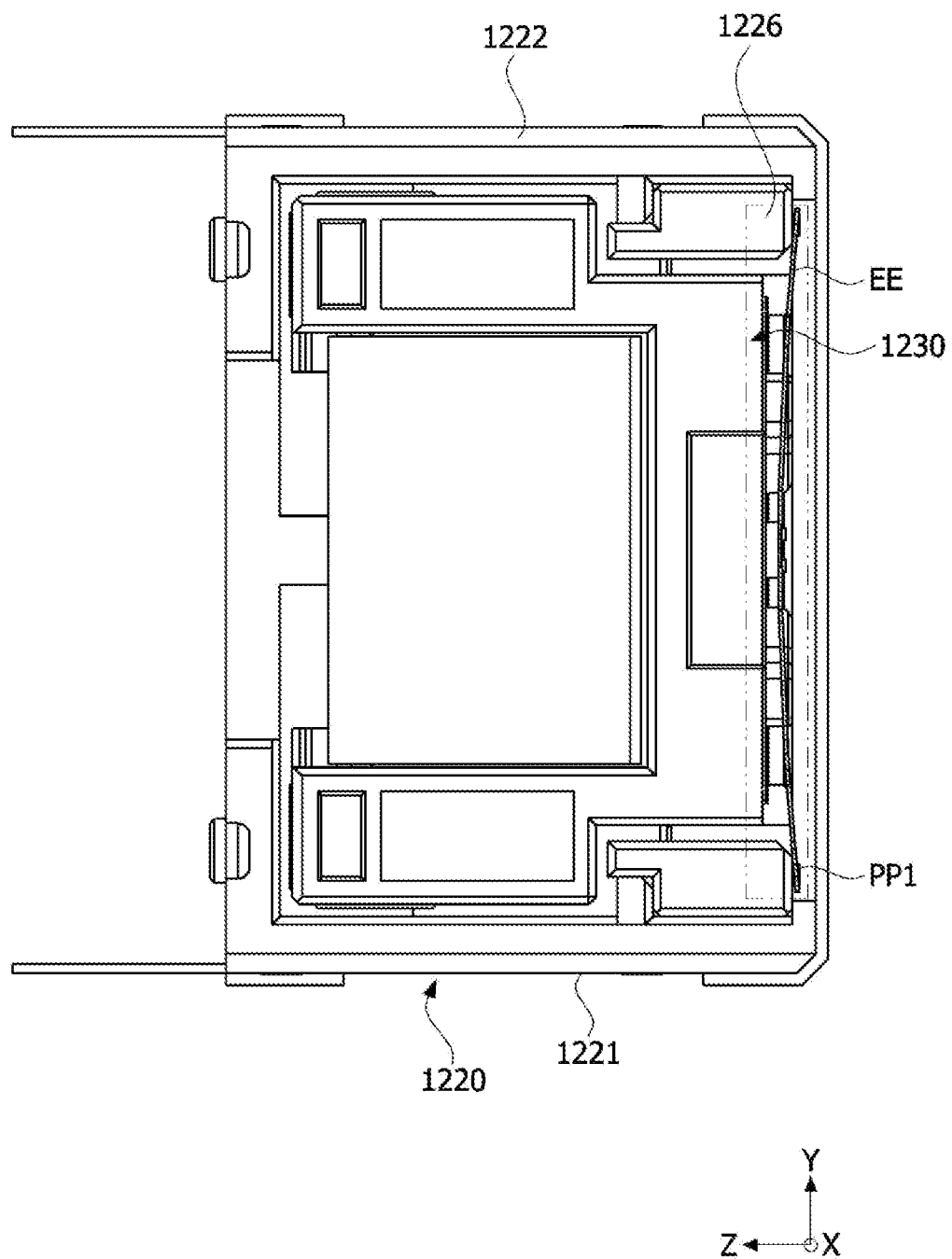
FIG. 27 is a view for describing that a first member, a second member, and the elastic member are coupled in the first camera actuator according to another embodiment.
Figure 28:
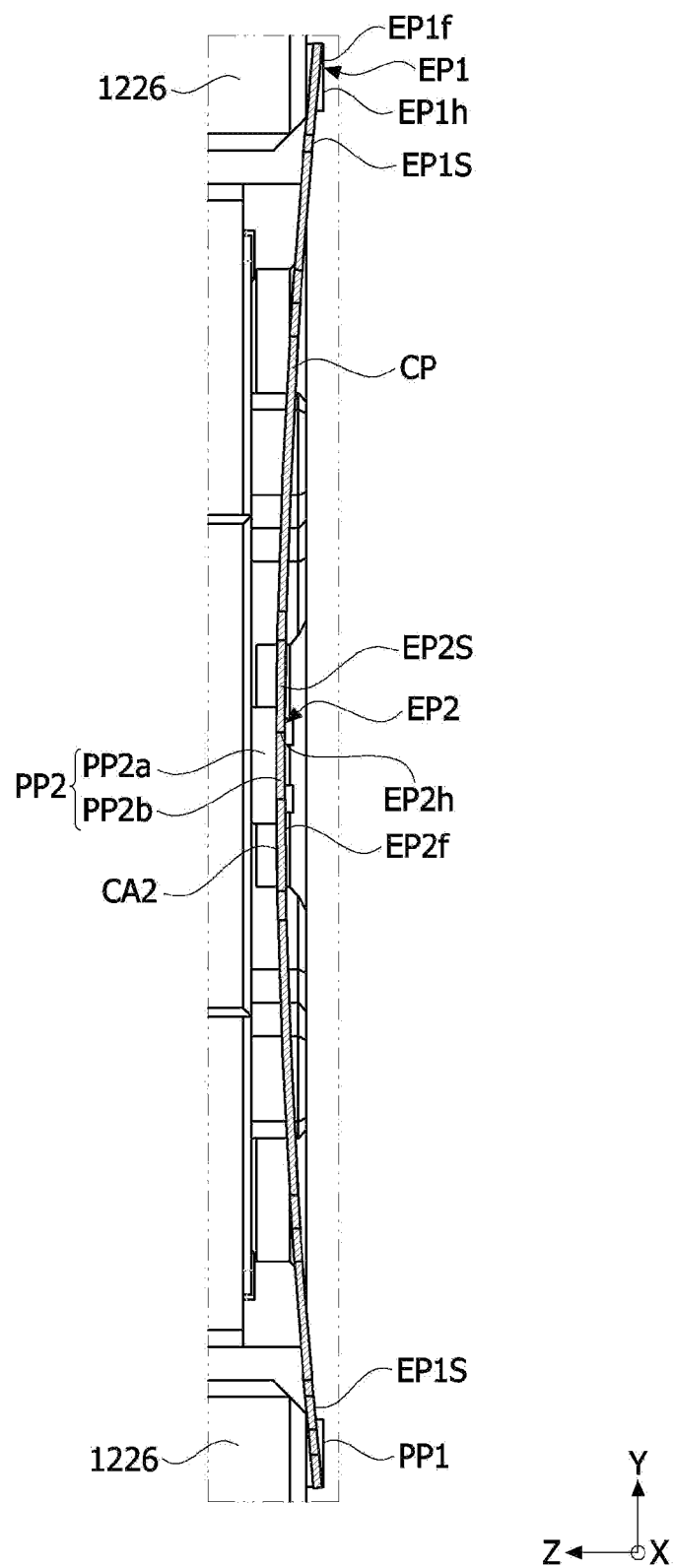
FIG. 28 is an enlarged view illustrating portion K in FIG. 27.

FIG. 24 is a plan view illustrating the elastic member according to another embodiment, FIG. 25 is a side view illustrating the elastic member according to another embodiment, and FIG. 26 is a top view illustrating the elastic member according to another embodiment. FIG. 27 is a view for describing that the first member, the second member, and the elastic member are coupled in the first camera actuator according to another embodiment, and FIG. 28 is an enlarged view illustrating portion K in FIG. 27.

Referring to FIGS. 24 to 28, the elastic member EE according to another embodiment includes a first bonding parts EP1, a second bonding part EP2, and connecting parts CP.

The first bonding parts EP1 may be connected to the housing 1220, and the first bonding parts EP1 and the housing 1220 may be coupled to each other. The first bonding part EP1 may be provided as a plurality of first bonding parts EP1. Hereinafter, the present invention will be described based on two first bonding parts EP1.

In addition, the first bonding parts EP1 may be coupled to the fixed member. That is, the first bonding parts EP1 may be coupled to the housing 1220 or the second member 1226. Hereinafter, like the drawings, the first bonding parts EP1 may be coupled to the second member 1226.

In addition, the second bonding part EP2 may be coupled to the first member 1231a, and the second bonding part EP2 and the first member 1231a may be coupled to each other.

The connecting parts CP may be disposed between the first bonding parts EP1 and the second bonding part EP2. That is, one ends of the connecting parts CP may be connected to the first bonding parts EP1, and the other ends may be connected to the second bonding part EP2.

In the embodiment, the second bonding part EP2 may be positioned between the plurality of first bonding parts EP1 spaced apart from each other. Specifically, the second bonding part EP2 may be disposed between the mover 1230 and the first bonding parts EP1. That is, the second bonding part EP2 may be spaced apart from the first bonding parts EP1 in the third direction (Z-axis direction). Accordingly, the connecting parts CP may extend from the first member 1231a toward the second member 1226. Alternatively, the connecting parts CP may extend in the third direction (Z-axis direction). For example, the connecting parts CP may have a shape bent from the first bonding parts EP1 toward the second bonding part EP2. Accordingly, an elastic restoring force generated by the elastic member EE may be generated from the second bonding part EP2 toward the first bonding parts EP1 because the first bonding parts EP1 are fixed (the housing is fixed). Accordingly, a force may be generated from the second bonding part EP2 toward the first bonding parts EP1 at the first member 1231a connected to the second bonding part EP2 and the mover 1230 connected to the first member 1231a. Accordingly, the above-described force may also be applied between the mover 1230 and the tilting guide unit 1241. In addition, since the tilting guide unit 1241 ultimately presses the second member 1226, the position of the tilting guide unit 1241 may be maintained between the mover 1230 and the second member 1226 (or the housing) to perform first axis tilting or second axis tilting which will be described below. In addition, due to a separation distance dd1 between each of the first bonding parts EP1 and the second bonding part EP2 in the third direction (Z-axis direction), the elastic member EE may have the pre-load which is the above-described force.

In addition, the second bonding part EP2 of the elastic member EE may not be disposed on a surface in contact with the first bonding parts EP1 of the elastic member EE and one surface of the first member 1226 which is the fixed member. In other words, the second bonding part EP2 of the elastic member EE may not be disposed on a plane (XY plane) on which one surface (for example, a surface in contact with the second member) of the first bonding part EP1 of the elastic member EE is disposed or a surface in contact with the second member is disposed. That is, as described above, the first bonding parts EP1 and the second bonding part EP2 may be positioned on different planes (XY) and may be spaced from each other in the third direction (Z-axis direction). Accordingly, the second bonding part EP2 may be positioned closer to a reflection member than the first bonding parts EP1.

In addition, in the embodiment, even when the pre-load is generated in a direction opposite to the third direction (for example, a direction from the tilting guide unit toward the second member), the position of the tilting guide unit 1241 may be easily maintained. In addition, since a magnetic member and the like are not used, a malfunction of another camera actuator (for example, a first camera actuator) adjacent to the first camera actuator due to a magnetic force can be inhibited. In addition, in the camera actuator according to another embodiment, the magnetic member and the like are not used, the elastic member which is light and thin is used, and thus miniaturization can be easily achieved. In addition, the second bonding part EP2 may be disposed between the mover 1230 and the first bonding parts EP1.

In addition, in the embodiment, the first bonding parts EP1 may include first flat regions EP1*f* and a plurality of first bonding holes EP1*h* positioned in the first flat regions EP1*f*.

Inner side surfaces of the first flat regions EP1*f* may be spaced apart from contact areas CA1 in which the housing and the first flat regions EP1*f* are in contact with each other in the second direction (Y-axis direction). In other words, the inner side surfaces of the first flat regions EP1*f* may be positioned further inward than the contact areas CA1 in which the housing and the first flat regions EP1*f* are in contact with each other.

Accordingly, the second member 1226 in contact with the first flat regions EP1*f* may not interfere with the connecting parts CP. Accordingly, the camera actuator according to another embodiment may accurately perform X-axis tilting and/or Y-axis tilting.

In addition, the second bonding part EP2 may include a second flat region EP2*f* and a plurality of second bonding holes EP2*h* positioned in the second flat region EP2*f*.

An outer side surface EP2*s* of the second flat region EP2*f* may be spaced apart from a contact area CA2, in which the second flat region EP2*f* is in contact with the coupling base PP2*a* of the first member 1231*a*, in the second direction (Y-axis direction). In other words, the outer side surface EP2*s* of the second flat region EP2*f* may be positioned further outward than an outer side surface the coupling base PP2*a*. Accordingly, the first member 1231*a* in contact with the second flat region EP2*f* may not interfere with the connecting parts CP. Accordingly, the camera actuator according to another embodiment can accurately perform X-axis tilting and/or Y-axis tilting.

In addition, the first bonding hole EP1*h* and the second bonding hole EP2*h* may be provided as a plurality of first bonding holes EP1*h* and a plurality of second bonding holes EP2*h*.

In addition, the first bonding holes EP1*h* may be spaced apart from each other in the first direction (X-axis direction). In addition, the second bonding holes EP2*h* may be spaced apart from each other in the second direction (Y-axis direction).

In the embodiment, a length dd3 (for example, a diameter) of the second bonding hole EP2*h* in the first direction (X-axis direction) may be smaller than a length dd2 between the plurality of first bonding holes EP1*h* in the first direction (X-axis direction).

In addition, the second bonding holes EP2*h* may be positioned between the first bonding holes EP1*h*. For example, the second bonding holes EP2*h* may be disposed on a first bisector LX1 which bisects between the first bonding holes EP1*h*. Accordingly, in the camera actuator according to another embodiment, a force applied by the elastic member EE can be uniformly applied to both an upper portion and a lower portion of the mover.

When Y-axis tilting is performed, a current provided to the first coil and the second coil may not be differently changed according to plus (+)/minus (−) with respect to the Y-axis. That is, a variation range of the current provided to the first coil and the second coil may be uniform to correspond to a position of the mover. Accordingly, control for a Y-axis tilt can be easily performed. In addition, since an elastic restoring force is uniformly generated in one region of the elastic member EE, the reliability of the elastic member EE can be improved.

In addition, second bisectors LX2 connecting centers of the first bonding holes EP1*h* in the first bonding parts EP1 (or the first flat regions) and a third virtual line LX3 bisecting between the second bonding holes EP2*h* may parallel to each other. Accordingly, in the camera actuator according to another embodiment, a force applied by the elastic member EE can be uniformly provided even when the mover moves.

When X-axis tilting is performed, an amount of a current provided to the third coil may not be differently changed according to plus (+)/minus (−) with respect to the X-axis. That is, a variation range of the current provided to the third coil may be uniform to correspond to the position of the mover. Accordingly, control for the X-axis tilt can be easily performed. In addition, since an elastic restoring force is uniformly generated in one region of the elastic member, the reliability of the elastic member EE can be improved.

In addition, the second bisectors LX2 and the third virtual line LX3 may be in parallel in the first direction (X-axis direction).

In the embodiment, the connecting parts CP may include first connecting parts CP1, second connecting parts CP2, third connecting parts CP3, and fourth connecting parts CP4 which are positioned between the first bonding parts EP1 and the second bonding part EP2.

The first connecting parts CP1, the second connecting parts CP2, the third connecting parts CP3, and the fourth connecting parts CP4 may be sequentially disposed from the first bonding part EP1 to the second bonding part EP2. That is, the first connecting parts CP1, the second connecting parts CP2, the third connecting parts CP3, and the fourth connecting parts CP4 may be sequentially disposed from the outside toward the inside.

In addition, the first connecting parts CP1, the second connecting parts CP2, the third connecting parts CP3, and the fourth connecting parts CP4 may be symmetrically disposed with respect to the second bonding part EP2. In addition, the first connecting parts CP1, the second connecting parts CP2, the third connecting parts CP3, and the fourth connecting parts CP4 may be symmetrically disposed with respect to the third virtual line LX3. In addition, the first connecting parts CP1, the second connecting parts CP2, the third connecting parts CP3, and the fourth connecting parts CP4 may also be symmetrically disposed with respect to the first bisector LX1.

One end portion of each of the first connecting parts CP1 may be in contact with the first bonding part EP1. In addition, the first connecting part CP1 may extend toward the second bonding part EP2. That is, the first connecting part CP1 may be in contact with the first bonding part EP1 and may extend inward.

Each of the second connecting parts CP2 may be connected to the other end portion of the first connecting part CP1. That is, one end portion of the second connecting part CP2 may be in contact with the other end portion of the first connecting part CP1.

The second connecting part CP2 may be bent from the first connecting part CP1 in the first direction (X-axis direction). In the embodiment, the second connecting part CP2 may extend downward under the first bisector LX1 or extend upward above the first bisector LX1. Accordingly, the second connecting part CP2 may extend to be inclined at a first inclination θ1 with respect to the first connecting part CP1. For example, the first inclination may be 90°.

Each of the third connecting parts CP3 may be connected to the other end portion of the second connecting part CP2. That is, one end portion of the third connecting part CP3 may be in contact with the other end portion of the second connecting part CP2.

The third connecting part CP3 may be bent from the second connecting part CP2 in the second direction (Y-axis direction). In the embodiment, the third connecting part CP3 may extend from the second connecting part CP2 toward the second bonding part EP2. In addition, the third connecting part CP3 may extend to a right side from a left side of the third virtual line LX3 or extend to the left side from the right side of the third virtual line Lx3.

In addition, the third connecting part CP3 may extend to be inclined at a second inclination θ2 with respect to the second connecting part CP2. The second inclination may be the same as the first inclination.

Each of the fourth connecting parts CP4 may be connected to the other end portion of the third connecting part CP3. One end portion of the fourth connecting part CP4 may be in contact with the other end portion of the third connecting part CP3. In addition, the other end portion of the fourth connecting part CP4 may be connected to the second bonding part EP2.

The fourth connecting part CP4 may extend toward the third virtual line LX3 at a predetermined inclination with respect to the third connecting part CP3. That is, the fourth connecting part CP4 may bent toward the second bonding part EP2 at the predetermined angle with respect to the third connecting part CP3

The fourth connecting part CP4 may extend to be inclined at a third inclination θ3 with respect to the third connecting part CP3. The third inclination θ3 may be smaller than the first inclination θ1 and the second inclination θ2.

In the embodiment, the elastic member EE may have two closed loops which are formed by the first bonding parts EP1, the second bonding part EP2, and the connecting parts CP and are symmetrical with respect to the third virtual line LX3 or the second bonding part EP2. In addition, in each of the closed loop, a height of the first connecting part CP1 may be maintained. That is, a separation distance CL1 between the first connecting part CP1 and the first bisector LX1 may be the same.

In addition, in the closed loop, a height of the second connecting part CP2 and a height of the third connecting part CP3 may be greater than the height of the first connecting part CP1. That is, the separation distance CL1 between the first connecting part CP1 and the first bisector LX1 may be smaller than a separation distance CL2 between the third connecting part CP3 and the first bisector LX1. In other words, in the second connecting part CP2 and the third connecting part CP3, the height (a length in the first direction (X-axis direction)) may increase compared to the first connecting part CP1 in the closed loop.

In addition, in the closed loop, the height between the third connecting parts CP3 may be maintained.

In addition, in the closed loop, a separation distance CL3 between the fourth connecting part CP4 and the first virtual line LX3 may decrease to a predetermined length in a direction toward the third virtual line. That is, in the closed loop, the height may be decreased according to a predetermined inclination by the fourth connecting part CP4. Accordingly, the fourth connecting part CP4 may be in contact with the second bonding part EP2.

Figure 29:
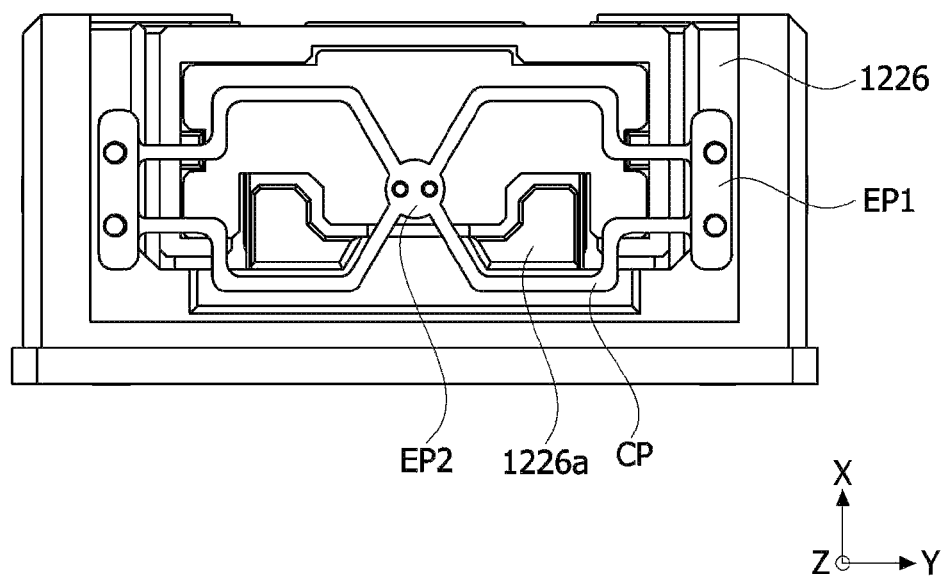
FIG. 29 is a view for describing that the first member, the second member, and the elastic member are coupled in the first camera actuator according to another embodiment.
Figure 30:
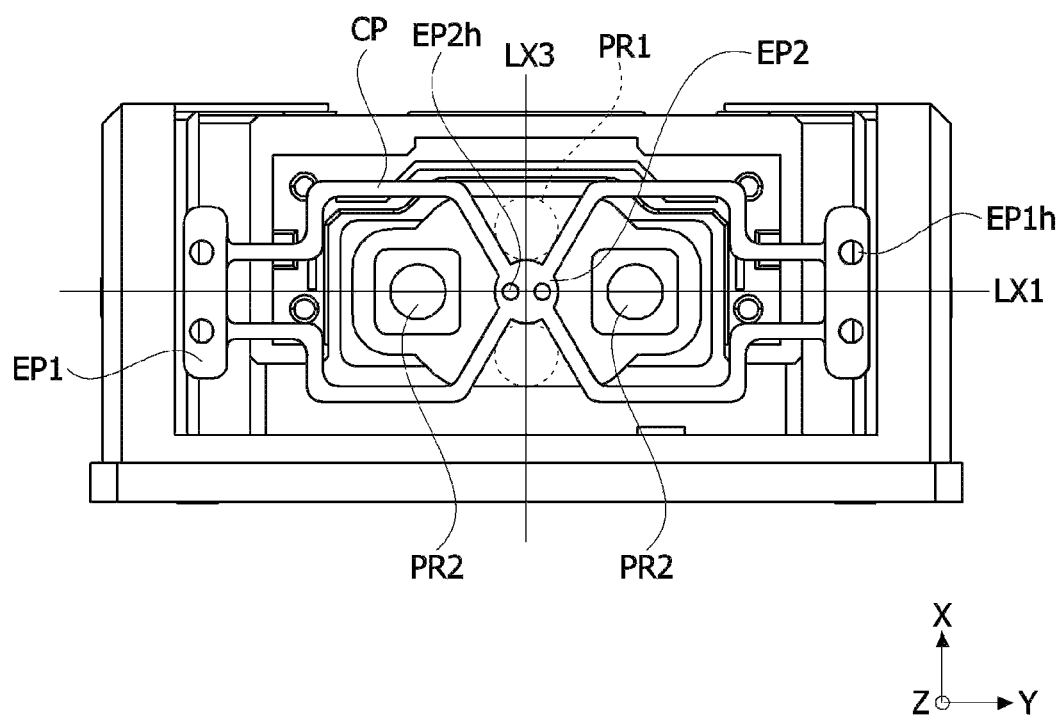
FIG. 30 is a view in which the first member is removed from the first camera actuator in FIG. 29.

FIG. 29 is a view for describing that the first member, the second member, and the elastic member are coupled in the first camera actuator according to another embodiment, and FIG. 30 is a view in which the first member is removed from the first camera actuator in FIG. 29.

Referring to FIGS. 29 and 30, in the first camera actuator according to another embodiment, the second bonding part EP2 may overlap the first protruding portions PR1 in the second axis or the first direction.

In addition, in the base which will be described below, the top points of the first protruding portions PR1 may be disposed on an intermediate axis (corresponding to the above-described third virtual line) bisecting the plurality of second bonding holes EP2h.

By using such a structure, when second axis tilting is performed by the first protruding portions PR1, a force applied to the tilting guide unit by the elastic member EE may be uniformly generated with respect to the second axis or first direction.

In addition, the second member 1226 may include a protruding region 1226a protruding rearward. The protruding region 1226a may partially overlap the elastic member EE in the second direction (Y-axis direction). Accordingly, the connecting parts CP of the elastic member EE may be formed as a structure surrounding the protruding region 1226a. By using such a structure, a center of gravity can be easily adjusted by reducing a weight.

In addition, top points of the second protruding portions PR2 may be positioned on the first bisector LX1. That is, the top points of the second protruding portions PR2 may be disposed on the first bisector LX1 bisecting a space between the first bonding holes EP1h. Accordingly, in the camera actuator according to another embodiment, a force pressed by the elastic member EE may be uniformly provided to all of an upper portion or a lower portion of the mover.

Figure 31:
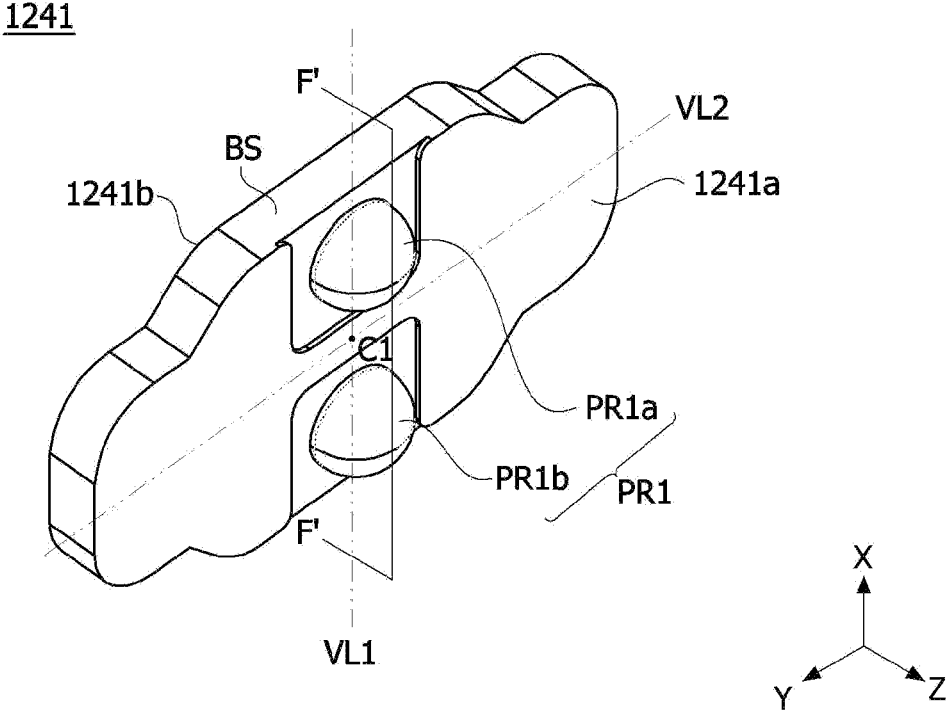
FIG. 31 is a perspective view illustrating a tilting guide unit according to another embodiment.
Figure 32:
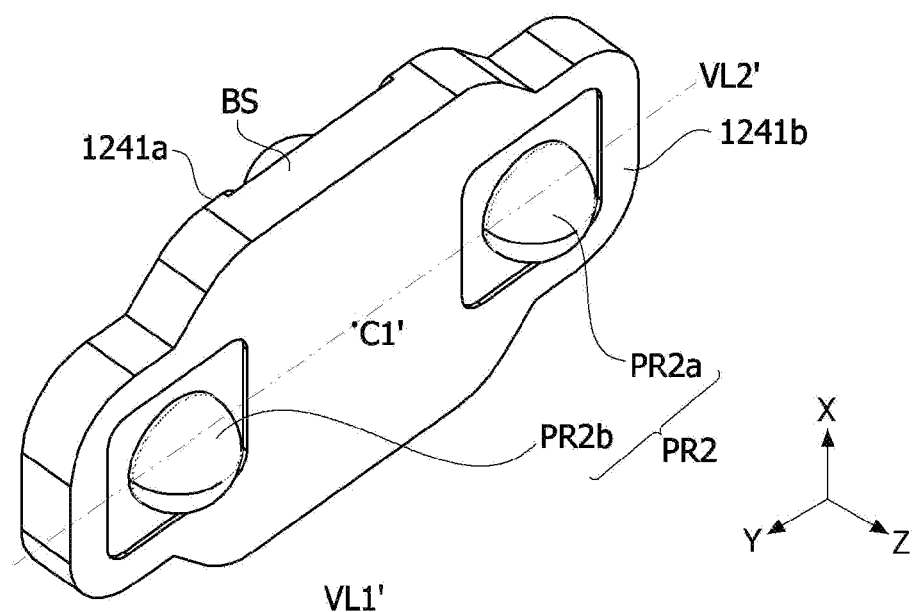
FIG. 32 is a perspective view illustrating the tilting guide unit in a direction different from a direction in FIG. 31.
Figure 33:
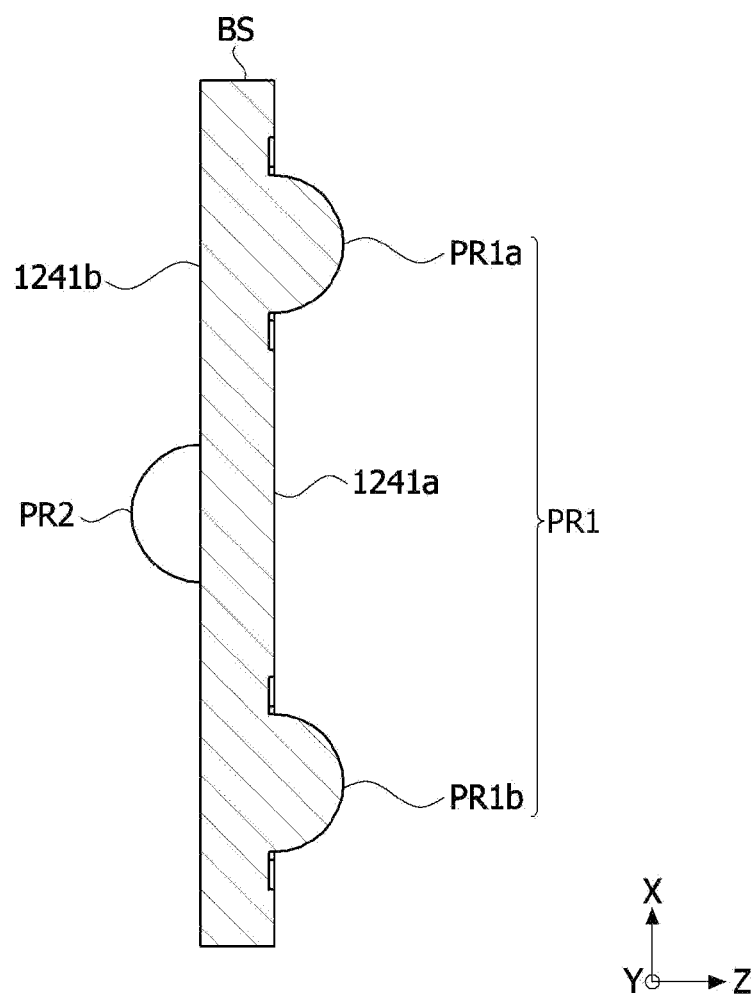
FIG. 33 is a cross-sectional view illustrating the tilting guide unit along line FF' in FIG. 31.

FIG. 31 is a perspective view illustrating the tilting guide unit according to another embodiment, FIG. 32 is a perspective view illustrating the tilting guide unit in a direction different from a direction in FIG. 31, and FIG. 33 is a cross-sectional view illustrating the tilting guide unit along line FF' in FIG. 31.

Referring to FIGS. 31 to 33, the tilting guide unit 1241 according to another embodiment may include a base BS, the first protruding portions PR1 protruding from a first surface 1241a of the base BS, and the second protruding portions PR2 protruding from a second surface 1241b of the base BS. In addition, as described above, the surfaces on which the first protruding portions and the second protruding portions are formed may be opposite to each other according to a structure, the present invention will be described based on the above-described content.

First, the base BS may include the first surface 1241a and the second surface 1241b opposite to the first surface 1241a. That is, the first surface 1241a may be spaced apart from the second surface 1241b in the third direction (Z-axis direction), and in the tilting guide unit 1241, the first surface 1241a and the second surface 1241b may be outer side surfaces which are opposite to or face each other.

The tilting guide unit 1241 may include the first protruding portions PR1 extending from the first surface 1241a toward one side. According to the embodiment, the first protruding portions PR1 may protrude from the first surface 1241a toward the mover. The first protruding portion PR1 may be provided as a plurality of first protruding portions PR1 which may include a 1-1 protruding portion PR1a and a 1-2 protruding portion PR1b.

The 1-1 protruding portion PR1a and the 1-2 protruding portion PR1b may be positioned in parallel in the first direction (X-axis direction). In other words, the 1-1 protruding portion PR1a and the 1-2 protruding portion PR1b may overlap in the first direction (X-axis direction). In addition, in the embodiment, the 1-1 protruding portion PR1a and the 1-2 protruding portion PR1b may be bisected by a virtual line extending in the first direction (X-axis direction).

In addition, each of the 1-1 protruding portion PR1a and the 1-2 protruding portion PR1b may have a curvature, and, for example, a hemispherical shape.

In addition, the tilting guide unit 1241 may include the second protruding portions PR2 extending from the second surface 1241a toward one side. According to the embodiment, the second protruding portions PR2 may protrude from the second surface 1241b toward the housing. In addition, the second protruding portion PR2 may be provided as a plurality of second protruding portions PR2 which may include a 2-1 protruding portion PR2a and a 2-2 protruding portion PR2b in the embodiment.

The 2-1 protruding portion PR2a and the 2-2 protruding portion PR2b may be positioned in parallel in the second direction (Y-axis direction). That is, the 2-1 protruding portion PR2a and the 2-2 protruding portion PR2b may overlap in the second direction (Y-axis direction). In addition, in the embodiment, the 2-1 protruding portion PR2a and the 2-2 protruding portion PR2b may be bisected by a virtual line VL2' extending in the second direction (Y-axis direction).

Each of the 2-1 protruding portion PR2a and the 2-2 protruding portion PR2b may have a curvature and, for example, a hemispherical shape. In addition, the 2-1 protruding portion PR2a and the 2-2 protruding portion PR2b may be in contact with the first member 1231a at point spaced apart from the second surface 1241b of the base BS.

The 1-1 protruding portion PR1a and the 1-2 protruding portion PR1b may be positioned in a region between the 2-1 protruding portion PR2a and the 2-2 protruding portion PR2b in the second direction. According to the embodiment, the 1-1 protruding portion PR1a and the 1-2 protruding portion PR1b 2-1 may be positioned in a central region of a separation space between the protruding portion PR2a and the 2-2 protruding portion PR2b in the second direction. By using such a structure, the actuator according to another embodiment may allow an angle of an X-axis tilt to have the same range about the X-axis. In other words, the tilting guide unit 1241 may provide the same range (for example, a plus/minus range), within which X-axis tilting of the mover is to be performed, about the X-axis based on the 1-1 protruding portion PR1a and the 1-2 protruding portion PR1b.

In addition, the 2-1 protruding portion PR2a and the 2-2 protruding portion PR2b may be positioned in a region between the 1-1 protruding portion PR1a and the 1-2 protruding portion PR1b in the first direction. According to the embodiment, the 2-1 protruding portion PR2a and the 2-2 protruding portion PR2b may be positioned in a central region of a separation space between the 1-1 protruding portion PR1a and the 1-2 protruding portion PR1b in the first direction. By using such a structure, the actuator according to another embodiment may allow an angle of a Y-axis tilt to have the same range about the Y-axis. In other words, the same range (for example, a plus/minus range), within which Y-axis tilting of the mover may be performed, may be provided about the Y-axis based on the 2-1 protruding portion PR2a and the 2-2 protruding portion PR2b.

The first protruding portions PR1 may be positioned on a first virtual line VL1. In this case, the first virtual line VL1 is a line which bisects the first surface 1241a in the second direction (Y-axis direction). Accordingly, the tilting guide unit 1241 may easily perform X-axis tilting using the first protruding portions PR1. In addition, since the tilting guide unit 1241 performs the X-axis tilt about the first virtual line VL1, a rotational force can be uniformly applied to the tilting guide unit 1241. Accordingly, the X-axis tilting can be delicately performed, and the reliability of the element can be improved.

In addition, the 1-1 protruding portion PR1a and the 1-2 protruding portion PR1b may be symmetrically disposed with respect to the first virtual line VL1 and the second virtual line VL2. Alternatively, the 1-1 protruding portion PR1a and the 1-2 protruding portion PR1b may be symmetrically positioned with respect to a first central point C1. By using such a structure, when X-axis tilting is performed, the same support force supported by the first protruding portions PR1 can be applied to an upper side and a lower side with respect to the second virtual line VL2. Accordingly, the reliability of the tilting guide unit can be improved. In this case, the second virtual line VL2 is a line which bisects the first surface 1241a in the first direction (X-axis direction). In addition, the first central point C1 may be an intersection point of the first virtual line VL1 and the second virtual line VL2. Alternatively, the first central point C1 may be a point corresponding to a center of gravity according to a shape of the tilting guide unit 1241.

In addition, since the tilting guide unit 1241 performs Y-axis tilting about a fourth bisector VL2', a rotational force can be uniformly applied to the tilting guide unit 1241. Accordingly, the Y-axis tilting can be delicately performed, and the reliability of the element can be improved.

In addition, the 2-1 protruding portion PR2a and the 2-2 protruding portion PR2b may be on the fourth bisector VL2' disposed to be symmetrical with respect to a third bisector VL1'. Alternatively, the 2-1 protruding portion PR2a and the 2-2 protruding portion PR2b may be symmetrically positioned with respect to a second central point C1'. By using such a structure, when Y-axis tilting is performed, the same support force supported by the second protruding portion PR2 may be applied to an upper side and a lower side of the tilting guide unit with respect to the fourth bisector VL2'. Accordingly, the reliability of the tilting guide unit can be improved. In this case, the third bisector VL1' is a line which bisects the second surface 1241b in the second direction (Y-axis direction). The fourth bisector VL2' is a line which bisects the second surface 1241b in the first direction (X-axis direction). In addition, the second central point C1' may be an intersection point of the third bisector VL1' and the fourth bisector VL2'. Alternatively, the second central point C1' may be a point corresponding to the center of gravity according to the shape of the tilting guide unit 1241.

In addition, the above-described content may be equally applied to the description of the first protruding portions PR1 and the second protruding portions PR2. In addition, a shape of the base BS may be variously changed according to a weight or a fastening structure of the camera actuator.

Figure 34:
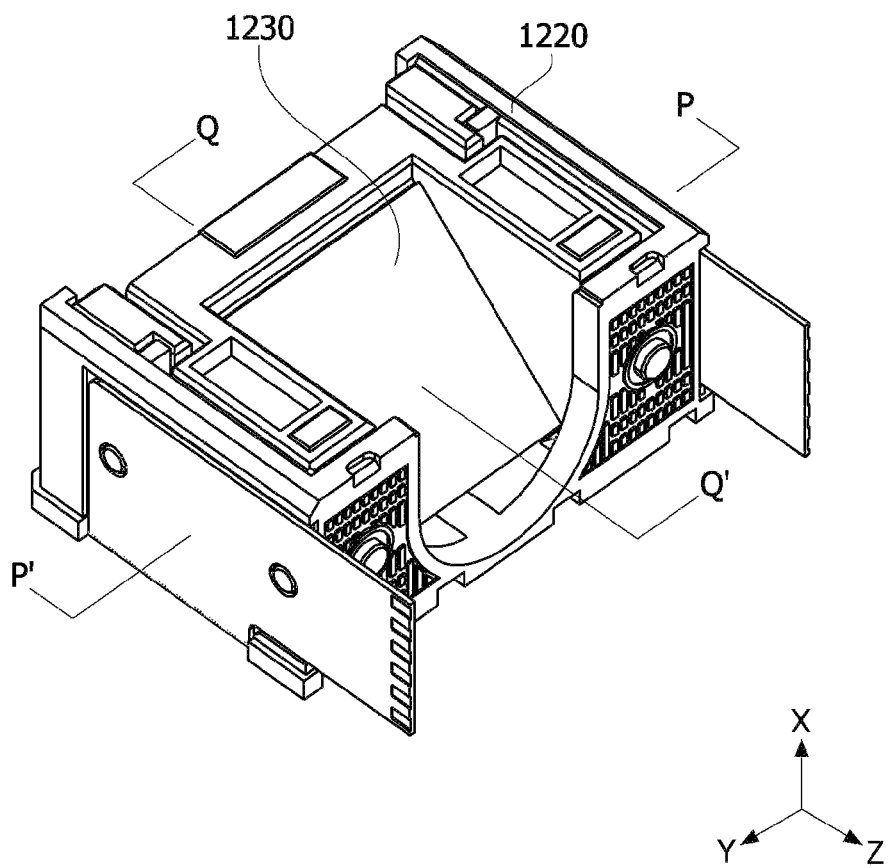
FIG. 34 is a perspective view illustrating the first camera actuator from which a shield can and a substrate are removed according to another embodiment.
Figure 35:
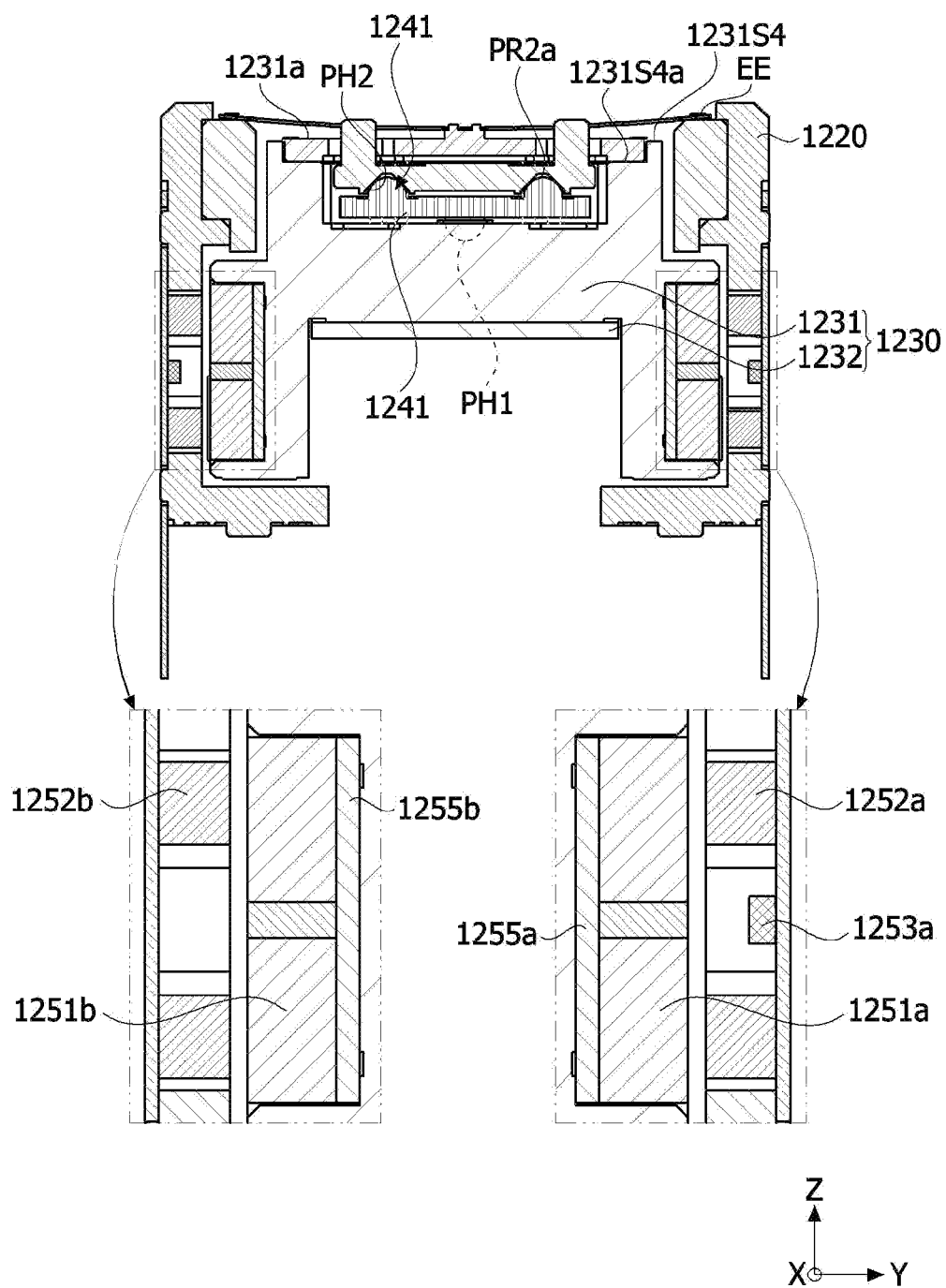
FIG. 35 is a cross-sectional view along line PP' in FIG. 34.
Figure 36:
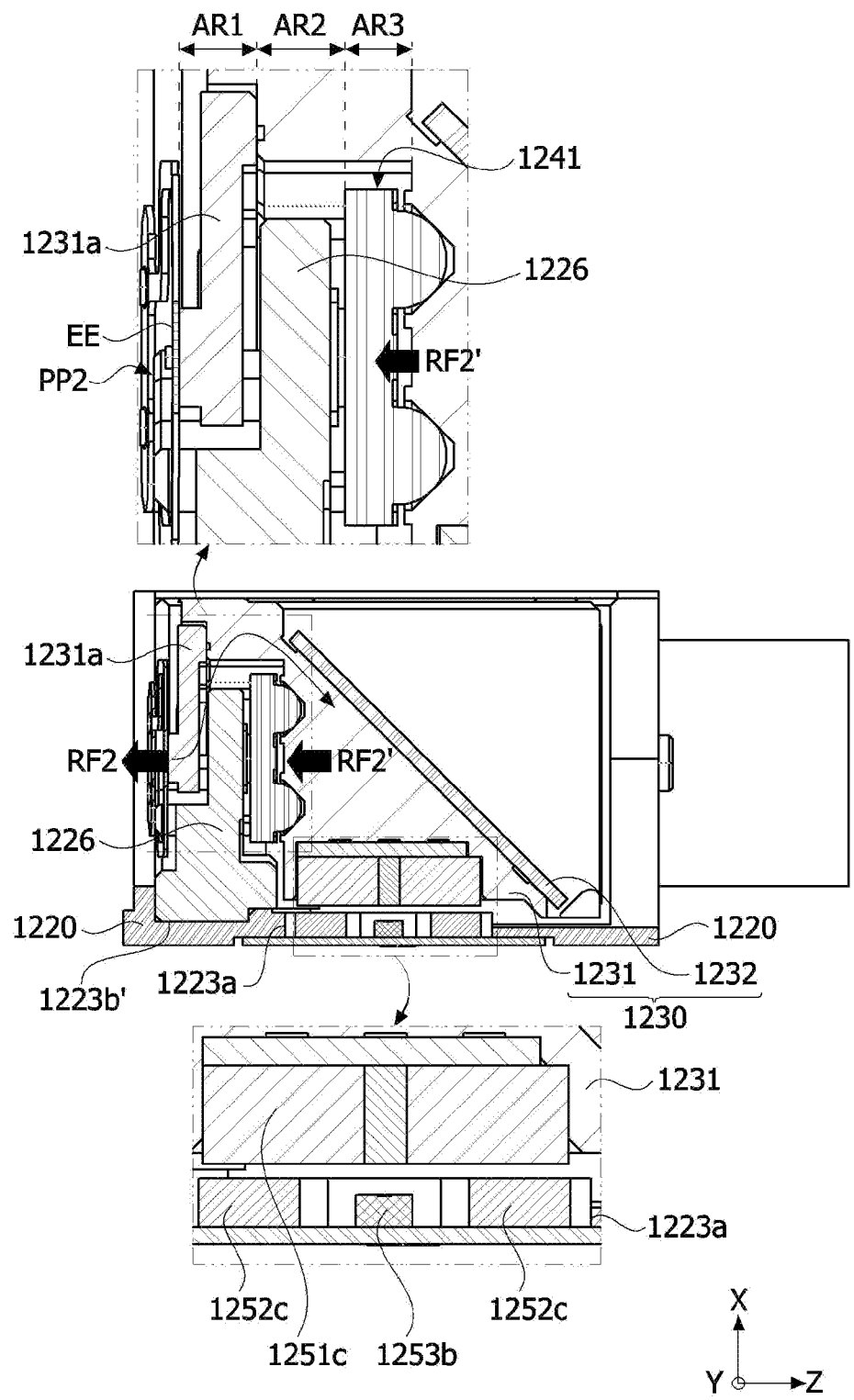
FIG. 36 is a cross-sectional view along line QQ' in FIG. 34.

FIG. 34 is a perspective view illustrating the first camera actuator from which the shield can and a substrate are removed according to another embodiment, FIG. 35 is a cross-sectional view along line PP' in FIG. 34, and FIG. 36 is a cross-sectional view along line QQ' in FIG. 34.

Referring to FIGS. 34 to 36, the first coil 1252a may be positioned on the first housing side portion 1221, and the first magnet 1251a may be positioned on the first holder outer side surface 1231S1 of the holder 1231. Accordingly, the first coil 1252a and the first magnet 1251a may be positioned opposite to each other. At least a part of the first magnet 1251a may overlap the first coil 1252a in the second direction (Y-axis direction).

In addition, the second coil 1252b may be positioned on the second housing side portion 1222, and the second magnet 1251b may be positioned on the second holder outer side surface 1231S2 of the holder 1231. Accordingly, the second coil 1252b and the second magnet 1251b may be positioned opposite to each other. At least a part of the second magnet 1251b may overlap the second coil 1252b in the second direction (Y-axis direction).

In addition, the first coil 1252a and the second coil 1252b may overlap in the second direction (Y-axis direction), and the first magnet 1251a and the second magnet 1251b may overlap in the second direction (Y-axis direction).

By using such a structure, an electromagnetic force applied to the outer side surfaces (the first holder outer side surface and the second holder outer side surface) of the holder may be applied along a parallel axis in the second direction (Y-axis direction), and thus X-axis tilting can be accurately and precisely performed.

In addition, the second protruding portions PR2a and PR2b of the tilting guide unit 1241 may be in contact with the second member 1226 of the housing 1220. The second protruding portions PR2 may be seated in the second protrusion grooves PH2 formed in one side surface of the second member 1226. In addition, when X-axis tilting is performed, the second protruding portions PR2a and PR2b may be reference axes (or rotation axes) of the tilt. Accordingly, the tilting guide unit 1241 and the mover 1230 may vertically move.

In addition, as described above, a first Hall sensor 1253a may be positioned outside to be electrically connected and coupled to the substrate part 1254. However, the position of the first Hall sensor 1253a is not limited thereto.

In addition, the third coil 1252c may be positioned on the third housing side portion 1223, and the third magnet 1251c may be positioned on the third holder outer side surface 1231S3 of the holder 1231. The third coil 1252c and the third magnet 1251c may overlap at least partially in the first direction (X-axis direction). Accordingly, an electromagnetic force between the third coil 1252c and the third magnet 1251c may be easily controlled.

As described above, the tilting guide unit 1241 may be positioned on the fourth holder outer side surface 1231S4 of the holder 1231. In addition, the tilting guide unit 1241 may be seated in the fourth seating groove 1231S4a of the fourth holder outer side surface. As described above, the fourth seating groove 1231S4a may include the first region AR1, the second region AR2, and the third region AR3 which are described above.

The first member 1231a may be disposed in the first region AR1. In addition, an outer side surface of the first member 1231a may be coupled to the second bonding part EP2 of the elastic member EE. Accordingly, the holder 1231 may apply a force RF2' to the tilting guide unit 1241 in the same direction of a restoring force RF2 generated by the elastic member EE.

The second member 1226 may be disposed in the second region AR2. The second member 1226 may include the second protrusion grooves PH2. The second protrusion grooves PH2 may be positioned in a surface of the second member 1226 facing the holder 1231.

In addition, the restoring force RF2 generated by the elastic member EE may be applied to the second member 1226 through the above-described path. Accordingly, the restoring forces RF2 and RF2' generated by the elastic member EE may press the tilting guide unit 1241 disposed between the second member 1226 and the holder 1231.

The tilting guide unit 1241 may be disposed in the third region AR3. As described above, the tilting guide unit 1241 may include the first protruding portions PR1 and the second protruding portions PR2. In this case, the first protruding portions PR1 and the second protruding portions PR2 may also be respectively disposed on the second surface 1241b and the first surface 1241a of the base BS. The first protruding portions PR1 and the second protruding portion PR2 may be variously positioned on the facing surfaces of the base BS. However, the present invention will be described with reference to the drawings below.

In addition, the first protrusion grooves PH1 may be positioned in the holder 1231. Particularly, the first protrusion grooves PH1 may be positioned in the fourth seating groove 1231S4a. In addition, the first protruding portions PR1 may be positioned in the first protrusion grooves PH1. Accordingly, at least a part of the first protruding portion PR1 may be in contact with the first protrusion groove PH1. In addition, as described above, the top points of the first protruding portions PR1 may be positioned on the bisector of the bonding holes of the second bonding part.

In addition, a maximum diameter of each of the first protrusion grooves PH1 may correspond to a maximum diameter of each of the first protruding portions PR1. This may be equally applied to the second protrusion grooves PH2 and the second protruding portions PR2. That is, a maximum diameter of each of the second protrusion grooves PH2 may correspond to a maximum diameter of each of the second protruding portions PR2. In addition, accordingly, the second protruding portions PR2 may be in contact with the second protrusion grooves PH2. By using such a structure, second axis tilting can be easily performed based the first protruding portions PR1, first axis tilting can be easily performed based on the second protruding portions PR2, and radii of the tilt can be increased.

In addition, the tilting guide unit 1241 may be disposed parallel to the first member 1231a and the second member 1226 in the third direction (Z-axis direction), and thus the tilting guide unit 1241 may overlap the optical member 1232 in the first direction (X-axis direction). More specifically, in the embodiment, the first protruding portions PR1 may overlap the optical member 1232 in the first direction (X-axis direction). In addition, at least a part of the first protruding portion PR1 may overlap the third coil 1252c or the third magnet 1251c in the first direction (X-axis direction). That is, in the camera actuator according to another embodiment, the protruding portions, which are central axes of a tilt may be positioned adjacent to the center of gravity of the mover 1230. Accordingly, the tilting guide unit may be positioned adjacent to the center of gravity of the mover. Accordingly, in the camera actuator according to another embodiment, a moment value for tilting the mover can be minimized, a consumption amount of a current applied to the coil part and the like in order to tilt the mover can be minimized, a power consumption amount can be reduced, and thus the reliability of the element can be improved.

In addition, as described above, a second Hall sensor 1253b positioned inside the third coil 1252c may detect a change in magnetic flux, and thus position detection between the third magnet 1251c and the second Hall sensor 1253b may be performed.

Figure 37:
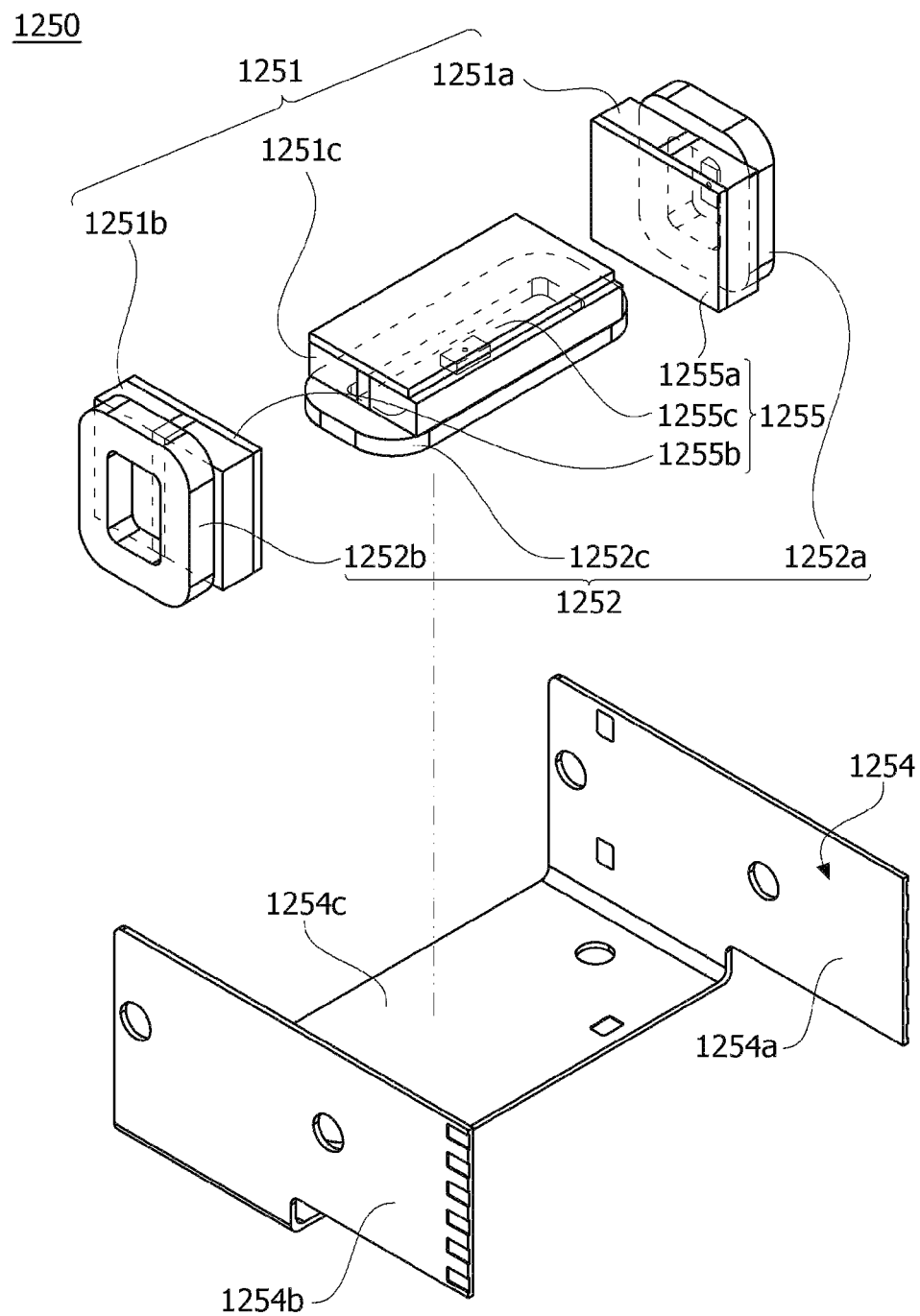
FIG. 37 is a view illustrating a driving unit according to another embodiment.

FIG. 37 is a view illustrating the driving unit according to another embodiment.

Referring to FIG. 37, as described above, the driving unit 1250 includes the driving magnets 1251, the driving coils 1252, the Hall sensor units 1253, and the substrate part 1254.

In addition, as described above, the driving magnets 1251 may include the first magnet 1251a, the second magnet 1251b, and the third magnet 1251c which provide a driving force due to an electromagnetic force. Each of the first magnet 1251a, the second magnet 1251b, and the third magnet 1251c may be positioned on the outer side surfaces of the prism holder 1231.

In addition, the driving coils 1252 may include a plurality of coils. In the embodiment, the driving coils 1252 may include the first coil 1252a, the second coil 1252b, and the third coil 1252c. The first coil 1252a may be positioned opposite to the first magnet 1251a. Accordingly, as described above, the first coil 1252a may be positioned in the first housing hole 1221a of the first housing side portion 1221. In addition, the second coil 1252b may be positioned opposite to the second magnet 1251b. Accordingly, as described above, the second coil 1252b may be positioned in the second housing hole 1222a of the second housing side portion 1222.

The first camera actuator according to another embodiment can minimize an occurrence of a decentering or tilting phenomenon to provide best optical characteristics when OIS is performed by controlling the mover 1230 to rotate about the first axis (X-axis direction) or second axis (Y-axis direction) using an electromagnetic force between the driving magnets 1251 and the driving coils 1252.

In addition, according to the embodiment, a size limitation of the actuator can be solved to provide an ultra-slim and ultra-small camera actuator and a camera module including the same by implementing the OIS using the tilting guide unit 1241 of the rotation part 1240 disposed between the housing 1220 and the mover 1230.

The substrate part 1254 may include a first substrate side portion 1254a, a second substrate side portion 1254b, and a third substrate side portion 1254c.

The first substrate side portion 1254a and the second substrate side portion 1254b may be disposed to face each other. In addition, the third substrate side portion 1254c may be positioned between the first substrate side portion 1254a and the second substrate side portion 1254b.

In addition, the first substrate side portion 1254a may be positioned between the first housing side portion and the shield can, and the second substrate side portion 1254b may be positioned between the second housing side portion and the shield can. In addition, the third substrate side portion 1254c may be positioned between the third housing side portion and the shield can and may be a lower surface of the first substrate part 1254.

The first substrate side portion 1254a may be coupled and electrically connected to the first coil 1252a. In addition, the first substrate side portion 1254a may be coupled and electrically connected to a first Hall sensor 1253a.

The second substrate side portion 1254b may be coupled and electrically connected to the second coil 1252b. In addition, it should be understood that the second substrate side portion 1254b may also be electrically connected to the first Hall sensor.

The third substrate side portion 1254c may be coupled and electrically connected to the third coil 1252c. In addition, the third substrate side portion 1254c may be coupled to and electrically connected to the second Hall sensor 1253b.

Figure 38:
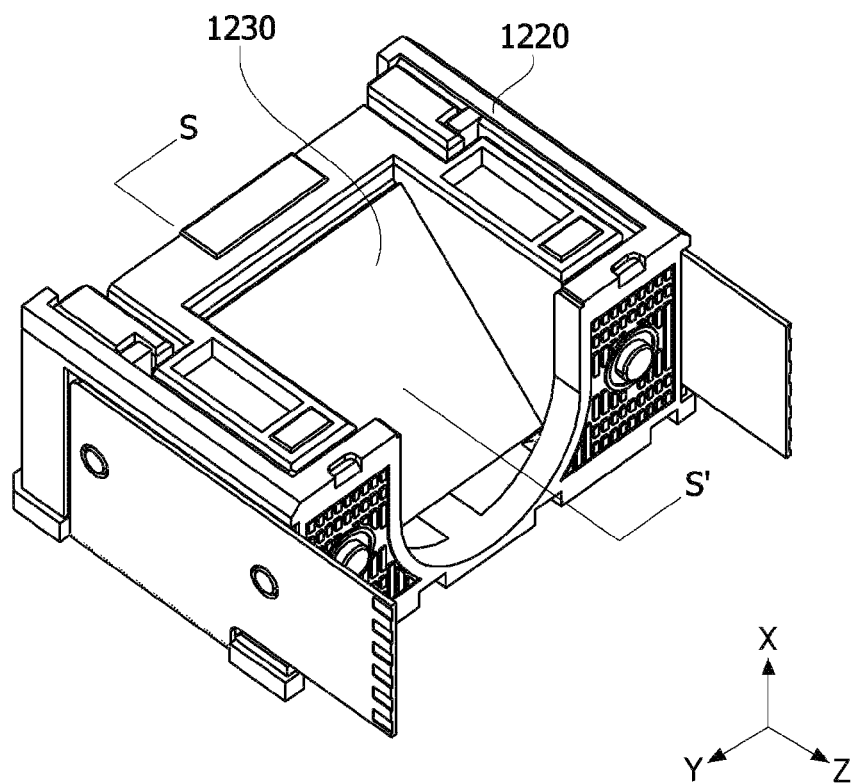
FIG. 38 is a perspective view illustrating the first camera actuator according to another embodiment.
Figure 39:
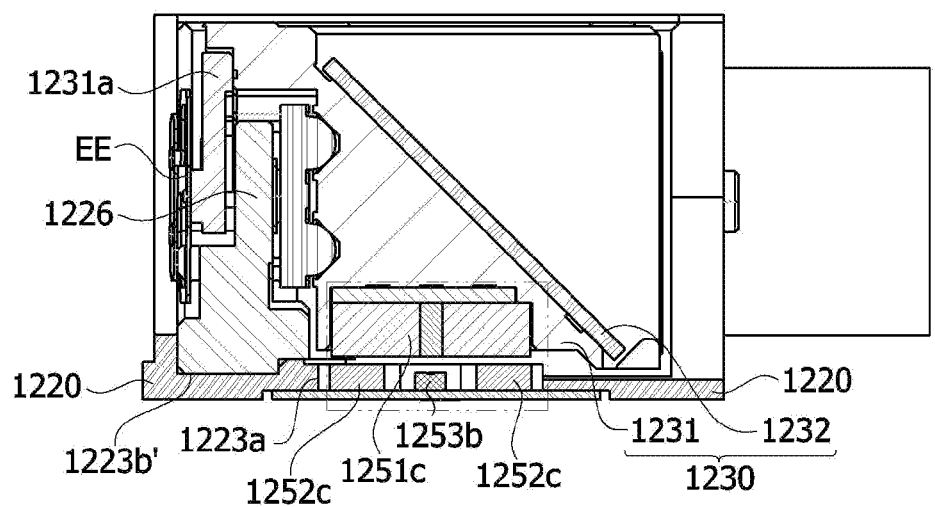
FIG. 39 is a cross-sectional view along line SS' in FIG. 38.
Figure 40:
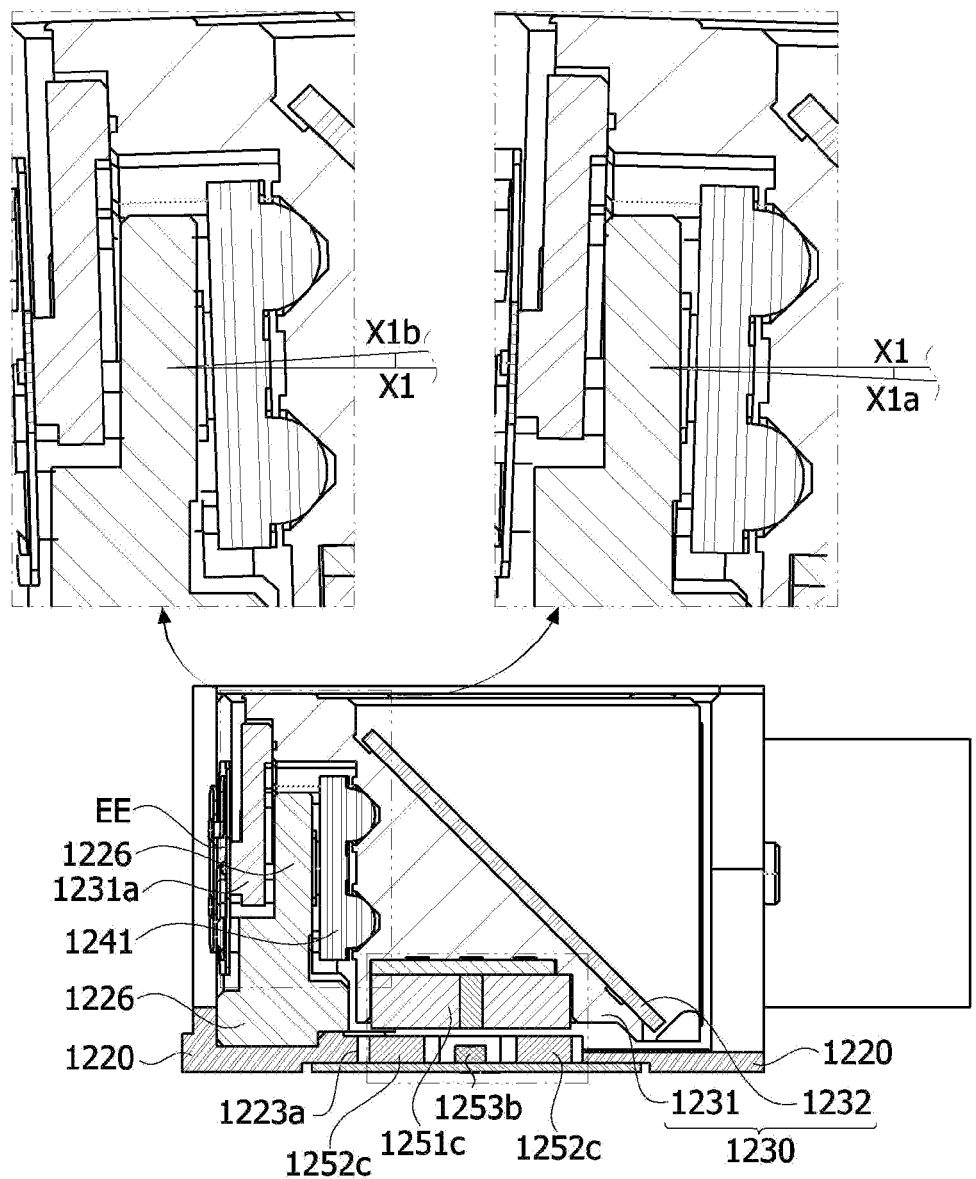
FIG. 40 is an exemplary view of movement of the first camera actuator illustrated in FIG. 39.

FIG. 38 is a perspective view illustrating the first camera actuator according to another embodiment, FIG. 39 is a cross-sectional view along line SS' in FIG. 38, and FIG. 40 is an exemplary view of movement of the first camera actuator illustrated in FIG. 39.

Referring to FIGS. 38 to 40, Y-axis tilting may be performed. That is, rotation may be performed with respect to the first direction (X-axis direction) to implement OIS.

In the embodiment, the third magnet 1251c disposed in a lower portion of the holder 1231 and the third coil 1252c may generate an electromagnetic force to rotate or tilt the mover 1230 with respect to the second direction (Y-axis direction).

Specifically, a restoring force of the elastic member EE may be transmitted to the first member 1231a and ultimately transmitted to the tilting guide unit 1241 disposed between the second member 1226 and the holder 1231. Accordingly, the tilting guide unit 1241 may be pressed by the mover 1230 and the housing 1220 using the above-described repulsive force.

In addition, the second protruding portions PR2 may be supported by the second member 1226. In this case, in the embodiment, the tilting guide unit 1241 may rotate or tilt about the second protruding portions PR2, which are reference axes (or rotation axes) and protrude toward the second member 1226, that is, may rotate or tilt about the second direction (Y-axis direction). In other words, the tilting guide unit 1241 may rotate or tilt about the second protruding portions PR2, which are the reference axes (or rotation axes) and protrude toward the second member 1226, that is, may rotate or tilt with respect to the first direction (X-axis direction).

For example, while the mover 1230 is rotated (X1→X1a) by a first angle θ1 with respect to the X-axis direction by first electromagnetic forces F1A and F1B between the third magnet 1251c disposed in the third seating groove and the third coil part 1252c disposed on the third substrate side portion, OIS may be performed. In addition, while the mover 1230 is rotated (X1→X1b) by a first angle θ1 with respect to the X-axis direction by the first electromagnetic forces F1A and F1B between the third magnet 1251c disposed in the third seating groove and the third coil part 1252b disposed on the third substrate side portion, OIS may be performed. The first angle θ1 may be in the range of ±1° to ±3°. However, the present invention is not limited thereto.

Figure 41:
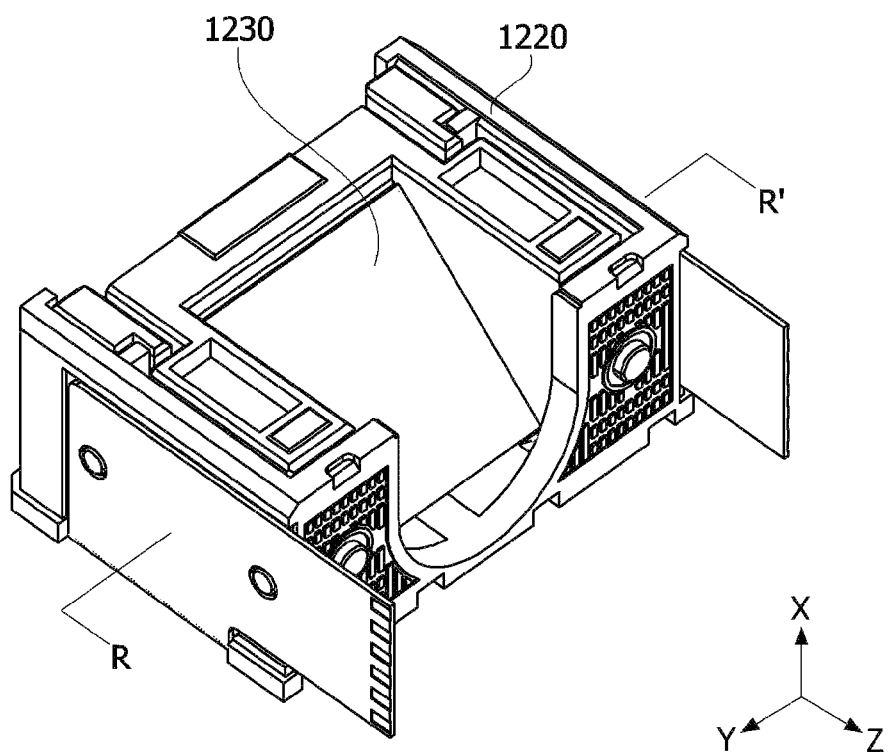
FIG. 41 is a perspective view illustrating the first camera actuator according to another embodiment.
Figure 42:
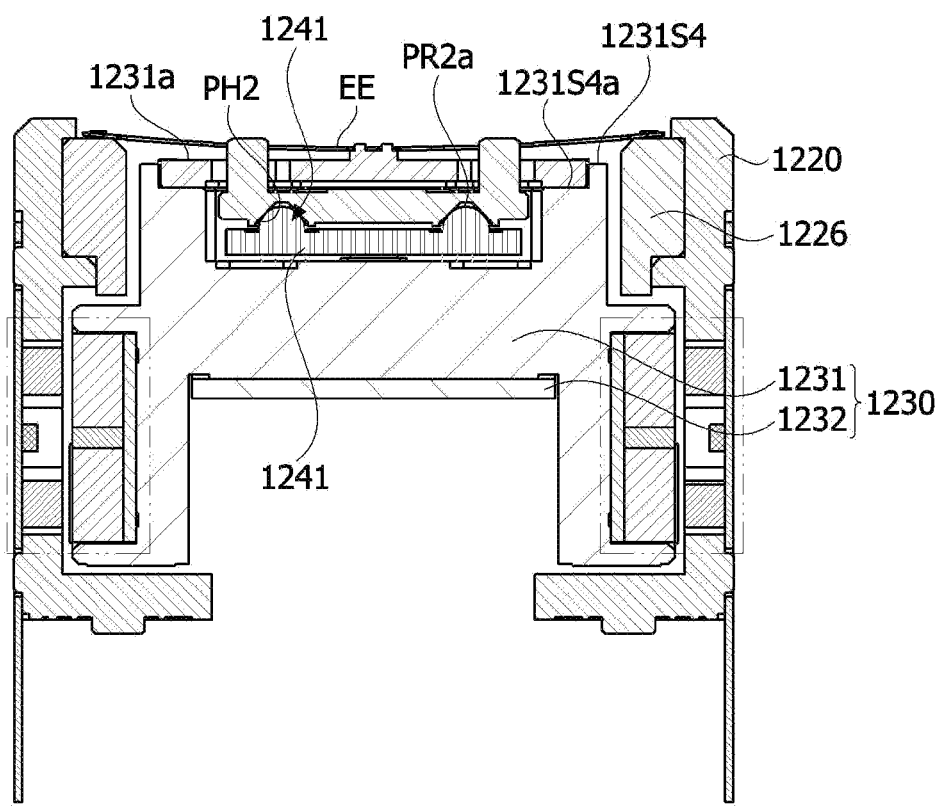
FIG. 42 is a cross-sectional view along line RR' in FIG. 41.
Figure 43:
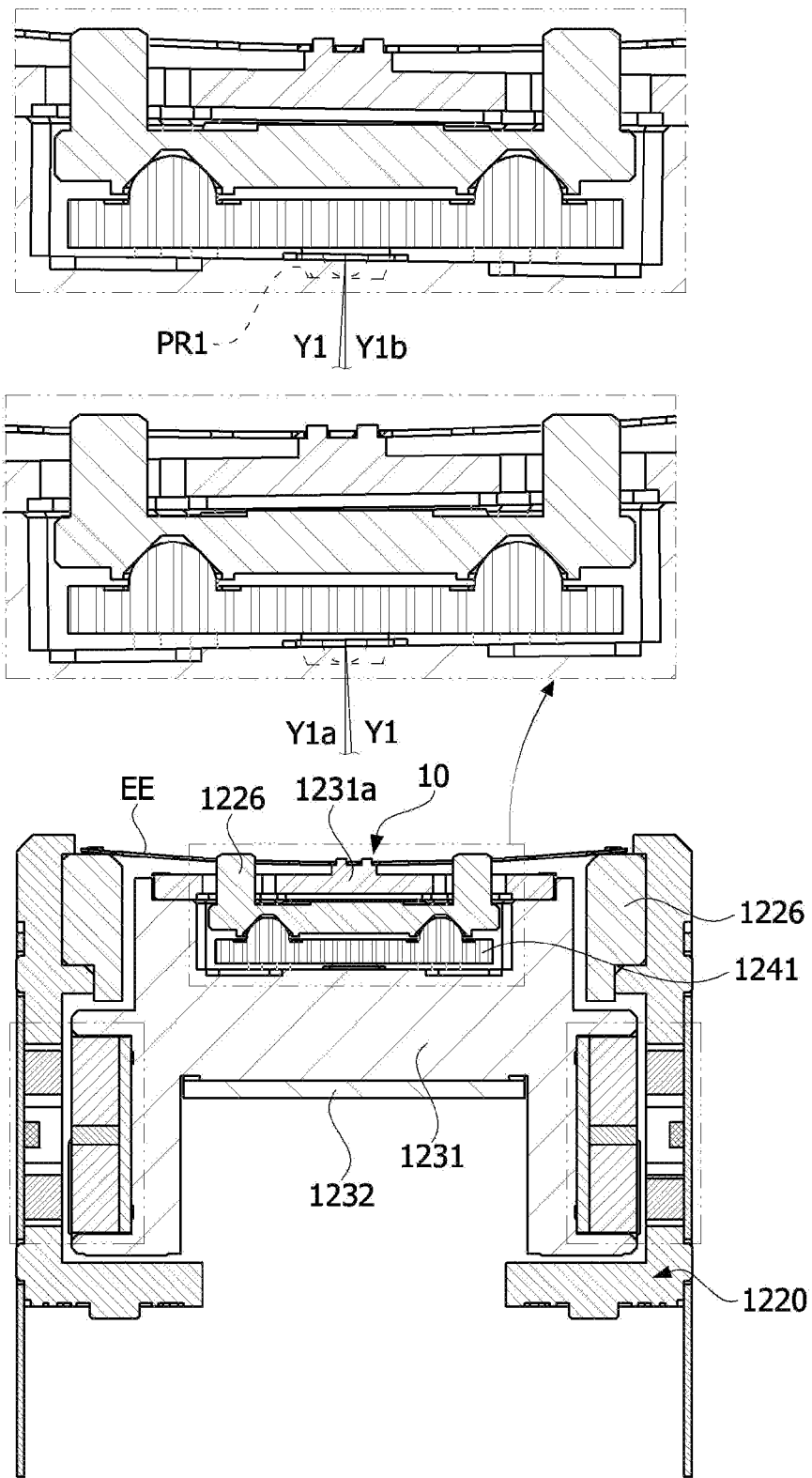
FIG. 43 is an exemplary view of movement of the first camera actuator illustrated in FIG. 42.

FIG. 41 is a perspective view illustrating the first camera actuator according to another embodiment, FIG. 42 is a cross-sectional view along line RR' in FIG. 41, and FIG. 43 is an exemplary view of movement of the first camera actuator illustrated in FIG. 42.

Referring to FIGS. 41 and 43, X-axis tilting may be performed. That is, while the mover 1230 tilts or rotates with respect to the Y-axis direction, OIS can be performed.

In the embodiment, the first magnet 1251a and the second magnet 1251b disposed in the holder 1231 and the first coil 1252a and the second coil 1252b may generate electromagnetic forces and tilt or rotate the tilting guide unit 1241 and mover 1230 with respect to the first direction (X-axis direction).

Specifically, a restoring force of the elastic member EE may be transmitted to the first member 1231a and the holder 1231 and ultimately transmitted to the tilting guide unit 1241 disposed between the holder 1231 and the second member 1226. Accordingly, the tilting guide unit 1241 may be pressed by the mover 1230 and the housing 1220 using the above-described repulsive forces.

In addition, the 1-1 protruding portion PR1a and the 1-2 protruding portion PR1b may be spaced apart from each other in the first direction (X-axis direction) and supported by the first protrusion grooves PH1 formed in the fourth seating groove 1231S4a of the holder 1231. In addition, in the embodiment, the tilting guide unit 1241 may rotate or tilt about the first protruding portions PR1, which are reference axes (or rotation axes) and protrude toward the holder 1231 (for example, in the third direction), that is, may rotate or tilt about the first direction (X-axis direction).

For example, while the mover 1230 is rotated (Y1→Y1a) by a second angle θ2 with respect to the Y-axis direction by second electromagnetic forces F2A and F2B between the first and second magnets 1251a and 1251b disposed in the first seating groove and the first and second coil parts 1252a and 1252b disposed on the first and second substrate side portions, OIS can be performed. In addition, while the mover 1230 is rotated (Y1→Y1b) by a second angle θ2 with respect to the Y-axis direction by the second electromagnetic forces F2A and F2B between the first and second magnets 1251a and 1251b disposed in the first seating groove and the first and second coil parts 1252a and 1252b disposed on the first and second substrate side portion, the OIS can be performed. The second angle θ2 may be in the range of ±1° to 3°. However, the present invention is not limited thereto.

As described above, the second actuator according to another embodiment can minimize a decentering or tilting phenomenon to provide best optical characteristics when OIS is performed by controlling the mover 1230 to rotate about the first direction (X-axis direction) or the second direction (Y-axis direction) using an electromagnetic force between the driving magnet in the holder and the driving coil disposed in the housing. In addition, as described above, the term "Y-axis tilting" refers to rotation or tilting with respect to the first direction (X-axis direction), and the term "X-axis tilting" refers to rotation or tilting with respect to the second direction (Y-axis direction).

Figure 44:
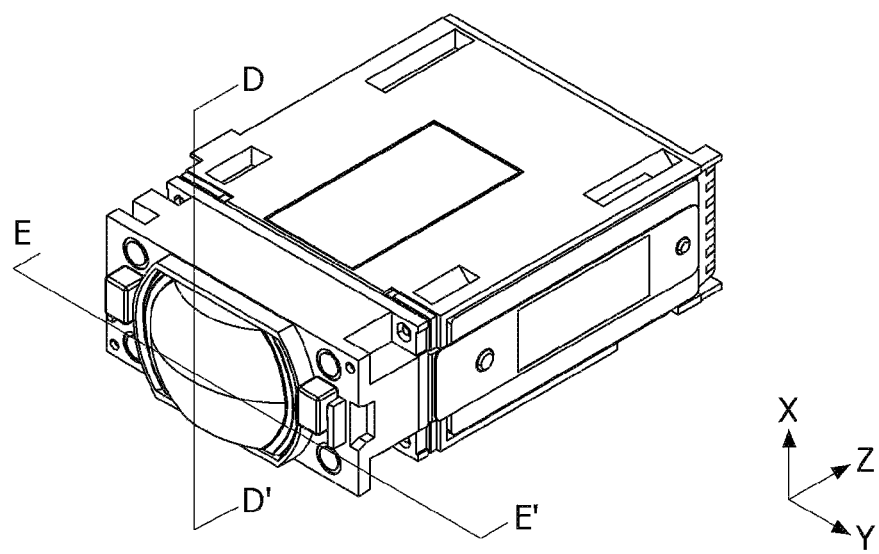
FIG. 44 is a perspective view illustrating a second camera actuator according to the embodiment.
Figure 45:
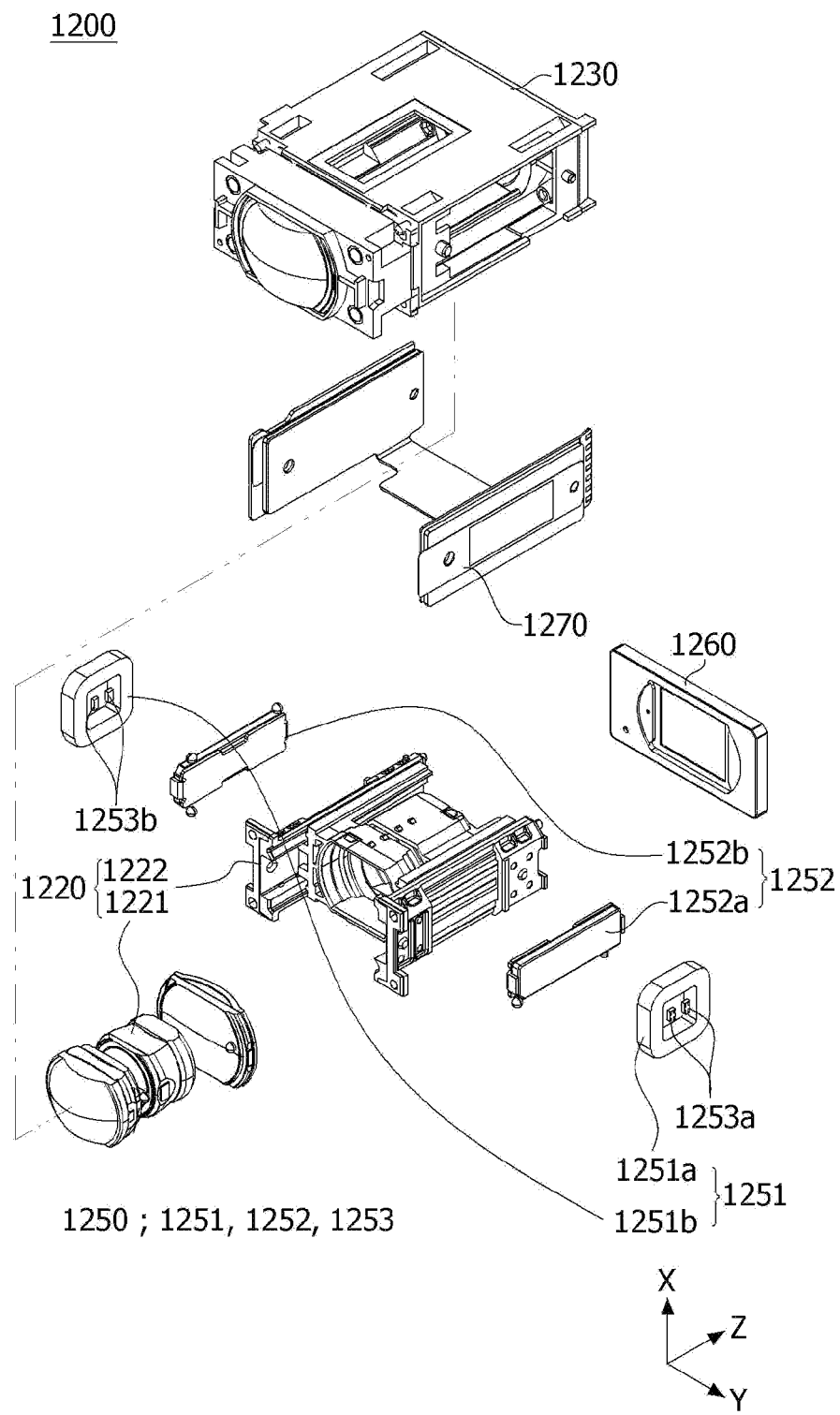
FIG. 45 is an exploded perspective view illustrating the second camera actuator according to the embodiment.
Figure 46:
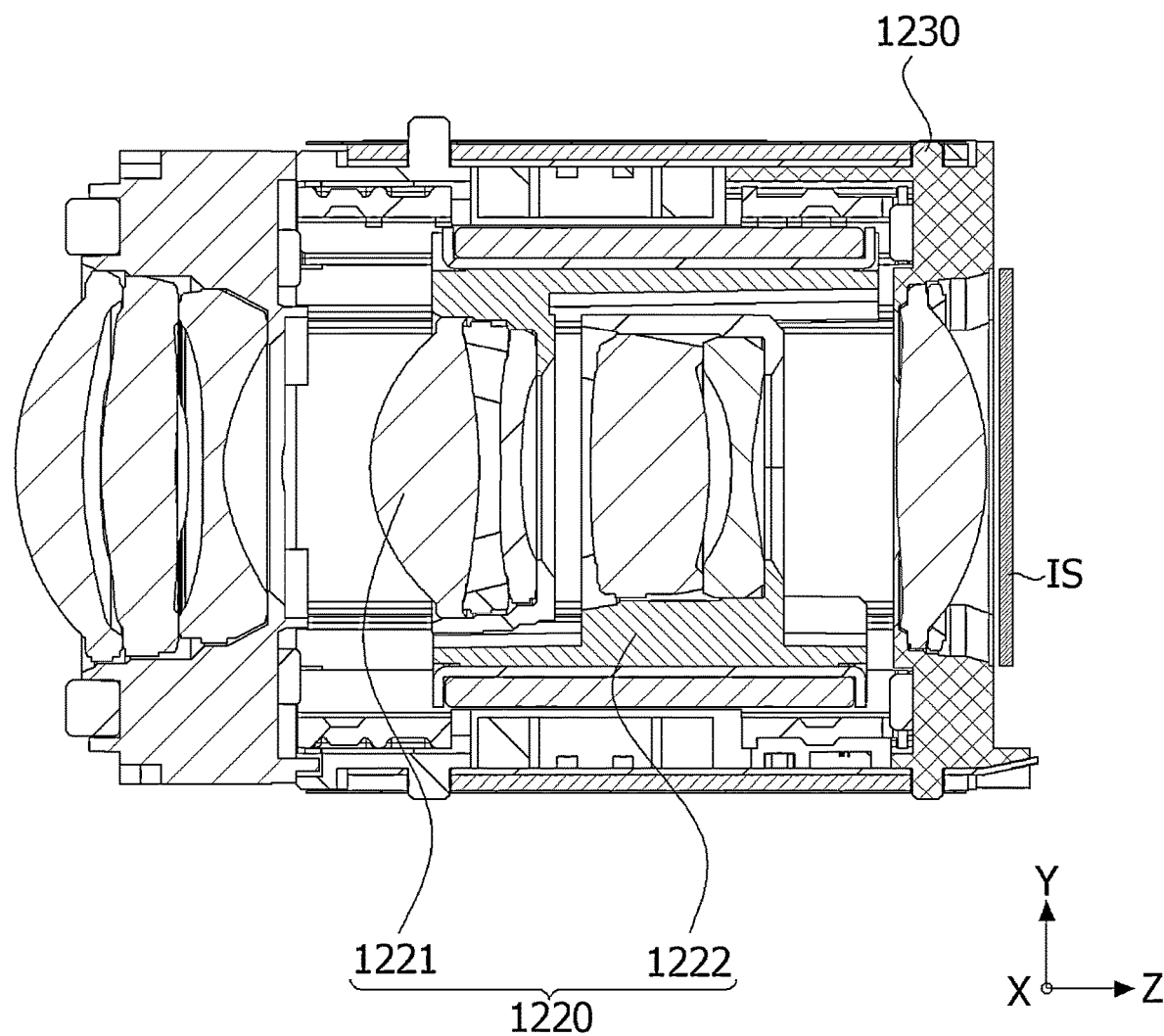
FIG. 46 is a cross-sectional view along line DD' in FIG. 44.
Figure 47:
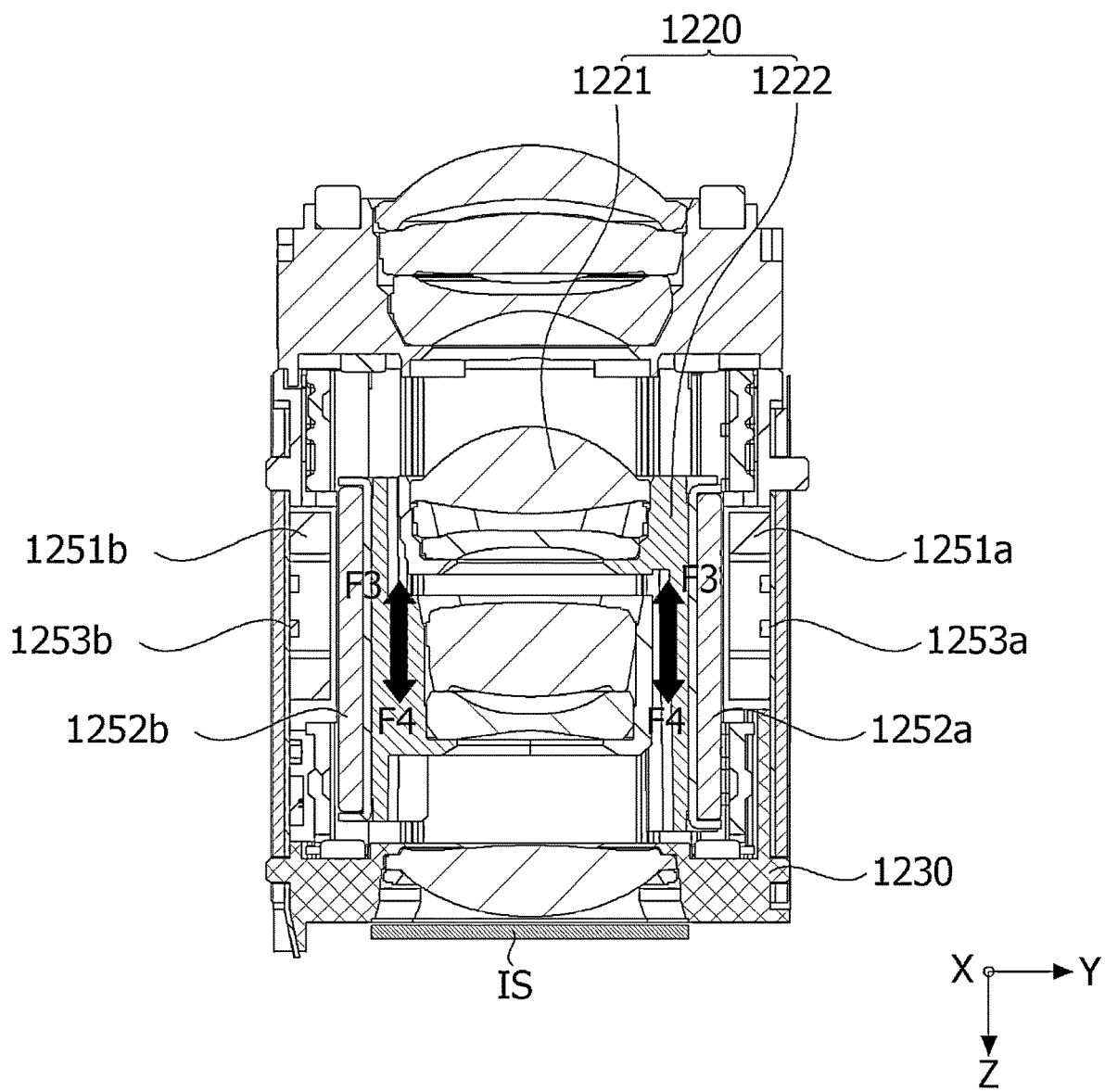
FIG. 47 is a cross-sectional view along line EE' in FIG. 44.

FIG. 44 is a perspective view illustrating the second camera actuator according to the embodiment, and FIG. 45 is an exploded perspective view illustrating the second camera actuator according to the embodiment. FIG. 46 is a cross-sectional view along line DD' in FIG. 44, and FIG. 47 is a cross-sectional view along line EE' in FIG. 44.

Referring to FIGS. 44 to 47, the second camera actuator 1200 according to the embodiment may include a lens part 1220, a second housing 1230, a second driving unit 1250, a base portion (not shown), and a second substrate part 1270. In addition, the second camera actuator 1200 may further include a second shield can (not shown), elastic parts (not shown), and a bonding member (not shown). In addition, the second camera actuator 1200 according to the embodiment may further include an image sensor IS. The second camera actuator 1200 may be coupled to the first camera actuator according to the above-described embodiment or another embodiment.

The second shield can (not shown) may be positioned at one region (for example, an outermost side) of the second camera actuator 1200 to surround the components (the lens part 1220, the second housing 1230, the elastic parts (not shown), the second driving unit 1250, the base portion (not shown), the second substrate part 1270, and the image sensor IS) which will be described below.

The second shield can (not shown) may block or reduce electromagnetic waves generated from the outside. Accordingly, an occurrence of a malfunction of the second driving unit 1250 can be reduced.

The lens part 1220 may be positioned in the second shield can (not shown). The lens part 1220 may move in the third direction (Z-axis direction). Accordingly, the above-described AF function can be performed.

Specifically, the lens part 1220 may include a lens assembly 1221 and a bobbin 1222.

The lens assembly 1221 may include at least one lens. In addition, although the lens assembly 1221 may be provided as a plurality of lens assemblies 1221, the present invention will be described based on one lens assembly 1221 below.

The lens assembly 1221 may be coupled to the bobbin 1222 and moved in the third direction (Z-axis direction) by an electromagnetic force generated by a fourth magnet 1252a and a fifth magnet 1252b which are coupled to the bobbin 1222.

The bobbin 1222 may include an open region surrounding the lens assembly 1221. In addition, the bobbin 1222 may be coupled to the lens assembly 1221 in one of various manners. In addition, the bobbin 1222 may include a groove in a side surface and may be coupled to the fourth magnet 1252a and the fifth magnet 1252b through the groove. The bonding member and the like may be applied in the groove.

In addition, the elastic parts (not shown) may be coupled to an upper end and a lower end of the bobbin 1222. Accordingly, the bobbin 1222 may be supported by the elastic parts (not shown) while moving in the third direction (Z-axis direction). That is, a position of the bobbin 1222 may be maintained, and thus the position of the bobbin 1222 may be maintained in the third direction (Z-axis direction). The elastic parts (not shown) may be formed as leaf springs.

The second housing 1230 may be disposed between the lens part 1220 and the second shield can (not shown). In addition, the second housing 1230 may be disposed to surround the lens part 1220.

A hole may be formed in a side portion of the second housing 1230. A fourth coil 1251a and a fifth coil 1251b may be disposed in the hole. The hole may be positioned to correspond to the groove of the bobbin 1222.

The fourth magnet 1252*a* may be positioned to face the fourth coil 1251*a*. In addition, the fifth magnet 1252*b* may be positioned to face the fifth coil 1251*b*.

The elastic parts (not shown) may include a first elastic member (not shown) and a second elastic member (not shown). The first elastic member (not shown) may be coupled to an upper surface of the bobbin 1222. The second elastic member (not shown) may be coupled to a lower surface of the bobbin 1222. In addition, the first elastic member (not shown) and the second elastic member (not shown) may be formed as the leaf springs as described above. In addition, the first elastic member (not shown) and the second elastic member (not shown) may provide elasticity to the bobbin 1222 for moving of the bobbin 1222 moves.

The second driving unit 1250 may provide driving forces F3 and F4 for moving the lens part 1220 in the third direction (Z-axis direction). The second driving unit 1250 may include driving coils 1251 and driving magnets 1252.

The lens part 1220 may be moved in the third direction (Z-axis direction) by an electromagnetic force generated between the driving coils 1251 and the driving magnets 1252.

The driving coils 1251 may include the fourth coil 1251*a* and the fifth coil 1251*b*. The fourth coil 1251*a* and the fifth coil 1251*b* may be disposed in the hole formed in the side portion of the second housing 1230. In addition, the fourth coil 1251*a* and the fifth coil 1251*b* may be electrically connected to the second substrate part 1270. Accordingly, the fourth coil 1251*a* and the fifth coil 1251*b* may receive a current through the second substrate part 1270.

The driving magnets 1252 may include the fourth magnet 1252*a* and the fifth magnet 1252*b*. The fourth magnet 1252*a* and the fifth magnet 1252*b* may be disposed in the groove of the bobbin 1222 and positioned to correspond to the fourth coil 1251*a* and the fifth coil 1251*b*.

The base portion (not shown) may be positioned between the lens part 1220 and the image sensor IS. Components, such as a filter, may be fixed to the base portion (not shown). In addition, the base portion (not shown) may be disposed to surround the image sensor IS. By using such a structure, since the image sensor IS becomes free from foreign materials, the reliability of the element can be improved.

In addition, the second camera actuator may be a zoom actuator or AF actuator. For example, the second camera actuator may support a single lens or a plurality of lenses and move the lenses according to a control signal of a predetermined control unit to perform an AF function or zoom function.

In addition, the second camera actuator may perform fixed zoom or continuous zoom. For example, the second camera actuator may move the lens assembly 1221.

In addition, the second camera actuator may be provided with a plurality of lens assembles. For example, at least one among a first lens assembly (not shown), a second lens assembly (not shown), a third lens assembly (not shown), and a guide pin (not shown) may be disposed in the second camera actuator. The above-described content may be applied thereto. Accordingly, the second camera actuator may perform a high magnification zooming function using the driving unit. For example, the first lens assembly (not shown) and the second lens assembly (not shown) may be moving lenses which move using the driving unit and the guide pin (not shown), and the third lens assembly (not shown) may be a fixed lens, but the present invention is not limited thereto. For example, the third lens assembly (not shown) may perform a function of a focator which collects light to form an image at a specific position, and the first lens assembly (not shown) may perform a function of a variator which reforms the image, which is formed through the third lens assembly (not shown) which is the focator, at another position. Meanwhile, the first lens assembly (not shown) may be in a state in which a change in magnification is large because a distance from a subject or image is greatly changed, and the first lens assembly (not shown) which is the variator may play an important role in changing a focal length or magnification of an optical system. Meanwhile, an image point at which an image is formed through the first lens assembly (not shown) which is the variator may slightly vary according to a position. Accordingly, the second lens assembly (not shown) may perform a position compensation function for the image formed by the variator. For example, the second lens assembly (not shown) may perform a function of a compensator for forming the image formed through the first lens assembly (not shown) which is the variator at an accurate position of the actual image sensor.

The image sensor IS may be positioned inside or outside the second camera actuator. In the embodiment, as illustrated, the image sensor IS may be positioned inside the second camera actuator. The image sensor IS may receive light and convert the received light into an electrical signal. In addition, the image sensor IS may be formed so that a plurality of pixels are formed in an array type. In addition, the image sensor IS may be positioned on an optical axis.

Figure 48:
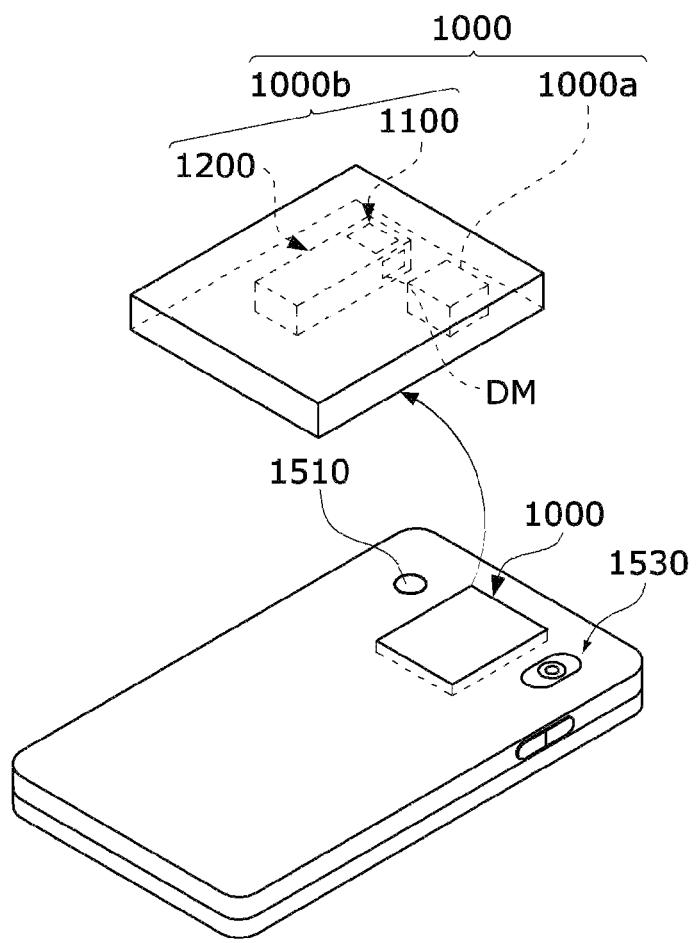
FIG. 48 is a perspective view illustrating a mobile terminal to which a camera module according to an embodiment is applied.

FIG. 48 is a perspective view illustrating a mobile terminal to which a camera module according to an embodiment is applied.

As illustrated in FIG. 48, an electronic device (for example, a mobile terminal 1500) of the embodiment may include a camera module 1000, a flash module 1530, and an AF device 1510.

The camera module 1000 may have an image capturing function and an AF function. For example, the camera module 1000 may have an AF function using an image.

The camera module 1000 processes a still image or an image frame of a moving image obtained through an image sensor in an image capturing mode or video call mode.

The processed image frame may be displayed on a predetermined display and stored in a memory. A camera (not shown) may also be disposed in a front surface of a body of a mobile terminal.

For example, the camera module 1000 may include a first camera module 1000*a* and a second camera module 1000*b*, and an AF or zoom function and OIS may be implemented by the first camera module 1000*a*. In addition, the second camera module 1000*b* may also perform an AF or zoom function and an OIS function.

For example, the electronic device 1500 including a terminal or the like may include the camera module 1000. In addition, the camera module 1000 may include the first camera module 1000*a* in which an opening into which light is incident and the image sensor overlap at least partially in an optical axis direction, and the second camera module 1000*b* (corresponding to the above-described first camera actuator and second camera actuator) including an optical member which changes an optical path of incident light.

In this case, in the second camera module 1000*b* according to the embodiment, a first magnet may be disposed on a first side surface (corresponding to the above-described first holder outer side surface) of a first camera actuator 1100, and a dummy member DM may be disposed on a second side surface (corresponding to the above-described second holder outer side surface). In this case, the first camera module 1000*a* may be disposed closer to the second side surface than the first side surface. In addition, the second camera module 1000b may have the first side surface adjacent to the first camera module and the second side surface opposite to the first side surface and include a driving unit (corresponding to a magnet/coil and the like) disposed between the optical member and the second side surface therein to move the optical member. That is, the second camera module 1000b may include the dummy member between the optical member and the first side surface.

Accordingly, since the dummy member DM is disposed on the second side surface, the second camera module 1000b may perform a function of an actuator using a magnetic member (for example, a magnet) in a state in which an influence of a magnetic force generated by the first camera module is minimized. In addition, in response thereto, in the first camera module 1000a, the dummy member DM is also disposed adjacent to the second camera module 1000b, an influence of a magnetic force generated by the second camera module 1000b on a function of the first camera module 1000a as an actuator may be minimized.

The flash module 1530 may include a light-emitting element which emits light therein. The flash module 1530 may be operated by operation of a camera of the mobile terminal or control of a user.

The AF device 1510 may include one of packages of surface light-emitting laser elements as a light-emitting part.

The AF device 1510 may have an AF function using a laser. The AF device 1510 may be mainly used in a condition in which the AF function using the image of the camera module 1000 is degraded, for example, in a close environment within 10 m or less or in a dark environment.

The AF device 1510 may include a light-emitting part, which includes a vertical-cavity surface-emitting laser (VCSEL) semiconductor element, and a light-receiving part, which converts light energy into an electrical energy, like a photodiode.

Figure 49:
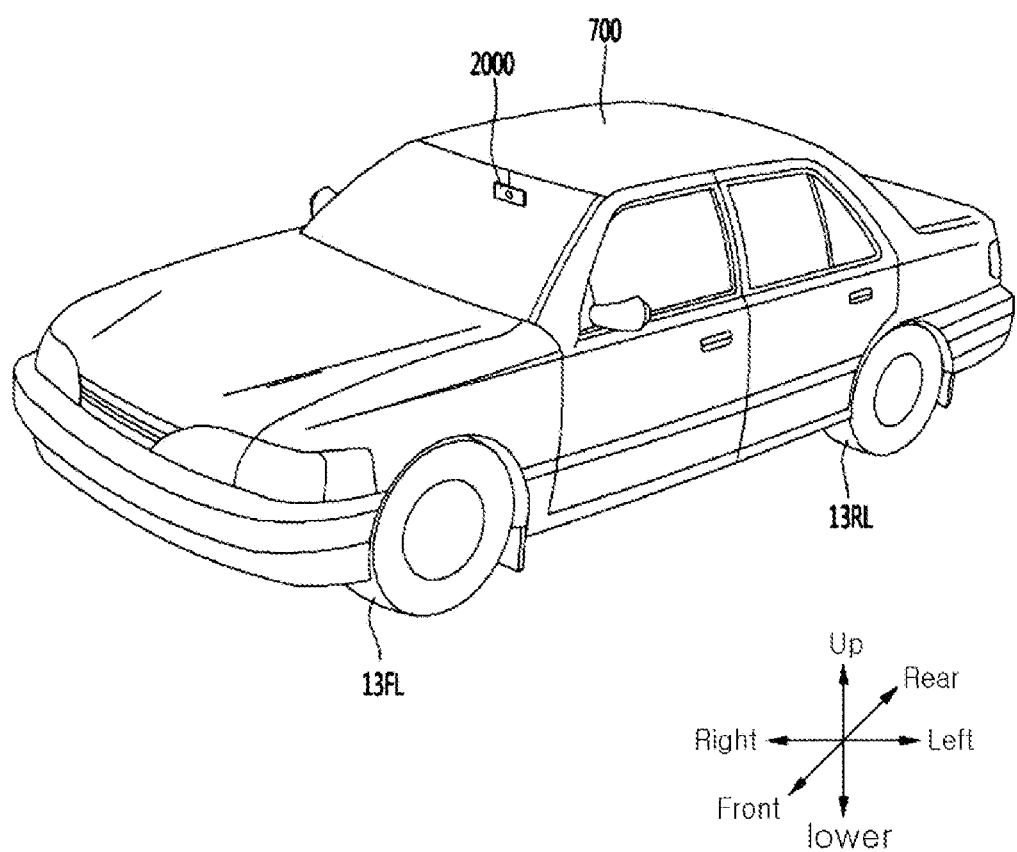
FIG. 49 is a perspective view illustrating a vehicle to which the camera module according to the embodiment is applied.

FIG. 49 is a perspective view illustrating a vehicle to which the camera module according to the embodiment is applied.

For example, FIG. 49 is an exterior view of a vehicle including a vehicle driving auxiliary device to which the camera module 1000 according to the embodiment is applied.

Referring to FIG. 49, a vehicle 700 of the embodiment may include wheels 13FL and 13FR, which are rotated by a power source, and a predetermined sensor. Although the sensor may be a camera sensor 2000, the present invention is not limited thereto.

The camera sensor 2000 may be a camera sensor to which the camera module 1000 according to the embodiment is applied. The vehicle 700 of the embodiment may obtain image information through the camera sensor 2000 which captures a front image or surrounding image, determine a situation, in which lanes are not identified, using the image information, and generate virtual lanes when the lanes are not identified.

For example, the camera sensor 2000 may obtain the front image by capturing an image in front of the vehicle 700, and a processor (not shown) may analysis objects included in the front image to obtain the image information.

For example, when, images of lanes, adjacent vehicles, obstacles to driving, and a median strip, curb stones, street trees, and the like which correspond to indirect road indicators are included in the image captured by the camera sensor 2000, the process may detect such objects so that the objects are included in the image information. In this case, the processor may obtain distance information from the objects detected through the camera sensor 2000 to supplement the image information.

The image information may be information about the objects of which the images are captured. The camera sensor 2000 may include an image sensor and an image processing module.

The camera sensor 2000 may process a still image or moving image obtained by the image sensor (for example, a complementary metal-oxide-semiconductor (CMOS) or charge-coupled device (CCD)).

The image processing module may extract necessary information by processing the still image or moving image obtained through the image sensor and transmit the extracted information to the processor.

In this case, the camera sensor 2000 may further include a stereo camera in order to improve measurement accuracy of an object and further secure information of a distance between the vehicle 700 and the object and the like but is not limited thereto.

While the present invention has been mainly described above with reference to embodiments, it will be understood by those skilled in the art that the present invention is not limited to the embodiments, but the embodiments are only exemplary, and various modifications and applications which are not illustrated above may be made without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A camera actuator comprising:
a housing;
a mover disposed in the housing and including an optical member;
a tilting guide unit disposed between the housing and the mover;
a driving unit that is disposed in the housing and configured to drive the mover; and
an elastic member disposed between the tilting guide unit and the housing,
wherein the driving unit includes a first magnet disposed on a first side surface of the mover and a dummy member disposed on a second side surface of the mover facing the first side surface,
wherein the elastic member includes a first bonding part connected to the housing, a second bonding part different from the first bonding part, and connecting parts connecting the first bonding part and the second bonding part, and
wherein the second bonding part is disposed between the mover and the first bonding part.

2. The camera actuator of claim 1, wherein the driving unit includes:
a second magnet disposed on a lower portion of the mover;
a first coil facing the first magnet; and
a second coil facing the second magnet.

3. The camera actuator of claim 1, wherein the elastic member brings the tilting guide unit into close contact with the mover.

4. An electronic device comprising:
a first camera module in which an opening into which light is incident and an image sensor overlap at least partially in an optical axis direction; and a second camera module including an optical member that is configured to change an optical path of incident light, wherein the second camera module includes a first side surface adjacent to the first camera module, a second side surface opposite to the first side surface, a driving unit that is disposed between the optical member and the second side surface and is configured to move the optical member, and a dummy member between the optical member and the first side surface, and wherein the second camera module comprises the camera actuator according to claim 1.

5. A camera actuator comprising:

a housing;

a mover disposed in the housing and including an optical member;

a tilting guide unit disposed between the housing and the mover;

a driving unit that is disposed in the housing and configured to drive the mover; and an elastic member disposed between the tilting guide unit and the housing, wherein the driving unit includes a first magnet disposed on a first side surface of the mover and a dummy member disposed on a second side surface of the mover facing the first side surface, wherein the driving unit includes:
- a second magnet disposed on a lower portion of the mover;
- a first coil facing the first magnet; and
- a second coil facing the second magnet, wherein the camera actuator comprises:
- a substrate part that is electrically connected to the driving unit and includes a first substrate side portion, a second substrate side portion opposite to the first substrate side portion, and a third substrate side portion disposed between the first substrate side portion and the second substrate side portion; and
- a driver disposed on any one of the first substrate side portion and the third substrate side portion, wherein the first substrate side portion is electrically connected to the first coil, and wherein the third substrate side portion is electrically connected to the second coil.

6. The camera actuator of claim 5, wherein the second substrate side portion is a dummy substrate.

7. The camera actuator of claim 5, wherein the driver is configured to supply a current to the first coil and the second coil.

8. A camera actuator comprising:

a housing;

a mover disposed in the housing and including an optical member;

a tilting guide unit disposed between the housing and the mover;

a driving unit that is disposed in the housing and configured to drive the mover;

an elastic member disposed between the tilting guide unit and the housing;

a first member connected to the housing; and a second member coupled to the mover, wherein the driving unit includes a first magnet disposed on a first side surface of the mover and a dummy member disposed on a second side surface of the mover facing the first side surface, wherein the second member is disposed between the first member and the mover, wherein the elastic member includes a first bonding part connected to the housing, a second bonding part connected to the first member, and connecting parts connecting the first bonding part and the second bonding part, and wherein the second bonding part is disposed between the mover and the first bonding part.

9. The camera actuator of claim 8, wherein:

the tilting guide unit includes a base, a first protruding portion protruding from a first surface of the base, and a second protruding portion protruding from a second surface of the base; and the mover tilts with respect to a first axis about the first protruding portion and tilts with respect to a second axis about the second protruding portion.

10. The camera actuator of claim 9, wherein:

the connecting parts include a first connecting part to a fourth connecting part that are respectively disposed in first to fourth quadrant regions that are divided by a first bisector and a second bisector;

the first to fourth quadrant regions are positioned counterclockwise;

the first connecting part and the third connecting part are symmetrical with respect to the first bisector and the second bisector;

the second connecting part and the fourth connecting part are symmetrical with respect to the first bisector and the second bisector;

the first bisector is a line that bisects the elastic member in a first direction; and the second bisector is a line that bisects the elastic member in a second direction.

\* \* \* \* \*